United States Patent
Yamamoto et al.

(10) Patent No.: US 10,906,524 B2
(45) Date of Patent: *Feb. 2, 2021

(54) CONTROL APPARATUS FOR VEHICULAR POWER TRANSMITTING SYSTEM

(71) Applicant: TOYOTA JIDOSHA KABUSHIKI KAISHA, Toyota (JP)

(72) Inventors: Masafumi Yamamoto, Nagakute (JP); Atsushi Tabata, Okazaki (JP); Tatsuya Imamura, Okazaki (JP); Koichi Okuda, Toyota (JP); Kota Fujii, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 227 days.

This patent is subject to a terminal disclaimer.

(21) Appl. No.: 16/131,889

(22) Filed: Sep. 14, 2018

(65) Prior Publication Data
US 2019/0084554 A1 Mar. 21, 2019

(30) Foreign Application Priority Data
Sep. 21, 2017 (JP) .................. 2017-181647

(51) Int. Cl.
*B60W 20/40* (2016.01)
*B60W 20/10* (2016.01)
(Continued)

(52) U.S. Cl.
CPC .............. *B60W 20/10* (2013.01); *B60K 6/26* (2013.01); *B60K 6/365* (2013.01); *B60K 6/547* (2013.01);
(Continued)

(58) Field of Classification Search
CPC .............. B60W 20/10; B60W 30/182; B60W 2710/0644; B60W 20/00; B60W 10/06;
(Continued)

(56) References Cited

U.S. PATENT DOCUMENTS

| | | |
|---|---|---|
| 7,252,611 B2 | 8/2007 | Raghavan et al. |
| 7,273,435 B2 | 9/2007 | Raghavan et al. |

(Continued)

FOREIGN PATENT DOCUMENTS

| | | | |
|---|---|---|---|
| JP | 2005-329841 A | | 12/2005 |
| JP | 2008120234 | * | 5/2008 |

(Continued)

OTHER PUBLICATIONS

Nov. 12, 2019 Office Action issued in U.S. Appl. No. 16/013,402.

*Primary Examiner* — Donald J Wallace
*Assistant Examiner* — Daniel M. Robert
(74) *Attorney, Agent, or Firm* — Oliff PLC

(57) ABSTRACT

A control apparatus for a vehicular power transmitting system includes a power transmission switching portion configured to selectively establish a first drive mode by placing one of the first and second coupling elements in an engaged state, a second drive mode by placing the other of the first and second coupling elements in an engaged state, or a third drive mode by placing both of the first and second coupling elements in the engaged states. The power transmission switching portion switches the vehicular power transmitting system between the first and second drive modes through the third drive mode, where a predetermined condition is not satisfied, and switches the vehicular power transmitting system between the first and second drive modes with concurrent engaging and releasing actions of the first and second coupling elements, where the predetermined condition is satisfied.

13 Claims, 52 Drawing Sheets

(51) Int. Cl.
  *B60K 6/26* (2007.10)
  *B60W 30/182* (2020.01)
  *B60K 6/365* (2007.10)
  *B60K 6/547* (2007.10)

(52) U.S. Cl.
  CPC ... *B60W 30/182* (2013.01); *B60W 2710/0644* (2013.01); *B60Y 2200/92* (2013.01); *B60Y 2300/182* (2013.01); *B60Y 2400/73* (2013.01)

(58) Field of Classification Search
  CPC ...... B60W 10/08; B60W 10/02; B60W 10/10; B60W 10/115; B60W 20/30; B60W 20/40; B60K 6/26; B60K 6/365; B60K 6/547; B60K 6/387; B60K 2006/381; B60K 6/445; B60Y 2400/73; B60Y 2200/92; B60Y 2300/182; F16H 3/72; F16H 3/727; F16H 3/728; F16H 2200/00–2306/00
  See application file for complete search history.

(56) References Cited

U.S. PATENT DOCUMENTS

| | | | |
|---|---|---|---|
| 7,967,711 | B2 | 6/2011 | Conlon et al. |
| 7,998,016 | B2 | 8/2011 | Si et al. |
| 8,246,499 | B2 | 8/2012 | Iwanaka et al. |
| 8,287,412 | B2 | 10/2012 | Lee et al. |
| 8,313,401 | B2 | 11/2012 | Kim et al. |
| 9,193,349 | B2 | 11/2015 | Kiyokami et al. |
| 9,216,641 | B2 | 12/2015 | Ono et al. |
| 9,409,568 | B2 | 8/2016 | Yamamoto et al. |
| 9,421,858 | B2 | 8/2016 | Hayashi et al. |
| 9,452,751 | B2 | 9/2016 | Matsubara et al. |
| 9,475,478 | B2 | 10/2016 | Kodama et al. |
| 9,562,481 | B2 | 2/2017 | Matsubara et al. |
| 10,093,165 | B2 | 10/2018 | Imamura et al. |
| 2006/0234821 | A1* | 10/2006 | Bucknor ............ B60K 6/445 475/5 |
| 2008/0176704 | A1* | 7/2008 | Raghavan ............ F16H 3/728 475/275 |
| 2009/0118936 | A1 | 5/2009 | Heap et al. |
| 2015/0021110 | A1 | 1/2015 | Ono et al. |
| 2017/0274754 | A1 | 9/2017 | Imamura et al. |

FOREIGN PATENT DOCUMENTS

| | | |
|---|---|---|
| JP | 2009-002282 A | 1/2009 |
| JP | 2009-143377 A | 7/2009 |
| JP | 2009-214828 A | 9/2009 |
| JP | 2016-185790 A | 10/2016 |
| JP | 2017-159828 A | 9/2017 |
| JP | 2017-178299 A | 10/2017 |
| KR | 20160133857 | * 11/2016 |
| KR | 220160133857 | * 11/2016 |
| WO | 2013/114594 A1 | 8/2013 |

* cited by examiner

FIG.3

| DRIVE MODE | | | | | | CL1 | BR1 | CLc | MG1 | MG2 |
|---|---|---|---|---|---|---|---|---|---|---|
| MOTOR DRIVE MODE (EV DRIVE MODE) | FORWARD DRIVE/ REVERSE DRIVE | SINGLE-MOTOR DRIVE | DRIVING | | NORMAL | | | | | M |
| | | | | STANDBY SUB-MODES | O/D INPUT SPLIT | | | ○ | | M |
| | | | | | U/D INPUT SPLIT | ○ | | | | M |
| | | | ASSISTING ENGINE BRAKING | | O/D INPUT SPLIT | | | △ | G | M |
| | | | | | U/D INPUT SPLIT | △ | | | G | M |
| | | | | | DIRECT ENGINE FORCE INPUT | △ | | △ | | M |
| | | TWO-MOTOR DRIVE | | | | ○ | ○ | | M | M |
| ENGINE DRIVE MODE (HV DRIVE MODE) | O/D INPUT SPLIT | FORWARD DRIVE | | | | | | ○ | G | M |
| | | REVERSE DRIVE | FORWARD ENGINE DRIVE FORCE INPUT | | | | | ○ | G | M |
| | U/D INPUT SPLIT | FORWARD DRIVE | | | | ○ | | | G | M |
| | | REVERSE DRIVE | REVERSE ENGINE DRIVE FORCE INPUT | | | | | ○ | G | M |
| | | | FORWARD ENGINE DRIVE FORCE INPUT | | | ○ | | | G | M |
| | FIXED SPEED POSITION | FORWARD DRIVE | DIRECT ENGINE FORCE INPUT | | | ○ | | ○ | | |
| | | | STATIONARY OUTPUT SHAFT | | | | ○ | ○ | G | |

"○": ENGAGED STATE    "△": ONE OR BOTH OF CL1 AND CLc ENGAGED
"G": PRINCIPALLY FUNCTIONING AS GENERATOR
"M": PRINCIPALLY FUNCTIONING AS MOTOR (OR AS GENERATOR AS NEEDED)
BLANK: RELEASED STATE

FIG.31

| OVERALL SPEED POSITION | | 1st | 2nd | 3rd | 4th | 5th | 6th | 7th | 8th |
|---|---|---|---|---|---|---|---|---|---|
| BASE SPLIT MODE | PATTERN 1 | U/D INPUT SPLIT SUB-MODE | | | DIRECT-ENGINE FORCE-INPUT SUB-MODE | O/D INPUT SPLIT SUB-MODE | | | |
| | PATTERN 2 | U/D INPUT SPLIT SUB-MODE | | | | O/D INPUT SPLIT SUB-MODE | | | |

FIG.46

| DRIVE MODE | | | | | | CL1 | BR1 | CLc | MG1 | MG2 |
|---|---|---|---|---|---|---|---|---|---|---|
| MOTOR DRIVE MODE (EV DRIVE MODE) | FORWARD DRIVE/ REVERSE DRIVE | SINGLE-MOTOR DRIVE | DRIVING | STANDBY SUB-MODES | NORMAL | | | | | M |
| | | | | | O/D INPUT SPLIT | ○ | | | | M |
| | | | | | U/D INPUT SPLIT | | | ○ | | M |
| | | | ASSISTING ENGINE BRAKING | | O/D INPUT SPLIT | △ | | | G | M |
| | | | | | U/D INPUT SPLIT | | | △ | G | M |
| | | TWO-MOTOR DRIVE | | | | ○ | ○ | | M | M |
| ENGINE DRIVE MODE (HV DRIVE MODE) | O/D INPUT SPLIT | FORWARD DRIVE | | | | ○ | | | G | M |
| | | REVERSE DRIVE | REVERSE ENGINE DRIVE FORCE INPUT | | | | ○ | | G | M |
| | | | FORWARD ENGINE DRIVE FORCE INPUT | | | ○ | | | G | M |
| | U/D INPUT SPLIT | FORWARD DRIVE | | | | | | ○ | G | M |
| | | REVERSE DRIVE | FORWARD ENGINE DRIVE FORCE INPUT | | | | | ○ | G | M |
| | FIXED SPEED POSITION | FORWARD DRIVE | DIRECT ENGINE FORCE INPUT | | | ○ | | ○ | | |
| | | | STATIONARY OUTPUT SHAFT | | | | ○ | ○ | G | |

FIG.54

| DRIVE MODE | | | | | | CL1 | BR1 | CLc | MG1 | MG2 |
|---|---|---|---|---|---|---|---|---|---|---|
| MOTOR DRIVE MODE (EV DRIVE MODE) | FORWARD DRIVE/ REVERSE DRIVE | SINGLE-MOTOR DRIVE | DRIVING | STANDBY SUB-MODES | NORMAL | | | | | M |
| | | | | | O/D INPUT SPLIT | | | ○ | | |
| | | | | | U/D INPUT SPLIT | ○ | | | | |
| | | | ASSISTING ENGINE BRAKING | O/D INPUT SPLIT | | | | △ | G | M |
| | | | | U/D INPUT SPLIT | | △ | | | G | M |
| | | TWO-MOTOR DRIVE | | | | ○ | ○ | | M | M |
| ENGINE DRIVE MODE (HV DRIVE MODE) | O/D INPUT SPLIT | FORWARD DRIVE | | | | | | ○ | G | M |
| | | REVERSE DRIVE | FORWARD ENGINE DRIVE FORCE INPUT | | | | | ○ | G | M |
| | U/D INPUT SPLIT | FORWARD DRIVE | LOW DRIVE | | | ○ | | | G | M |
| | | | HIGH DRIVE | | | | ○ | | G | M |
| | | REVERSE DRIVE | FORWARD ENGINE DRIVE FORCE INPUT | | | ○ | | | G | M |
| | FIXED SPEED POSITION | FORWARD DRIVE | DIRECT ENGINE FORCE INPUT | | | ○ | | ○ | | |
| | | | FIXED-SPEED-POSITION O/D INPUT SPLIT | | | | ○ | ○ | | |

FIG.62

| DRIVE MODE | | | | | | CL1 | BR1 | CLc | MG1 | MG2 |
|---|---|---|---|---|---|---|---|---|---|---|
| MOTOR DRIVE MODE (EV DRIVE MODE) | FORWARD DRIVE/ REVERSE DRIVE | SINGLE-MOTOR DRIVE | DRIVING | STANDBY SUB-MODES | NORMAL | | | | | M |
| | | | | | O/D INPUT SPLIT | ○ | | | | |
| | | | | | U/D INPUT SPLIT | | | ○ | | |
| | | | ASSISTING ENGINE BRAKING | O/D INPUT SPLIT | | △ | | | G | M |
| | | | | U/D INPUT SPLIT | | | | △ | G | M |
| | | TWO-MOTOR DRIVE | | | | ○ | ○ | | M | M |
| ENGINE DRIVE MODE (HV DRIVE MODE) | O/D INPUT SPLIT | FORWARD DRIVE | LOW DRIVE | | | | | ○ | G | M |
| | | | HIGH DRIVE | | | | ○ | | G | M |
| | | REVERSE DRIVE | FORWARD ENGINE DRIVE FORCE INPUT | | | ○ | | | G | M |
| | U/D INPUT SPLIT | FORWARD DRIVE | | | | | | ○ | G | M |
| | | REVERSE DRIVE | FORWARD ENGINE DRIVE FORCE INPUT | | | | | ○ | G | M |
| | FIXED SPEED POSITION | FORWARD DRIVE | DIRECT ENGINE FORCE INPUT | | | ○ | | ○ | | |
| | | | FIXED-SPEED-POSITION U/D INPUT SPLIT | | | | | ○ | ○ | | |

CONTROL APPARATUS FOR VEHICULAR POWER TRANSMITTING SYSTEM

This application claims priority from Japanese Patent Application No. 2017-181647 filed on Sep. 21, 2017, the disclosure of which is herein incorporated by reference in its entirety.

FIELD OF THE INVENTION

The present invention relates to a control apparatus for a vehicle provided with a first differential mechanism to which an engine is operatively connected in a power transmittable manner, a second differential mechanism a differential state of which is controlled by controlling an operating state of a first motor/generator, and a second motor/generator operatively connected in a power transmittable manner to an output rotary member connected to drive wheels, and more particularly to a control technique for improving a control response of switching the vehicle from one of different drive modes to another.

BACKGROUND OF THE INVENTION

US-2009-0118936A discloses an example of a known vehicular power transmitting system provided with: a power transmitting mechanism through which a rotary motion of an engine is transmitted; a differential mechanism connecting the power transmitting mechanism and drive wheels to each other; and a switching device for shifting the power transmitting mechanism. The differential mechanism includes a first rotary element connected to an output element of the power transmitting mechanism, a second rotary element connected to the first rotary element, and a third rotary element connected to a second electric motor and the drive wheels.

SUMMARY OF THE INVENTION

By the way, the vehicular power transmitting system described above has a plurality of drive modes which are selectively established by controlling operating states of coupling devices such as clutches and brakes incorporated in the switching device. These drive modes may include a plurality of split modes in which the respective differential states in power transmitting system is controlled to establish respective different power splitting ratios and which are selectively established by controlling the operating states of the coupling devices. When the power transmitting system is switched from one of the split modes to another, functions of a first motor/generator and a second motor/generator are changed after the power transmitting system is once placed in a fixed speed position for synchronization of rotating speeds of the rotary elements. Since the power transmitting system is once placed in the fixed speed position for synchronization of the rotating speeds of the rotary elements, the power transmitting system does not have a sufficiently high degree of control response of switching from one of the split modes to another.

The present invention was made in view of the background art described above. It is therefore an object of the present invention to provide a control apparatus for a vehicular power transmitting system, which permits a high degree of control response of switching the vehicular power transmitting system from one of its different split modes to another.

The object indicated above is achieved according to the following modes of the present invention:

According to a first mode of the invention, there is provided a control apparatus for a vehicular power transmitting system including: a first differential mechanism having a first rotary element, a second rotary element and a third rotary element; a second differential mechanism having a fourth rotary element, a fifth rotary element and a sixth rotary element; a first coupling element for connecting selected two rotary elements of the first, second and third rotary elements to each other; and a second coupling element for connecting the second rotary element to a selected one of the fourth and fifth rotary elements, and wherein the third rotary element is connected to the sixth rotary element, the fifth rotary element is connected to an output shaft, the first rotary element is connected to an engine, the fourth rotary element is connected to a first motor/generator, and the output shaft is connected to a second motor/generator, the control apparatus comprising: a power transmission switching portion configured to selectively establish a first drive mode by placing one of the first and second coupling elements in an engaged state, a second drive mode by placing the other of the first and second coupling elements in an engaged state, or a third drive mode by placing both of the first and second coupling elements in the engaged states, and wherein the power transmission switching portion switches the vehicular power transmitting system between the first and second drive modes through the third drive mode where a predetermined condition is not satisfied, and switches the vehicular power transmitting system between the first and second drive modes with concurrent engaging and releasing actions of the first and second coupling elements where the predetermined condition is satisfied.

According to a second mode of the invention, the predetermined condition is satisfied when a degree of change of a manual operation to accelerate a vehicle provided with the vehicular power transmitting system is higher than a predetermined threshold value.

According to a third mode of the invention, the predetermined condition is satisfied when a sporty drive mode in which a vehicle provided with the vehicular power transmitting system is driven with a high degree of driving performance is selected.

According to a fourth mode of the invention, the first drive mode is a drive mode in which a rotary motion of the engine is output from the output shaft such that a speed of the rotary motion of the engine is reduced with respect to a rotating speed of the output shaft, the second drive mode is a drive mode in which the rotary motion of the engine is output from the output shaft such that the speed of the rotary motion of the engine is raised with respect to the rotating speed of the output shaft, and the third drive mode is a drive mode in which the rotary motion of the engine is output from the output shaft such that the speed of the rotary motion of the engine is equal to the rotating speed of the output shaft.

According to a fifth mode of the invention, the vehicular power transmitting system has a plurality of assignment patterns in each of which plurality overall speed positions are assigned to the first, second and third drive modes, and the power transmission switching portion switches the vehicular power transmitting system between the first and second drive modes through the third drive mode when an assignment pattern in which at least one of the overall speed positions is assigned to the third drive mode is selected, and switches the vehicular power transmitting system between the first and second drive modes with the concurrent engaging and releasing actions of the first and second coupling elements when an assignment pattern in which none of the overall speed positions is assigned to the third drive mode is selected.

According to a sixth mode of the invention, the power transmission switching portion switches the vehicular power transmitting system between the first and second drive modes, on the basis of a required vehicle drive force represented by an amount of operation of an accelerator pedal of the vehicle, and a running speed of the vehicle, and according to a predetermined drive mode switching map having a switching boundary line defining two areas in which the first and second drive modes are respectively selected. When the sporty drive mode is selected, the power transmission switching portion moves the switching boundary line in at least one of a direction in which the running speed is raised, and a direction in which the required vehicle drive force (or applied load) is reduced.

According to the first mode of the invention, the control apparatus for the vehicular power transmitting system is configured to switch the vehicular power transmitting system between the first and second drive modes through the third drive mode, such that the drive mode can be switched from the third drive mode to the first or second drive mode by simply bringing one of the first and second coupling elements into its released state. Accordingly, a change of an operating speed of an engine connected to the vehicular power transmitting system can take place smoothly without a discomfort being given to an operator of a vehicle provided with the vehicular power transmitting system, when the vehicular power transmitting system is switched between the first and second drive modes, whereby a risk of generation of a shifting shock upon switching of the vehicular power transmitting system between the first and second drive modes can be reduced. In addition, where the predetermined condition is satisfied, the vehicular power transmitting system can be switched between the first and second drive modes with the concurrent or synchronous engaging and releasing actions of the first and second coupling elements, with a high degree of switching response. When the vehicular power transmitting system is switched between the first and second drive modes with the concurrent engaging and releasing actions of the first and second coupling elements, the functions of the first motor/generator and the second motor/generator remain unchanged, so that the concurrent engaging and releasing actions of the first and second coupling elements permit switching of the vehicular power transmitting system between the first and second drive modes.

According to the second mode of the invention wherein the predetermined condition is satisfied when the degree of change of the manual operation to accelerate the vehicle is higher than the predetermined threshold value, the vehicular power transmitting system is switched between the first and second drive modes with the concurrent engaging and releasing actions of the first and second coupling elements, during running of the vehicle in a high-load state in which a required drive force of the vehicle is comparatively high, so that the vehicular power transmitting system can be switched between the first and second drive modes with a high degree of switching response.

According to the third mode of the invention wherein the predetermined condition is satisfied when the sporty drive mode in which the vehicle is driven with a high degree of driving performance is selected, the vehicular power transmitting system can be switched between the first and second drive modes with a high degree of switching response, during running of the vehicle in the sporty drive mode.

According to the fourth mode of the invention, the control apparatus for the vehicular power transmitting system is configured such that the power transmission switching portion selectively establishes one of: the first drive mode in which the rotary motion of the engine is output from the output shaft such that the speed of the rotary motion of the engine is reduced with respect to the rotating speed of the output shaft; the second drive mode in which the rotary motion of the engine is output from the output shaft such that the speed of the rotary motion of the engine is raised with respect to the rotating speed of the output shaft; and the third drive mode in which the rotary motion of the engine is output from the output shaft such that the speed of the rotary motion of the engine is equal to the rotating speed of the output shaft. Accordingly, the vehicular power transmitting system is switched between the first and second drive modes, through the third drive mode. The vehicular power transmitting system can be switched from the third drive mode to the first or second drive mode by simply bringing one of the first and second coupling elements into its released state, so that a change of the operating speed of the engine can take place smoothly without a discomfort being given to the vehicle operator when the vehicular power transmitting system is switched between the first and second drive modes, whereby the risk of generation of the shifting shock upon switching of the vehicular power transmitting system between the first and second drive modes can be reduced. In addition, where the predetermined condition described above is satisfied, the vehicular power transmitting system can be switched with the concurrent engaging and releasing actions of the first and second coupling elements, with a high degree of switching response, between the first drive mode and second drive mode.

According to the fifth mode of the invention, the control apparatus for the vehicular power transmitting system is configured to control the vehicular power transmitting system having a plurality of assignment patterns in each of which plurality overall speed positions are assigned to the first, second and third drive modes. In this fifth mode of the invention, the power transmission switching portion switches the vehicular power transmitting system between the first and second drive modes through the third drive mode when the assignment pattern in which at least one of the overall speed positions is assigned to the third drive mode is selected, and switches the vehicular power transmitting system between the first and second drive modes with the concurrent engaging and releasing actions of the first and second coupling elements when the assignment pattern in which none of the overall speed positions is assigned to the third drive mode is selected. In a running state of the vehicle requiring a high degree of fuel economy, the assignment pattern in which at least one of the overall speed positions is assigned to the third drive mode is selected, and the vehicular power transmitting system is shifted between the first and second drive modes, through the third drive mode, so that a risk of generation of a shifting shock upon switching between the first and second drive modes is reduced. In a running state of the vehicle requiring a high degree of acceleration response, the assignment pattern in which none of the overall speed positions is assigned to the third drive mode is selected, and the vehicular power transmitting system is shifted between the first and second drive modes, with the concurrent engaging and releasing actions of the coupling elements, so that a control response of switching between the first and second drive modes can be improved.

According to the sixth mode of the invention, the control apparatus for the vehicular power transmitting system is configured such that the power transmission switching portion switches the vehicular power transmitting system between the first and second drive modes, on the basis of the required vehicle drive force represented by the amount of operation of the accelerator pedal, and the running speed of the vehicle, and according to the predetermined drive mode switching map having the switching boundary line. When the sporty drive mode is selected, the power transmission switching portion moves the switching boundary line in at least one of the direction in which the running speed is raised, and the direction in which the required vehicle drive force (or applied load) is reduced. Namely, the switching boundary line is moved in both or either one of the direction in which the vehicle running speed is raised and the direction in which the required vehicle drive force is reduced. Thus, the switching boundary line is moved such that the area in which the first drive mode is selected is enlarged when the sporty drive mode is selected, so that the driving performance of the vehicle is improved in the sporty drive mode, owing to the concurrent engaging and releasing actions of the first and second coupling elements.

BRIEF DESCRIPTION OF THE DRAWINGS

FIG. 3 is a table indicating the operating states of the coupling elements in different drive sub-modes of the vehicle;

FIG. 31 is a table indicating relationships between an overall speed position of the vehicular power transmitting system and its HV drive sub-modes, in the third embodiment of FIG. 29, wherein a pattern 1 is an assignment pattern where the overall speed positions are assigned to the U/D input split HV drive sub-mode, the O/D input split HV drive sub-mode as well as the fixed-speed-position direct-engine-force-input sub-mode having a high switching response, while a pattern 2 is an assignment pattern where the overall speed positions are assigned to the U/D input split HV drive sub-mode and the O/D input split HV drive sub-mode and are not assigned to the fixed-speed-position direct-engine-force-input sub-mode;

FIG. 46 is a table indicating the operating states of the coupling elements in different drive modes of the vehicle, according to the ninth embodiment of FIG. 43;

FIG. 54 is a view showing a drive mode switching map formulated according to the thirteenth embodiment of FIG. 50, to change the drive mode such that the amount of electric power stored in the battery is held constant;

FIG. 62 is a view showing a drive mode switching map formulated according to the seventeenth embodiment of FIG. 58, to change the drive mode.

DETAILED DESCRIPTION OF PREFERRED EMBODIMENTS

Preferred embodiments of the present invention will be described in detail by reference to the drawings.

First Embodiment

Figure 1:
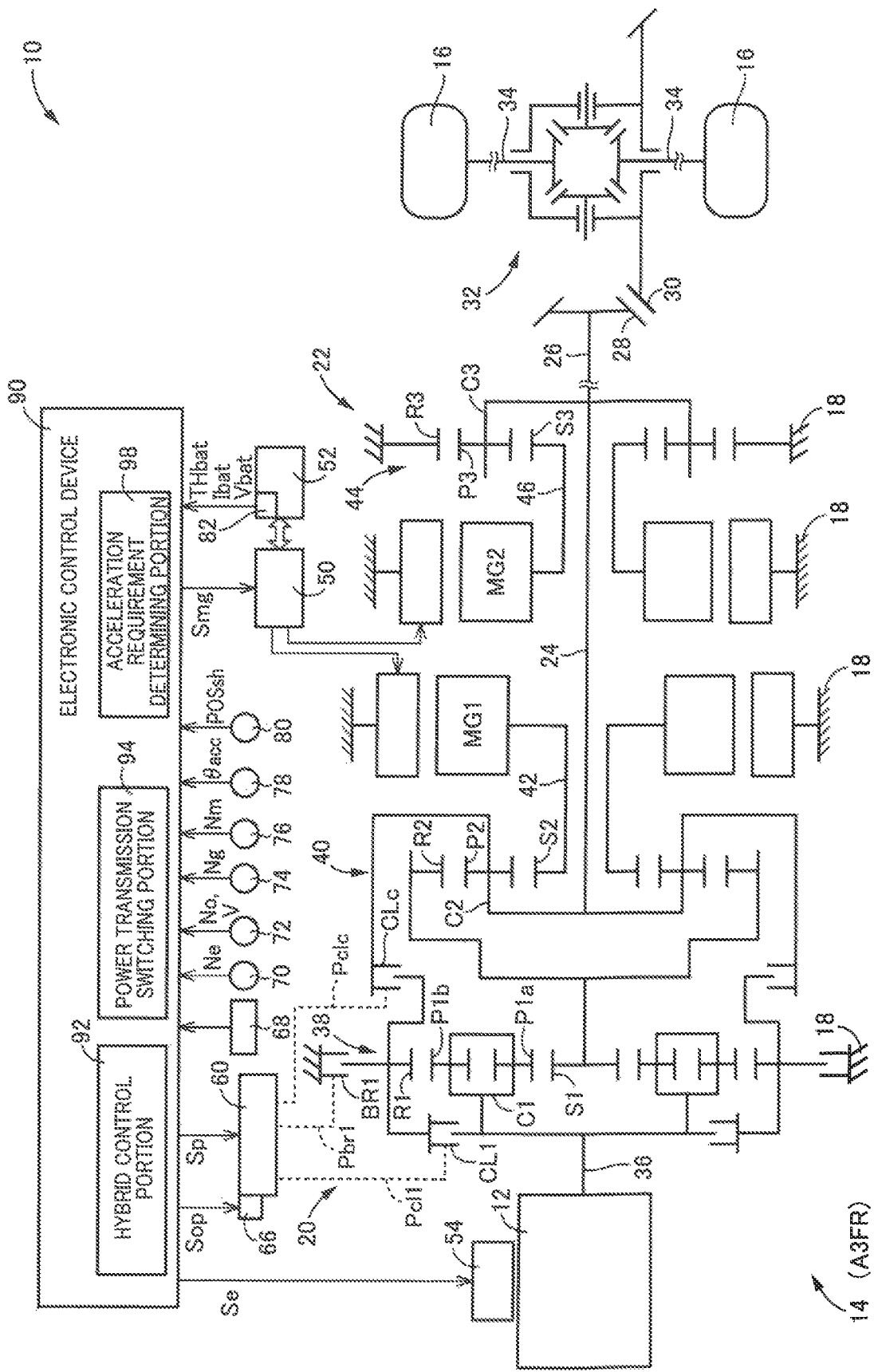
FIG. 1 is a schematic view showing an arrangement of a vehicular power transmitting system having a gear train A3FR according to a first embodiment of this invention, which is controlled by a control apparatus according to the present invention, and major control portions of the control apparatus.

Reference is first made to FIG. 1, which is the schematic view showing an arrangement of a power transmitting system 14 of a vehicle 10 according to a first embodiment of this invention, which has a gear train A3FR and which is controlled by a control apparatus according to the present invention, and major control portions of the control apparatus. As shown in FIG. 1, the vehicle 10 is a hybrid vehicle provided with an engine 12, a first motor/generator MG1, a second motor/generator MG2, the above-indicated power transmitting system (vehicular power transmitting system) 14, and drive wheels 16. The engine 12, first motor/generator MG1 and second motor/generator MG2 may be used as a vehicle drive power source.

The engine 12 is a known internal combustion engine such as a gasoline engine or a diesel engine, which generates a drive force by combustion of a suitable fuel. The engine 12 is controlled by the control apparatus in the form of an electronic control device 90 described below in detail. Described more specifically, the electronic control device 90 controls a torque Te of the engine 12 (engine torque Te), by controlling its operating state as represented by an angle θ of opening of a throttle valve or an intake air quantity, an amount of injection of the fuel, and an ignition timing.

Each of the first motor/generator MG1 and the second motor/generator MG2 has a function of an electric motor to generate a drive torque and a function of an electric generator. The vehicle 10 is further provided with an electric power control unit 50, and an electric power storage unit in the form of a battery unit 52 to and from which an electric power is supplied. The first motor/generator MG1 and the second motor/generator MG2 are connected to the battery unit 52 through the electric power control unit 50, which has an inverter portion and a smoothing capacitor. The electric power control unit 50 is controlled by the electronic control device 90 to control output torques (vehicle driving torques or regenerative torques) of the first motor/generator MG1 and the second motor/generator MG2, which will be hereinafter referred to as "MG1 torque Tg" and "MG2 torque Tm", respectively.

The power transmitting system 14 is disposed in a power transmitting path between the engine 12 and the drive wheels 16, and includes the first motor/generator MG1, second motor/generator MG2, a first power transmitting portion 20 and a second power transmitting portion 22, which are disposed within a casing 18 which is a stationary member fixed to a body of the vehicle 10. The power transmitting system 14 further includes: a propeller shaft 26 connected to an output shaft 24 which is an output rotary member of the first power transmitting portion 20; a drive pinion 28 connected to the propeller shaft 26; a differential gear device 32 meshing with a drive pinion 28 through a differential ring gear 30; and drive axles 34 connected to the differential gear device 32.

The first power transmitting portion 20 is disposed coaxially with its input rotary member in the form of an input shaft 36 connected to a crankshaft of the engine 12, and includes a first differential mechanism 38, a second differential mechanism 40, the first motor/generator MG1, a first coupling element in the form of a clutch CL1, a second coupling element in the form of a clutch CLc, and a third coupling element in the form of a brake BR1.

The first differential mechanism 38 is a known planetary gear mechanism of a double-pinion type which has: a first sun gear S1; pairs of first pinion gears P1a and P1b meshing with each other; a first carrier C1 supporting the first pinion gears P1a, P1b such that each first pinion gear P1a, P1b is rotatable about its axis and about an axis of the first sun gear S1; and a first ring gear R1 meshing with the first sun gear S1 through the first pinion gears P1a and P1b. The first differential mechanism 38 is operable as a differential mechanism having a differential function, and employs a double-pinion type planetary gear set, so that a gear ratio ρ1 (described below) of the first differential mechanism 38 is adequately set. The second differential mechanism 40 is a known planetary gear mechanism of a single-pinion type which has: a second sun gear S2; a second pinion gear P2; a second carrier C2 supporting the second pinion gear P2 such that the second pinion gear P2 is rotatable about its axis and about an axis of the second sun gear S2; and a second ring gear R2 meshing with the second sun gear S2 through the second pinion gear P2. The second differential mechanism 40 is operable as a differential mechanism having a differential function.

In the first differential mechanism 38, the first carrier C1 is integrally connected to the input shaft 36, and functions as a first rotary element RE1 to which the engine 12 is operatively connected in a power transmittable manner through the input shaft 36 and which functions as an input rotary member of the differential mechanism 38. The first ring gear R1 is a second rotary element RE2 which is selectively connected to the casing 18 through the brake BR1. The first sun gear S1 is a third rotary element RE3 which is connected to an input rotary member (namely, the second ring gear R2) of the second differential mechanism 40, and which functions as an output rotary member of the first differential mechanism 38.

In the second differential mechanism 40, the second sun gear S2 is integrally connected to a rotor shaft 42 of the first motor/generator MG1, and functions as a reaction element which is a fourth rotary element RE4 to which the first motor/generator MG1 is operatively connected in a power transmittable manner. The second carrier C2 is connected to the output shaft 24 such that the second carrier C2 is rotated together with the output shaft 24. The second carrier C2 functions as an output element which is connected to the drive wheels 16, and is a fifth rotary element RE5 functioning as an output rotary member of the second differential mechanism 40. The second ring gear R2 is an input element which is connected to the output rotary member in the form of the first sun gear S1 of the first differential mechanism 38, and which is a sixth rotary element RE6 functioning as the input rotary member of the second differential mechanism 40.

The first carrier C1 and the first ring gear R1 are selectively connected to each other through the clutch CL1, while the first ring gear R1 and the second carrier C2 are selectively connected to each other through the clutch CLc. Thus, the clutch CL1 functions as the first coupling element for selectively connecting the first rotary element RE1 and the second rotary element RE2 to each other, while the clutch CLc functions as the second coupling element for selectively connecting the second rotary element RE2 and the fifth rotary element RE5 to each other. Further, the brake BR1 functions as the third coupling element for selectively connecting the second rotary element RE2 to the casing 18. Each of the clutch CL1, clutch CLc and brake BR1 is preferably a frictional coupling device of a wet-type, and a multiple-disk hydraulically operated frictional coupling device an operating state of which is controlled by a hydraulic actuator.

Figure 2:
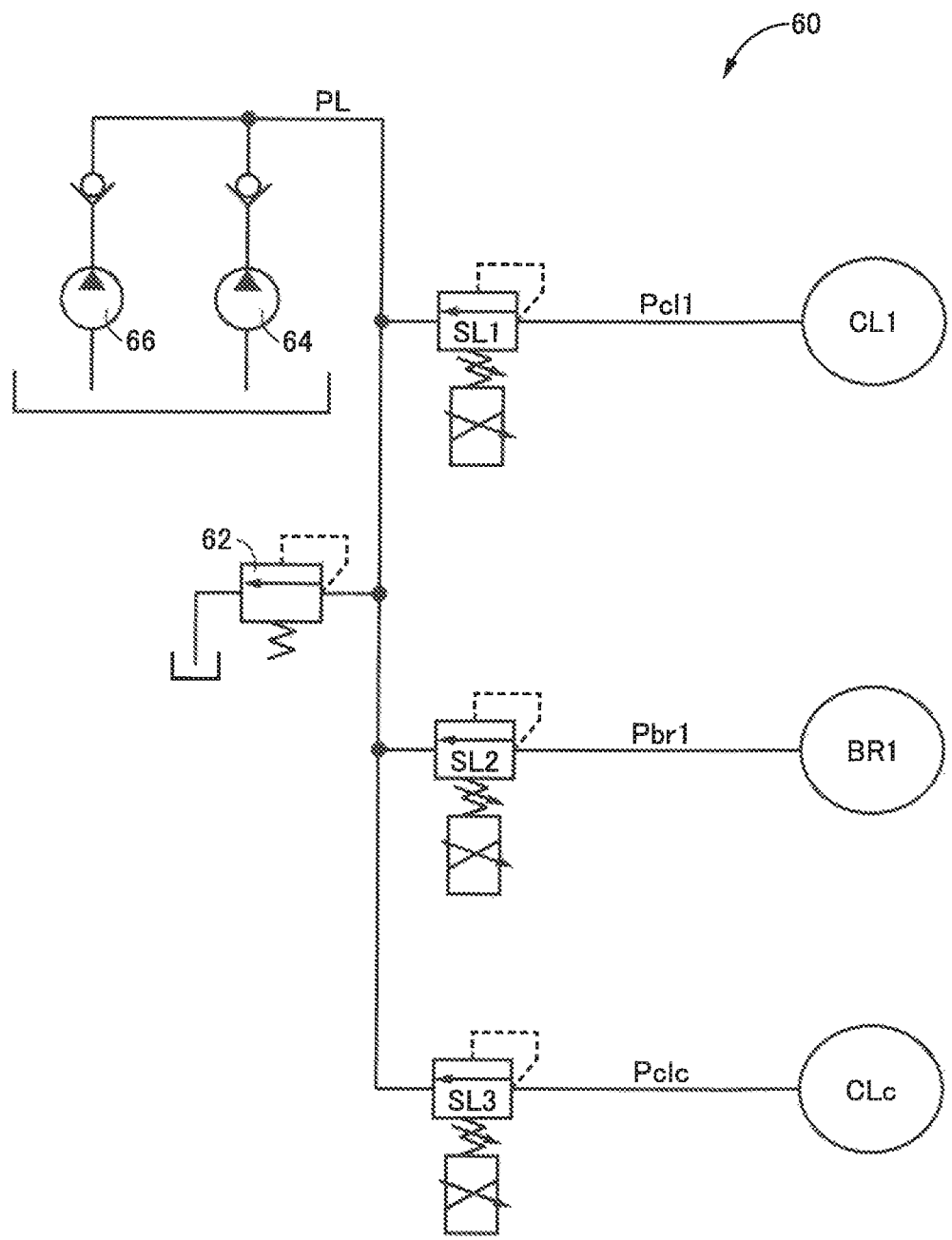
FIG. 2 is a view showing an example of major components of a hydraulic control unit for controlling operating states of coupling elements incorporated in the vehicular power transmitting system.

FIG. 2 is the view showing an example of major components of a hydraulic control unit 60 provided on the vehicle 10, for controlling the operating states (such as engaged state, released state, or the like) of the coupling elements in the form of the clutch CL1, clutch CLc and brake BR1. As shown in FIG. 2, the hydraulic control unit 60 incorporates a primary regulator valve 62, and linear solenoid-operated valves SL1-SL3. The primary regulator valve 62 regulates a line pressure PL by controlling a pressure of a working fluid generated by a mechanically operated oil pump 64 (MOP 64) or an electrically operated oil pump 66 (EOP 66) provided on the vehicle 10. The MOP 64 is connected to a rotary member (element) of the power transmitting system 14, which is rotated while the engine 12 is operated, so that the MOP 64 is operated by the engine 12, to pressurize the working fluid. The EOP 66 is operated by an electric motor (not shown) provided exclusively for the EOP 66, which is operated under the control of the electronic control device 90, to pressurize the working fluid while the engine 12 is held at rest, for instance, in a motor drive mode in which the engine 12 is held at rest. The linear solenoid-operated valve SL1 regulates a pressure of the working fluid applied to the clutch CL1 (CL1 hydraulic pressure Pcl1) by controlling the line pressure PL. The linear solenoid-operated valve SL2 regulates a pressure of the working fluid applied to the brake BR1 (BR1 hydraulic pressure Pbr1) by controlling the line pressure PL. The linear solenoid-operated valve SL3 regulates a pressure of the working fluid applied to the clutch CLc (CLc hydraulic pressure Pclc) by controlling the line pressure PL. The linear solenoid-operated valves SL1-SL3 are basically identical in construction with each other, and are selectively energized or de-energized, or controlled in terms of amounts of electric currents supplied thereto, independently of each other, by the electronic control device 90, so that the hydraulic pressures Pcl1, Pbr1 and Pclc are regulated independently of each other. The coupling elements in the form of the clutch CL1, brake BR1 and clutch CLc are selectively placed in their fully engaged state, fully released state or partially engaged state, according to the respective hydraulic pressures Pcl1, Pbr1 and Pclc applied thereto.

Referring back to FIG. 1, the first differential mechanism 38 can be selectively placed in one of four operating states, with the operating states of the clutch CL1 and the brake BR1 being suitably controlled. The four operating states consist of: a direct-engine-force-input state; an engine-input reversing state; a neutral state; and an internal locking state. Described in detail, the first differential mechanism 38 is placed in the direct-engine-force-input state when the clutch CL1 is placed in its fully engaged state. In this direct-engine-force-input state, all of the rotary elements of the first differential mechanism 38 are rotated as a unit while the first differential mechanism 38 is directly connected to the engine 12. In the fully engaged state of the brake BR1 in which a rotating speed (rpm) of the first ring gear R1 is zeroed, the first differential mechanism 38 is placed in the engine-input reversing state in which the first sun gear S1 (output rotary member of the first differential mechanism 38) is rotated in a negative direction opposite to a positive direction of operation of the engine 12 (having a positive operating speed Ne). In the fully released states of the clutch CL1 and the brake BR1, the first differential mechanism 38 is placed in the neutral state permitting its differential operation. In the fully engaged states of the clutch CL1 and the brake BR1, the first differential mechanism 38 is placed in the internal locking state in which its rotary elements are held stationary.

While the second differential mechanism 40 is permitted to perform its differential operation, the second differential mechanism 40 can function as a power distributing mechanism for distributing (or splitting) the drive force of the engine 12 received by the second ring gear R2, to the first motor/generator MG1 and the second carrier C2. Accordingly, the vehicle 10 can be driven in an engine drive mode in which a reaction force against the engine torque Te received by the second ring gear R2 is received by the first motor/generator MG1. In the engine drive mode, the vehicle 10 can be driven with a torque (directly transmitted engine torque) mechanically transmitted from the engine 12 to the second carrier C2, and the MG2 torque Tm generated by the second motor/generator MG2 which is operated with an electric power generated by the first motor/generator MG1 operated with the drive force distributed thereto. Thus, the second differential mechanism 40 as a known electrically controlled differential portion (electrically controlled continuously variable transmission) a speed ratio of which is controlled with an operating state of the first motor/generator MG1 being controlled by controlling the electric power control unit 50 by the electronic control device 90. Namely, the second differential mechanism 40 is an electrically controlled transmission mechanism a differential state of which is controlled according to the controlled operating state of the first motor/generator MG1.

The first power transmitting portion 20 is operable as an electrically controlled continuously variable transmission a power distributing ratio of which is different from that of the second differential mechanism 40. That is, the first differential mechanism 38 and the second differential mechanism 40 in the first power transmitting portion 20 wherein the first sun gear S1 (third rotary element RE3) and the second ring gear R2 (sixth rotary element RE6) are connected to each other, cooperate to constitute one differential mechanism when the first ring gear R1 (second rotary element RE2) and the second carrier C2 (fifth rotary element RE5) are connected to each other in the engaged state of the clutch CLc.

In the first power transmitting portion 20, the first differential mechanism 38 which is selectively placed in one of the above-indicated four operating states, and the second differential mechanism 40 are connected to each other, so that the vehicle 10 can be driven in a plurality of drive modes described below, by controlling the operating states of the clutch CLc as well as the clutch CL1 and the brake BR1.

In the first power transmitting portion 20 configured as described above, the drive force of the engine 12 and the drive force of the first motor/generator MG1 are transmitted to the output shaft 24. That is, the engine 12 and the first motor/generator MG1 are operatively connected to the drive wheels 16 through the first power transmitting portion 20.

The second power transmitting portion 22 is disposed coaxially with the input shaft 36 (output shaft 24), and includes the second motor/generator MG2, and a speed reduction mechanism 44 connected to the output shaft 24. The speed reduction mechanism 44 is a known planetary gear mechanism of a single-pinion type including a third sun gear S3, a third pinion gear P3, and a third carrier C3, and a third ring gear R3 meshing with the third sun gear S3 through the third pinion gear P3. The third carrier C3 supports the third pinion gear P3 such that the third pinion gear P3 is rotatable about its axis and an axis of the third sun gear S3. The third sun gear S3 is an input rotary element connected to a rotor shaft 46 of the second motor/generator MG2. The third ring gear R3 is a reaction rotary element connected to the casing 18. The third carrier C3 is an output element connected to the output shaft 24. In the speed reduction mechanism 44 constructed as described above, a rotary motion of the second motor/generator MG2 is transmitted to the output shaft 24, such that an operating speed Nm of the second motor/generator MG2 is reduced to a rotating speed of the output shaft 24. In the second power transmitting portion 22, a drive force of the second motor/generator MG2 is transmitted to the output shaft 24 without transmission through the first power transmitting portion 20. Thus, the second motor/generator MG2 is operatively connected to the drive wheels 16 in a power transmittable manner, without transmission through the first power transmitting portion 20. Namely, the second motor/generator MG2 is operatively connected in a power transmittable manner to an output rotary member of the power transmitting system 14 in the form of the drive axles 34, without transmission through the first power transmitting portion 20. The output rotary member of the power transmitting system 14 is a rotary member connected to the drive wheels 16. The output shaft 24 and the propeller shaft 26 as well as the drive axles 34 may also be considered as the output rotary member of the power transmitting system 14.

The thus constructed power transmitting system 14 is suitably used for the vehicle 10 of an FR type (front-engine rear-drive type). In this power transmitting system 14, the drive forces of the engine 12, the first motor/generator MG1 and the second motor/generator MG2 are transmitted to the drive wheels 16 through the output shaft 24, the differential gear device 32 and the drive axles 34, in this order of description.

The vehicle 10 is provided with the electronic control device 90 serving as the control apparatus for controlling the engine 12, power transmitting system 14 and other portions of the vehicle 10. The electronic control device 90 includes a so-called microcomputer incorporating a CPU, a RAM, a ROM and an input/output interface. The CPU performs signal processing operations according to control programs stored in the ROM while utilizing a temporary data storage function of the RAM, to implement various controls of the vehicle 10. For instance, the electronic control device 90 implements output controls of the engine 12, first motor/generator MG1 and second motor/generator MG2, and drive mode switching controls of the power transmitting system 14. The electronic control device 90 may consist of separate units including an engine control unit, a motor/generator control unit, and a hydraulic control unit.

The electronic control device 90 is configured to receive output signals of various switches and sensors provided on the vehicle 10, such as: an output signal of a drive mode selector switch 68 indicative of a presently established one of an economy drive mode, a normal drive mode and a power drive mode (e.g. sporty drive mode); an output signal of an engine speed sensor 70 indicative of the engine speed Ne; an output signal of an output speed sensor 72 indicative of a rotating speed No of the output shaft 24, which corresponds to a running speed V of the vehicle 10; an output signal of an MG1 speed sensor 74 (e.g., a resolver) indicative of an operating speed Ng of the first motor/generator MG1; an output signal of an MG2 speed sensor 76 (e.g., a resolver) indicative of the operating speed Nm of the second motor/generator MG2; an output signal of an accelerator pedal operation amount sensor 78 indicative of an operation amount θacc of an accelerator pedal; an output signal of a shift position sensor 80 indicative of a presently selected one of operating positions POSsh of a shift lever such as a parking position P, a reverse drive position R, a neutral position N and a forward drive position D; and output signals of a battery sensor 82 indicative of a temperature THbat, a charging/discharging electric current Ibat and a voltage Vbat of the battery unit 52. The electronic control device 90 is further configured to generate output signals to be applied to various devices of the vehicle 10, such as: engine control command signals Se applied to an engine control device 54 to control a throttle actuator, a fuel injecting device, an igniting device and other devices of the engine 12; motor/generator control command signals Smg to be applied to the electric power control unit 50 to control the first motor/generator MG1 and the second motor/generator MG2; hydraulic control command signals Sp to be applied to the hydraulic control unit 60 to control the coupling elements, that is, the clutch CL1, brake BR1 and clutch CLc;

and a pump drive control command signal Sop to be applied to the EOP 66 to operate the EOP 66. The electronic control device 90 calculates an amount SOC of the electric power stored in the battery unit 52 as a parameter representative of a charging state of the battery unit 52, on the basis of the charging/discharging electric current Ibat and the voltage Vbat.

The electronic control device 90 includes hybrid control means in the form of a hybrid control portion 92, power transmission switching means in the form of a power transmission switching portion 94, and acceleration requirement determining means in the form of an acceleration requirement determining portion 98, in order to implement various controls of the vehicle 10.

The hybrid control portion 92 is configured to generate the engine control command signals Se for controlling the angle θ of opening of the throttle valve, the amount of injection of the fuel, a timing of the fuel injection, and the ignition timing, to thereby control the output of the engine 12 such that the engine torque Te coincides with a target value. The hybrid control portion 92 is further configured to generate the motor/generator control command signals Smg for controlling the operating states of the first motor/generator MG1 and the second motor/generator MG2. These motor/generator control command signals Smg are applied to the electric power control unit 50 to control the outputs of the first motor/generator MG1 and the second motor/generator MG2 such that the MG1 torque Tg and the MG2 torque Tm coincide with respective target values.

The hybrid control portion 92 is also configured to calculate a required vehicle drive torque on the basis of the accelerator pedal operation amount θacc and the vehicle running speed V, and to command at least one of the engine 12, first motor/generator MG1 and second motor/generator MG2 to generate the calculated required vehicle drive torque, while taking account of a required amount of charging of the battery unit 52, so that the vehicle 10 is driven with a high degree of fuel economy and with a reduced amount of emission of exhaust gases.

The hybrid control portion 92 is further configured to selectively establish one of a motor drive mode (EV drive mode) and a hybrid drive mode (HV drive mode: also referred to as "engine drive mode"), according to running state of the vehicle 10. In the EV drive mode, at least one of the first motor/generator MG1 and the second motor/generator MG2 is operated as a vehicle drive power source while the engine 12 is held at rest. In the HV drive mode (engine drive mode), at least the engine 12 is operated as the vehicle drive power source, so that at least the drive force of the engine 12 is transmitted to the drive wheels 16 to drive the vehicle 10. It is noted that the HV drive mode is considered to include a state of the vehicle 10 in which the vehicle 10 is not directly driven by the engine 12 while the engine 12 is driving and the first motor/generator MG1 is operated with the drive force of the engine 12 to generate an electric power which is primarily used to charge the battery unit 52.

The power transmission switching portion 94 is configured to control the operating states of the clutch CL1, brake BR1 and clutch CLc, according to the drive mode selected by the hybrid control portion 92. The power transmission switching portion 94 applies the hydraulic control command signals Sp to the hydraulic control unit 60, for placing the clutch CL1, brake BR1 and clutch CLc in the engaged or released state, so that the vehicle drive force is transmitted to drive the vehicle 10 in the drive mode selected by the hybrid control portion 92.

As indicated in FIG. 3, the motor drive mode (EV drive mode) includes a plurality of sub-modes, and the engine drive mode (HV drive mode) includes a plurality of sub-modes. These sub-modes will be described by reference to FIGS. 4-19. FIG. 3 is the table indicating the operating states of the coupling elements (clutch CL1, brake BR1 and clutch CLc) in the different drive sub-modes of the vehicle 10. In the table, "○" indicates an engaged state of the coupling elements (clutch CL1, brake BR1 and clutch CLc), and a blank indicates a released state of the coupling elements, while "Δ" indicates an engaged state of at least one of the coupling elements (clutch CL1 or CLc) (depending on running status) in an engine braking state of the vehicle 10 in which the engine 12 placed in its non-operated state is forcibly driven with a reverse drive force transmitted from the drive wheels 16. Further, "G" indicates that the motor/generator (MG1 or MG2) is operated primarily as an electric generator, while "M" indicates that the motor/generator is operated primarily as an electric motor to drive the vehicle 10, or as an electric generator to perform a regenerative operation. As indicated in FIG. 3, the vehicle 10 is driven in a selected one of the EV drive mode and the HV drive mode. The EV drive mode includes two kinds of sub-modes: single-motor-drive EV drive sub-modes in which only the second motor/generator MG2 is used as the vehicle drive power source; and a two-motor-drive EV drive sub-mode in which both of the first motor/generator MG1 and the second motor/generator MG2 are used as the vehicle drive power source. The HV drive mode includes three sub-modes: an overdrive (O/D) input split HV drive sub-mode; an under drive (U/D) input split HV drive sub-mode; and a fixed speed position sub-mode.

FIGS. 4-19 are the collinear charts indicating the relative rotating speeds of the rotary elements RE1-RE6 of the first differential mechanism 38 and the second differential mechanism 40. In these collinear charts, vertical lines Y1-Y4 which are spaced apart from each other in a horizontal direction and which are positioned in this order of description in a rightward direction indicate the rotating speeds of the rotary elements RE1-RE6. The vertical line Y1 represents the rotating speed of the fourth rotary element RE4 in the form of the second sun gear S2 connected to the first motor/generator MG1. The vertical line Y2 represents the rotating speed of the first rotary element RE1 in the form of the first carrier C1 connected to the engine 12 (represented as "ENG" in the collinear charts). The vertical line Y3 represents the rotating speed of the second rotary element RE2 in the form of the first ring gear R1 which is selectively connected to the casing 18 through the brake BR1, and the rotating speed of the fifth rotary element RE5 in the form of the second carrier C2 connected to the output shaft 24 (represented as "OUT" in the collinear charts). The vertical line Y4 represents the rotating speeds of the third rotary element RE3 in the form of the first sun gear S1 and the sixth rotary element RE6 in the form of the second ring gear R2 which are connected to each other. The output shaft 24 is connected to the second motor/generator MG2 through the speed reduction mechanism 44. In the collinear charts, an arrow-headed line extending from a white square mark "□" represents the MG1 torque Tg, and an arrow-headed line extending from a white circle mark "○" represents the engine torque Te, while an arrow-headed line extending from a black circle mark "●" represents the MG2 torque Tm. A non-hatched symbol of the clutch CL1 for selectively connecting the first carrier C1 and the first ring gear R1 indicates that the clutch CL1 is placed in its released state, while a hatched symbol of the clutch CL1 indicates that the clutch CL1 is placed in its engaged state. Further, a white diamond mark "◇" in connection with the brake BR1 for selectively connecting the first ring gear R1 to the casing 18 indicates that the brake BR1 is placed in its released state, while a black diamond mark "◆" in connection with the brake BR1 indicates that the brake BR1 is placed in its engaged state. A white diamond mark "◇" in connection with the clutch CLc for selectively connecting the first ring gear R1 and the second carrier C2 to each other indicates that the clutch CLc is placed in its released state, while a black diamond mark "◆" in connection with the clutch CLc indicates that the clutch CLc is placed in its engaged state. Further, broken lines represent the relative rotating speeds of the rotary elements of the first differential mechanism 38, while solid lines represent the relative rotating speeds of the rotary elements of the second differential mechanism 40. It is noted that the MG2 torque Tm represented by the arrow-headed line extending from the black circle mark "●" is the torque generated by the second motor/generator MG2 operated with an electric power generated by the first motor/generator MG1 operated with a portion of the drive force of the engine 12 distributed thereto, and/or an electric power supplied from the battery unit 52, but does not include a torque directly received from the engine 12. The black diamond mark "◆" overlapping the black circle mark "●" is not shown in the collinear charts. Distances between the adjacent ones of the vertical lines Y1, Y2, Y3 and Y4 are determined by gear ratios ρ1 and ρ2 of the differential mechanisms 38 and 40. Where a distance between the vertical lines representing the rotating speeds of the sun gear and the carrier is supposed to correspond to "1", a distance between the vertical lines representing the rotating speeds of the carrier and the ring gear corresponds to the gear ratio ρ of the relevant planetary gear device 38 or 40 (ρ=number of teeth of the sun gear/number of teeth of the ring gear).

Figure 4:
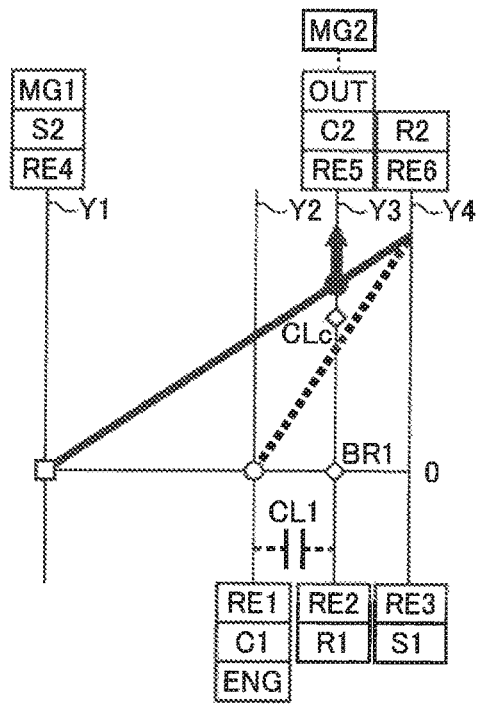
FIG. 4 is a collinear chart indicating relative rotating speeds of rotary elements of the vehicular power transmitting system when it is placed in its single-motor-drive EV forward drive sub-mode.
Figure 5:
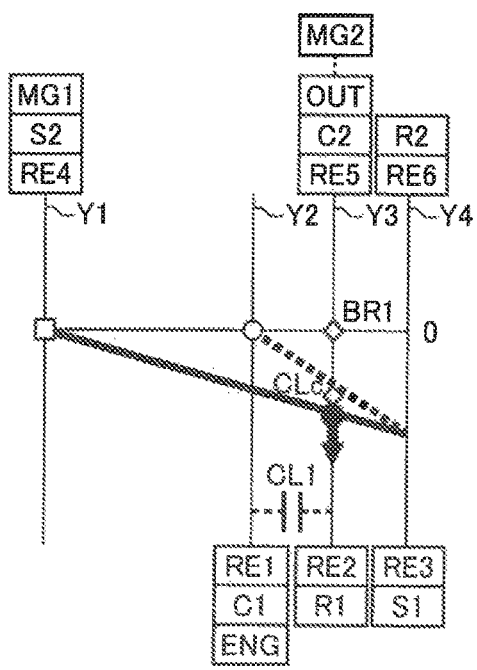
FIG. 5 is a collinear chart indicating the relative rotating speeds of the rotary elements when the vehicular power transmitting system is paced in its single-motor-drive EV reverse drive sub-mode.

FIGS. 4 and 5 are the collinear charts indicating relative rotating speeds of the rotary elements RE1-RE6 when the power transmitting system 14 is placed in its single-motor-drive EV drive sub-modes. In a normal sub-mode (represented as "NORMAL" in FIG. 3) of the single-motor-drive EV drive sub-mode, all of the clutch CL1, brake BR1 and clutch CLc are placed in the released states. In this normal sub-mode in which the clutch CL1 and the brake BR1 in the first differential mechanism 38 are placed in the released states, the first differential mechanism 38 is permitted to perform its differential function, and is placed in its neutral state. The hybrid control portion 92 commands the engine 12 to be held at rest, and commands the second motor/generator MG2 to generate the MG2 torque Tm. In the case of FIG. 4, the vehicle 10 is driven in the forward direction, with a positive torque of the second motor/generator MG2 operated in a positive direction (corresponding to a rotation direction of the second carrier C2 during forward driving of the vehicle 10). In the case of FIG. 5, the vehicle 10 is driven in the rearward direction, with a negative torque of the second motor/generator MG2 operated in a negative direction (corresponding to a rotation direction of the second carrier C2 during rearward driving of the vehicle 10). During running of the vehicle 10, the second carrier C2 connected to the output shaft 24 is rotated in synchronization with the rotary motion of the second motor/generator MG2 (the rotary motions of the drive wheels 16). In the normal sub-mode of the single-motor-drive EV drive sub-mode in which the clutch CLc is also placed in the released state, the engine 12 and the first motor/generator MG1 are not forcibly driven and are held stationary, so that the engine speed Ne and the MG1 speed Ng are kept at zero. Accordingly, an energy loss due to dragging of the engine 12 and the first motor/generator MG1 is reduced, and an amount of consumption of electric power can be reduced. The hybrid control portion 92 implements a feedback control to keep the MG1 speed Ng at zero. Alternatively, the hybrid control portion 92 implements a d-axis locking control so as to control an electric current applied to the first motor/generator MG1 so that the MG1 speed Ng is kept at zero. Where the MG1 speed Ng can be held at zero with a cogging torque of the first motor/generator MG1 even when the MG1 torque Tg is kept at zero, the first motor/generator MG1 need not be controlled to generate the MG1 torque Tg. It is noted that the control to keep the MG1 speed Ng at zero does not affect the vehicle drive torque, since the first power transmitting portion 20 is placed in its neutral state in which the first power transmitting portion 20 cannot withstand a reaction force against the MG1 torque Tg. Alternatively, the first motor/generator MG1 may be freely rotated in a non-load state, in the single-motor-drive EV drive sub-mode.

Figure 6:
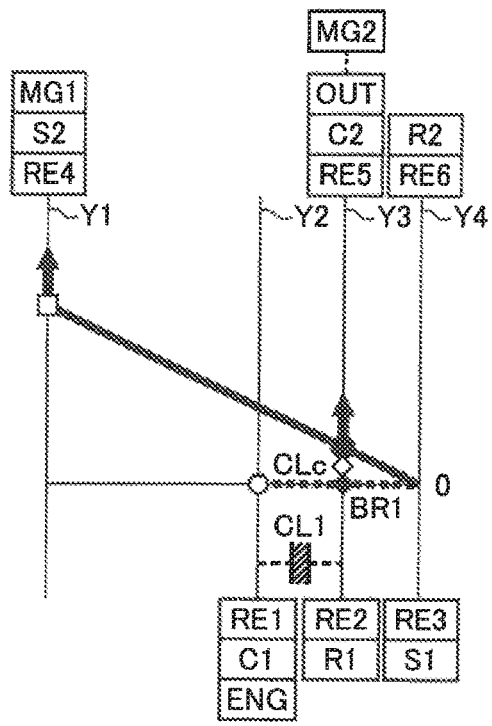
FIG. 6 is a collinear chart indicating the relative rotating speeds of the rotary elements when the vehicular power transmitting system is placed in its two-motor-drive EV forward drive sub-mode.
Figure 7:
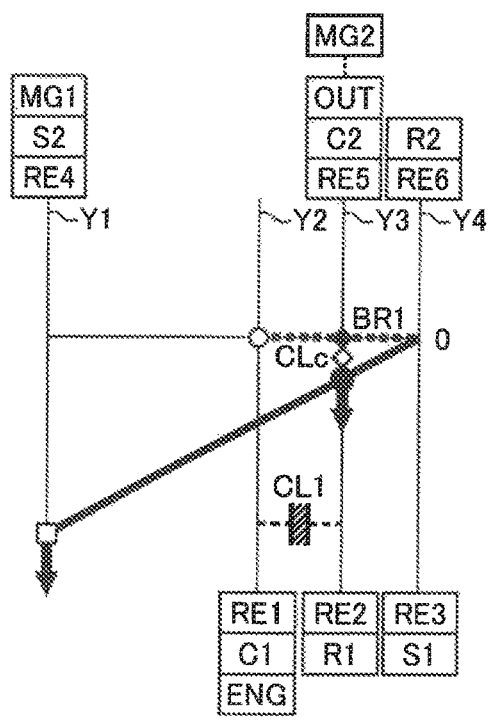
FIG. 7 is a collinear chart indicating the relative rotating speeds of the rotary elements when the vehicular power transmitting system is placed in its two-motor-drive EV reverse drive sub-mode.

FIGS. 6 and 7 are the collinear charts indicating the relative rotating speeds of the rotary elements RE1-RE6 when the power transmitting system 14 is placed in its two-motor-drive EV drive sub-mode. The two-motor-drive EV drive sub-mode (represented as "TWO-MOTOR DRIVE" in FIG. 3) is established in the engaged states of the clutch CL1 and the brake BR1, and in the released state of the clutch CLc. In the two-motor-drive EV drive sub-mode in which the clutch CL1 and the brake BR1 are placed in the engaged states, the differential operation of the first differential mechanism 38 is restricted, and the first ring gear R1 is held stationary. Accordingly, all of the rotary elements of the first differential mechanism 38 are held stationary, and the first differential mechanism 38 is placed in its internal locking state. Further, the second ring gear R2 connected to the first sun gear S1 is also held stationary, so that the second ring gear R2 can withstand a reaction force against the MG1 torque Tg, whereby a torque based on the MG1 torque Tg can be mechanically generated from the second carrier C2, and transmitted to the drive wheels 16. The hybrid control portion 92 commands the engine 12 to be held at rest, and commands the first motor/generator MG1 and the second motor/generator MG2 to generate the respective MG1 torque Tg and MG2 torque Tm. The collinear chart of FIG. 6 indicates the rotating speeds of the rotary elements RE1-RE6 when the vehicle 10 is driven in the forward direction, with the positive torques Tg and Tm generated by the respective first motor/generator MG1 and second motor/generator MG2 operated in the position direction. On the other hand, the collinear chart of FIG. 7 indicates the rotating speeds of the rotary elements RE1-RE6 when the vehicle 10 is driven in the rearward direction, with the negative torques Tg and Tm generated by the first motor/generator MG1 and second motor/generator MG2 operated in the negative direction.

As described above by reference to FIGS. 4-7, the vehicle 10 can be driven by only the second motor/generator MG2 in the single-motor-drive EV drive sub-mode, and by both of the first motor/generator MG1 and the second motor/generator MG2 in the two-motor-drive EV drive sub-mode. Accordingly, the vehicle 10 is driven by only the second motor/generator MG2 in the single-motor-drive EV drive sub-mode, while the vehicle 10 is in a low-load state, and by both of the first motor/generator MG1 and the second motor/generator MG2 in the two-motor-drive EV drive sub-mode, while the vehicle 10 is in a high-load state. It is noted that the second motor/generator MG2 is principally controlled to perform a regenerative operation during deceleration of the vehicle 10 even in the engine drive mode.

When the second motor/generator MG2 performs the regenerative operation during running of the vehicle 10 in the single-motor-drive EV drive sub-mode, the engine 12 held at rest is not forcibly driven and is held stationary with its speed Ne kept at zero, so that a large amount of electric power can be generated by the second motor/generator MG2. When the battery unit 52 is fully charged during running of the vehicle 10 in the single-motor-drive EV drive sub-mode, on the other hand, the battery unit 52 cannot be further charged with the electric power generated by the regenerative operation, so that a regenerative braking torque cannot be applied to the vehicle 10. When the battery unit 52 is fully charged in the single-motor-drive EV drive sub-mode so that the regenerative operation is not permitted, it is considered possible to apply an engine brake to the vehicle 10. When the battery unit 52 is not fully charged but is almost fully or considerably charged in the single-motor-drive EV drive sub-mode, it is considered possible to apply an assisting engine braking torque to the vehicle 10, in addition to the regenerative braking torque. When the electric power amount SOC stored in the battery unit 52 is so small that a sufficiently large amount of electric power cannot be supplied to the second motor/generator MG2 during running of the vehicle 10 in the single-motor-drive EV drive sub-mode, the second motor/generator MG2 cannot be operated as needed. In this case, it is considered possible to switch the drive mode from the EV drive mode to the engine drive mode (HV drive mode). In view of the situations described above, the EV drive mode includes standby sub-modes for quick application of the engine brake or for preparation for quick switching to the engine drive mode, and an assisting engine braking sub-mode in which the assisting engine braking torque is applied to the vehicle 10, in addition to the regenerative braking torque.

Figure 8:
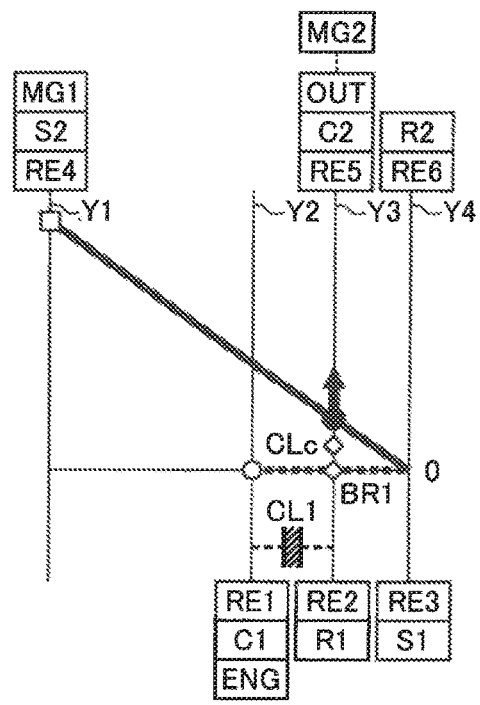
FIG. 8 is a collinear chart indicating the relative rotating speeds of the rotary elements when the vehicular power transmitting system is placed in its U/D input split standby sub-mode.
Figure 9:
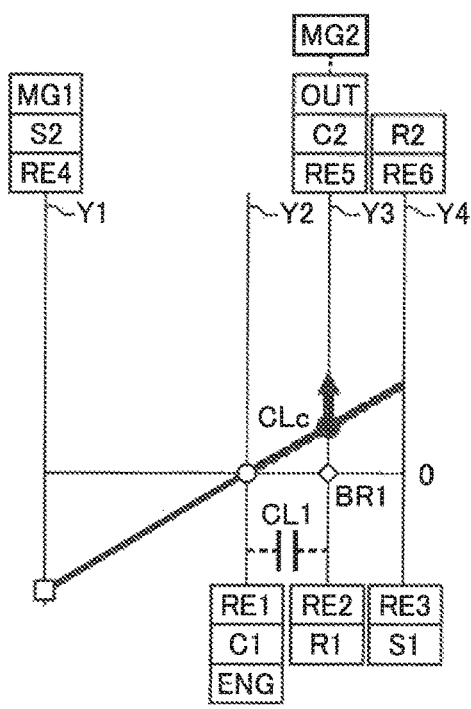
FIG. 9 is a collinear chart indicating the relative rotating speeds of the rotary elements when the vehicular power transmitting system is placed in its O/D input split standby sub-mode.

FIGS. 8 and 9 are the collinear charts indicating the relative rotating speeds of the rotary elements RE1-RE6 when the power transmitting system 14 is placed in its standby sub-modes of the EV drive mode. As indicated in the table of FIG. 3, the standby sub-modes (represented as "STANDBY SUB-MODES" in the table) are established in the engaged state of the clutch CL1 or the clutch CLc. While the engine 12 is forcibly driven in the engaged state of the clutch CL1 or CLc, the first motor/generator MG1 is freely rotatable in a non-load state in the standby sub-modes, so that the engine 12 held at rest is held stationary in the standby sub-modes. In the standby sub-modes, therefore, the second motor/generator MG2 can be operated as an electric motor to drive the vehicle 10 or to perform a regenerative operation, without application of an engine brake to the vehicle 10. When the engine speed Ne is raised by the first motor/generator MG1 in the standby sub-modes, the first motor/generator MG1 can withstand a reaction force against the engine torque Te (negative value), so that an engine brake according to the engine speed Ne can be applied to the vehicle 10. Further, when the engine 12 is ignited after the engine speed Ne has been raised by the first motor/generator MG1 in the standby sub-modes, the vehicle drive mode can be switched to the engine drive mode.

The operating states of the coupling elements (clutch CL1, brake BR1 and clutch CLc) in the standby sub-mode in which the clutch CL1 is placed in the engaged state as indicated in FIG. 8 are the same as in a U/D input split HV forward drive sub-mode described below. The standby sub-mode in which the clutch CL1 is placed in the engaged state and the engine 12 is held at rest will be referred to as a "U/D input split standby EV drive sub-mode".

The operating states of the coupling elements (clutch CL1, brake BR1 and clutch CLc) in the standby sub-mode in which the clutch CLc is placed in the engaged state as indicated in FIG. 9 are the same as in an O/D input split HV forward drive sub-mode described below. The standby sub-mode in which the clutch CLc is placed in the engaged state and the engine 12 is held at rest will be referred to as an "O/D input split standby EV drive sub-mode".

Figure 10:
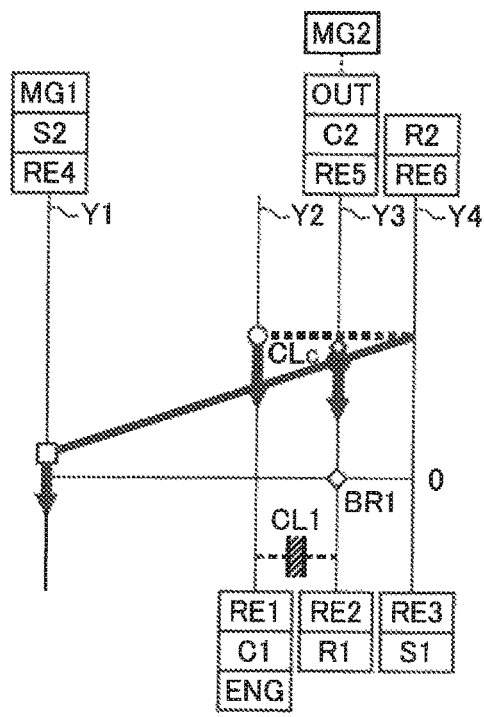
FIG. 10 is a collinear chart indicating the relative rotating speeds of the rotary elements when the vehicular power transmitting system is placed in its U/D input split engine-braking EV drive sub-mode.
Figure 11:
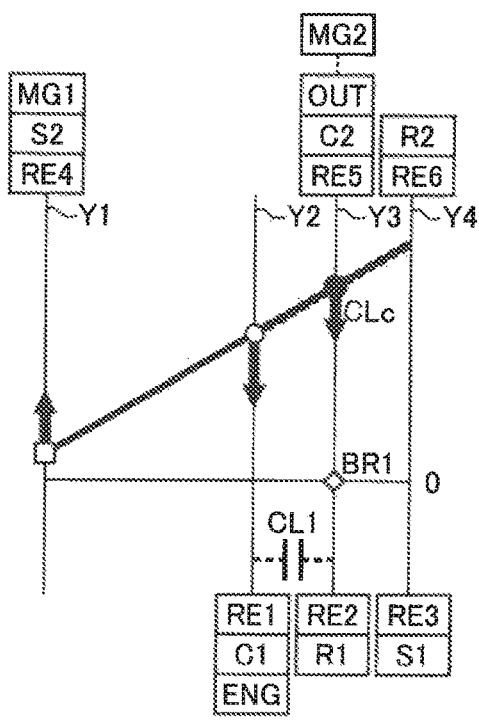
FIG. 11 is a collinear chart indicating the relative rotating speeds of the rotary elements when the vehicular power transmitting system is placed in its O/D input split engine-braking EV drive sub-mode.

FIGS. 10 and 11 are the collinear charts indicating the relative rotating speeds of the rotary elements RE1-RE6 when the power transmitting system 14 is placed in its engine-braking EV drive sub-modes. These engine-braking EV drive sub-modes (represented as "ASSISTING ENGINE BRAKING" in FIG. 3) are established in the engaged state of the clutch CL1 or CLc. Since the engine 12 is forcibly driven in the engaged state of the clutch CL1 or CLc, the first motor/generator MG1 can withstand a reaction force against the engine torque Te (negative value) while controlling the engine speed Ne, in the engine-braking EV drive sub-modes, so that an engine brake according to the engine speed Ne can be applied to the vehicle 10. In the engine-braking EV drive sub-modes, therefore, the engine brake can be applied to the vehicle 10, in addition to or in place of a regenerative brake by the second motor/generator MG2. Further, an engine brake can be applied to the vehicle 10 by placing the clutch CL1 or CLc in the engaged state, without a need of the first motor/generator MG1 to withstand the reaction force against the engine torque Te (negative value). The operating states of the coupling elements CL1, BR1 and CLc in the engine-braking EV drive sub-modes in which the clutch CL1 and the clutch CLc are engaged, are the same as in a fixed-speed-position direct-engine-force-input HV drive sub-mode described below.

The operating states of the coupling elements CL1, BR1 and CLc in the engine-braking EV drive sub-mode in which the clutch CL1 is placed in the engaged state as indicated in FIG. 10 are the same as in a U/D input split HV forward drive sub-mode described below. The engine-braking EV drive sub-mode in which the clutch CL1 is placed in the engaged state and the engine 12 is held at rest will be referred to as a "U/D input split engine-braking EV drive sub-mode".

The operating states of the coupling elements CL1, BR1 and CLc in the engine-braking EV drive sub-mode in which the clutch CLc is placed in the engaged state as indicated in FIG. 11 are the same as in an O/D input split HV forward drive sub-mode described below. The engine-braking EV drive sub-mode in which the clutch CLc is placed in the engaged state will be referred to as an "O/D input split engine-braking EV drive sub-mode".

Figure 12:
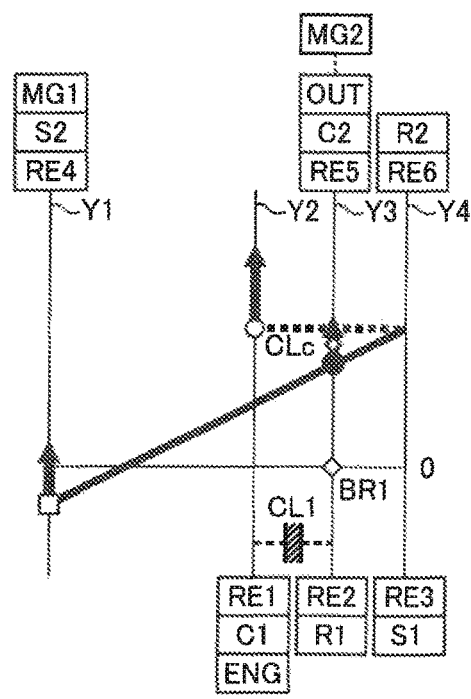
FIG. 12 is a collinear chart indicating the relative rotating speeds of the rotary elements when the vehicular power transmitting system is placed in its U/D input split HV forward drive sub-mode.

FIG. 12 is the collinear chart indicating the relative rotating speeds of the rotary elements RE1-RE6 when the power transmitting system 14 is placed in its U/D input split HV forward drive sub-mode. The U/D input split HV forward drive sub-mode (represented as "U/D INPUT SPLIT" and "FORWARD DRIVE" in FIG. 3) is established in the engaged state of the clutch CL1 and in the released states of the brake BR1 and the clutch CLc. In the U/D input split HV forward drive sub-mode in which the clutch CL1 is placed in the engaged state while the brake BR1 is placed in the released state, the first differential mechanism 38 is connected directly to the engine 12 such that the drive force of the engine 12 received by the first carrier C1 is transmitted directly to the second ring gear R2 connected to the first sun gear S1. In addition, the second differential mechanism 40 alone functions as an electrically controlled continuously variable transmission, in the U/D input split HV forward drive sub-mode in which the clutch CLc is placed in the released state. In the first power transmitting portion 20, therefore, the drive force of the engine 12 received by the second ring gear R2 can be distributed to the second sun gear S2 and the second carrier C2. Namely, the first motor/generator MG1 receives the reaction force against the engine torque Te transmitted to the second ring gear R2 in the first power transmitting portion 20, so that the engine torque Te is mechanically transmitted directly to the second carrier C2, and an electric power generated by the first motor/generator MG1 operated with a portion of the drive force of the engine 12 distributed thereto is supplied to the second motor/generator MG2 through a suitable electric path. The hybrid control portion 92 commands the engine 12 to be operated (started), and commands the first motor/generator MG1 to operate as an electric generator for generating the MG1 torque Tg corresponding to the reaction force against the engine torque Te, so that the second motor/generator MG2 is operated with the electric power generated by the first motor/generator MG1, to generate the MG2 torque Tm. The hybrid control portion 92 may command the second motor/generator MG2 to be operated with a sum of the electric power generated by the first motor/generator MG1 and an electric power supplied from the battery unit 52. In the example of FIG. 12, the vehicle 10 is driven in the forward direction with a positive torque generated by the second motor/generator MG2 operated in a positive direction. Namely, the U/D input split HV forward drive sub-mode is a first forward drive mode in which the engine speed Ne is lowered with an engaging action of the clutch CL1 (first coupling element which is one of the clutches CL1 and CLc), as indicated in FIG. 12, and the drive force of the engine 12 is transmitted to the output shaft 24.

Figure 13:
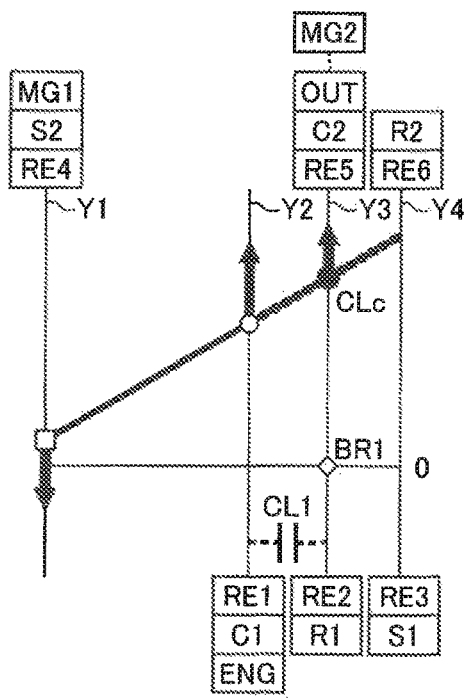
FIG. 13 is a collinear chart indicating the relative rotating speeds of the rotary elements when the vehicular power transmitting system is placed in its O/D input split HV forward drive sub-mode.

FIG. 13 is the collinear chart indicating the relative rotating speeds of the rotary elements RE1-RE6 when the power transmitting system 14 is placed in its O/D input split HV forward drive sub-mode. The O/D input split HV forward drive sub-mode (represented as "O/D INPUT SPLIT" and "FORWARD DRIVE" in FIG. 3) is established in the released states of the clutch CL1 and the brake BR1 and in the engaged state of the clutch CLc. In the O/D input split HV forward drive sub-mode in which the clutch CLc is placed in the engaged state, the first differential mechanism 38 and the second differential mechanism 40 cooperate to function as a single differential device. In addition, in the O/D input split HV forward drive sub-mode in which the clutch CL1 and the brake BR1 are placed in the released states, the first differential mechanism 38 and the second differential mechanism 40 cooperate to function as an electrically controlled continuously variable transmission a proportion of distribution of the engine drive force of which is different from that of the second differential mechanism 40 alone. In the first power transmitting portion 20, therefore, the drive force of the engine 12 received by the first carrier C1 can be distributed to the second sun gear S2 and the second carrier C2. Namely, the first motor/generator MG1 can receive the reaction force against the engine torque Te transmitted to the first carrier C1 in the first power transmitting portion 20, so that the engine torque Te is mechanically transmitted directly to the second carrier C2, and an electric power generated by the first motor/generator MG1 operated with a portion of the drive force of the engine 12 distributed thereto is supplied to the second motor/generator MG2 through a suitable electric path. The hybrid control portion 92 commands the engine 12 to be operated (started), and commands the first motor/generator MG1 to operate as an electric generator for generating the MG1 torque Tg corresponding to the reaction force against the engine torque Te, so that the second motor/generator MG2 is operated with the electric power generated by the first motor/generator MG1, to generate the MG2 torque Tm. In the example of FIG. 13, the vehicle 10 is driven in the forward direction with a positive torque generated by the second motor/generator MG2 operated in a positive direction. Namely, the O/D input split HV forward drive sub-mode is a second forward drive mode in which the engine speed Ne is raised with an engaging action of the clutch CLc (second coupling element which is the other of the clutches CL1 and CLc), as indicated in FIG. 13, and the drive force of the engine 12 is transmitted to the output shaft 24.

Figure 14:
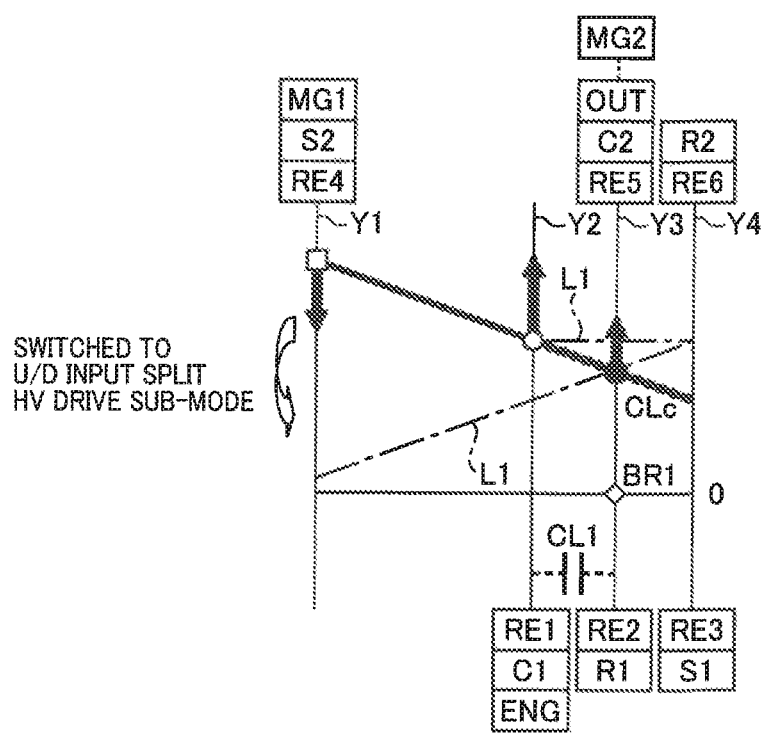
FIG. 14 is a collinear chart indicating the relative rotating speeds of the rotary elements when the vehicular power transmitting system is switched from its O/D input split HV forward drive sub-mode to its U/D input split HV forward drive sub-mode while the vehicle is running in a high-speed high-load state, at a speed not lower than 200 (km/h), for example.

FIG. 14 is the collinear chart indicating the relative rotating speeds of the rotary elements RE1-RE6 when the power transmitting system 14 is switched from its O/D input split HV forward drive sub-mode to its U/D input split HV forward drive sub-mode while the vehicle 10 is running in a high-speed high-load state, at a speed not lower than 200 (km/h), for example, namely, at a speed not lower than a predetermined upper limit V1 while a required vehicle drive torque Td is not smaller than a predetermined upper limit Td1. It is noted that a one-dot chain line L1 in FIG. 14 represents the rotating speeds after the power transmitting system 14 has been switched to the U/D input split HV forward drive sub-mode. When the power transmitting system 14 is switched from the O/D input split HV forward drive sub-mode to the U/D input split HV forward drive sub-mode during running of the vehicle 10 in a high-speed high-load state (at the running speed V not lower than 200 (km/h), for example), the rotating speed of the second sun gear S2, that is, the MG1 speed Ng becomes lower than that in the O/D input split HV forward drive sub-mode. During running of the vehicle 10 in the high-speed high-load state, the vehicle speed V and an operating point of the engine 12 (represented by the engine speed Ne and the engine torque Te) are the same in the U/D input split HV forward drive sub-mode and the O/D input split HV forward drive sub-mode.

Figure 15:
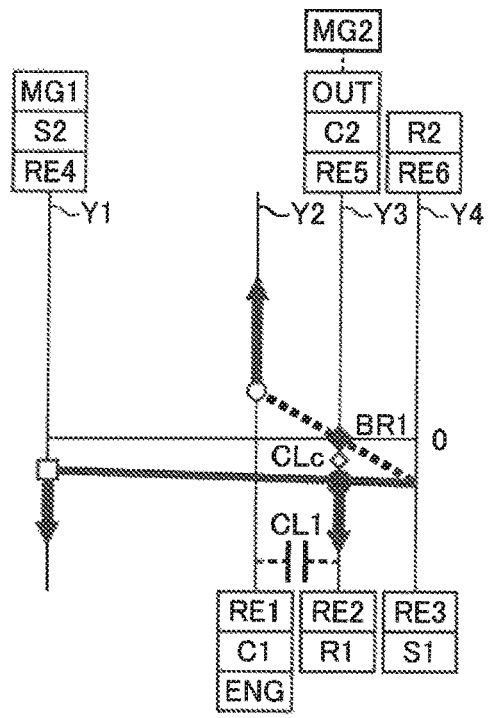
FIG. 15 is a collinear chart indicating the relative rotating speeds of the rotary elements when the vehicular power transmitting system is placed in its U/D input split HV reverse drive sub-mode, with a reverse input of an engine drive force.

FIG. 15 is the collinear chart indicating the relative rotating speeds of the rotary elements RE1-RE6 when the power transmitting system 14 is placed in its U/D input split HV reverse drive sub-mode, with a reverse input of the drive force of the engine 12, that is, while a negative torque of the engine 12 operating in a negative direction is applied to the power transmitting system 14 functioning as an electrically controlled continuously variable transmission. The U/D input split HV reverse drive sub-mode with the reverse input of the engine drive force (represented as "U/D INPUT SPLIT", "REVERSE DRIVE" and "REVERSE ENGINE DRIVE FORCE INPUT" in FIG. 3) is established in the engaged state of the brake BR1 and in the released states of the clutch CL1 and clutch CLc. In the U/D input split HV reverse drive sub-mode with the reverse engine drive force input in which the clutch CL1 is placed in the released state while the brake BR1 is placed in the engaged state, the first differential mechanism 38 receives the drive force of the engine 12 so as to generate a reverse vehicle drive force, so that the drive force of the engine 12 received by the first carrier C1 is transmitted to the second ring gear R2 connected to the first sun gear S1, such that the second ring gear R2 is rotated in a negative direction with a negative torque. In addition, the second differential mechanism 40 alone functions as an electrically controlled continuously variable transmission, in the U/D input split HV reverse drive sub-mode in which the clutch CLc is placed in the released state. In the first power transmitting portion 20, therefore, the reverse drive force of the engine 12 received by the second ring gear R2 can be distributed to the second sun gear S2 and the second carrier C2. The hybrid control portion 92 commands the engine 12 to be operated (started), and commands the first motor/generator MG1 to operate as an electric motor for generating the MG1 torque Tg corresponding to the reaction force against the engine torque Te, so that the second motor/generator MG2 is operated with the electric power stored in the battery unit 52, to generate the MG2 torque Tm. In the example of FIG. 15, the vehicle 10 is driven in the reverse direction with a negative torque generated by the second motor/generator MG2 operated in a negative direction. In the U/D input split HV reverse drive sub-mode in which the drive force of the engine 12 is transmitted to the second ring gear R2 such that the second ring gear R2 is rotated in the negative direction with the negative torque, the vehicle 10 can be driven in the reverse direction with the reverse driving torque transmitted from the second ring gear R2, in addition to the MG2 torque Tm. It is noted that the second motor/generator MG2 may be operated in the negative direction to generate a positive torque for an electric power for operating the first motor/generator MG1 to generate a vehicle driving torque. In this case, too, the vehicle 10 can be driven in the reverse direction, since the absolute value of the negative engine torque directly transmitted to the first differential mechanism 38 is larger than the absolute value of the MG2 torque Tm.

Figure 16:
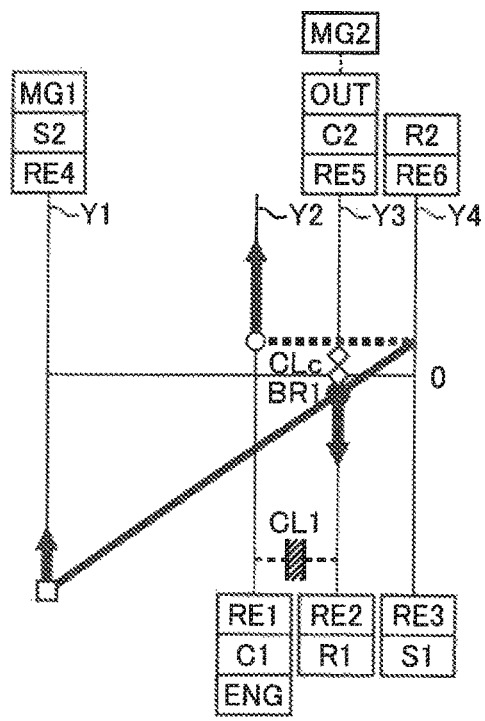
FIG. 16 is a collinear chart indicating the relative rotating speeds of the rotary elements when the vehicular power transmitting system is placed in its U/D input split HV reverse drive sub-mode, with a forward input of the engine drive force.

FIG. 16 is the collinear chart indicating the relative rotating speeds of the rotary elements RE1-RE6 when the power transmitting system 14 is placed in its U/D input split HV reverse drive sub-mode, with a forward input of the drive force of the engine 12. The U/D input split HV reverse drive sub-mode with the forward input of the engine drive force (represented as "U/D INPUT SPLIT", "REVERSE DRIVE" and "FORWARD ENGINE DRIVE FORCE INPUT" in FIG. 3) is established in the engaged state of the clutch CL1 and in the released states of the brake BR1 and the clutch CLc. In the U/D input split HV reverse drive sub-mode with the forward engine drive force input in which the clutch CL1 is placed in the engaged state while the brake BR1 is placed in the released state, the first differential mechanism 38 is connected directly to the engine 12 such that the drive force of the engine 12 received by the first carrier C1 is transmitted directly to the second ring gear R2 connected to the first sun gear S1. In addition, the second differential mechanism 40 alone functions as an electrically controlled continuously variable transmission, in the U/D input split HV reverse drive sub-mode with the forward engine drive force input in which the clutch CLc is placed in the released state. In the first power transmitting portion 20, therefore, the drive force of the engine 12 received by the second ring gear R2 can be distributed to the second sun gear S2 and the second carrier C2. The hybrid control portion 92 commands the engine 12 to be operated (started), and commands the first motor/generator MG1 to operate as an electric generator for generating the MG1 torque Tg corresponding to the reaction force against the engine torque Te, so that the second motor/generator MG2 is operated with the electric power generated by the first motor/generator MG1, to generate the MG2 torque Tm. In the example of FIG. 16, the vehicle 10 is driven in the reverse direction with a negative torque generated by the second motor/generator MG2 operated in a negative direction. It is noted that while the positive engine torque is directly transmitted to the first differential mechanism 38, the vehicle 10 can be driven in the reverse direction since the absolute value of a negative output torque of the second motor/generator MG2 operated by the electric power generated by the first motor/generator MG1 (or by the electric power generated by the first motor/generator MG1 and an electric power supplied from the battery unit 52) is larger than the absolute value of the directly transmitted positive engine torque.

Figure 17:
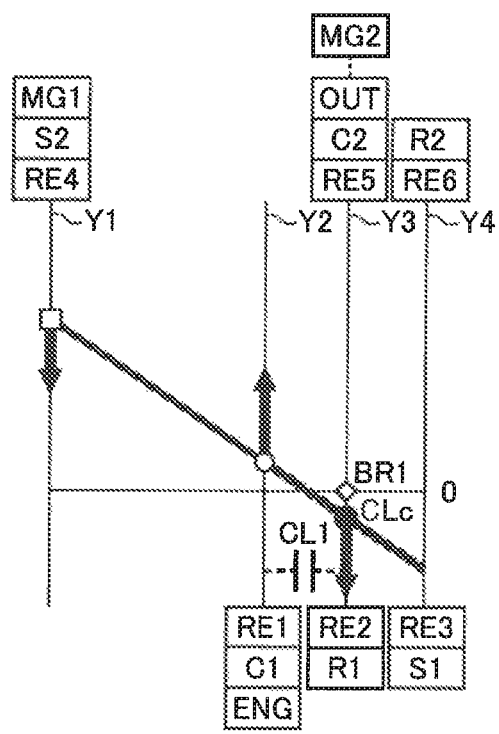
FIG. 17 is a collinear chart indicating the relative rotating speeds of the rotary elements when the vehicular power transmitting system is placed in its O/D input split HV reverse drive sub-mode, with a forward input of the engine drive force.

FIG. 17 is the collinear chart indicating the relative rotating speeds of the rotary elements RE1-RE6 when the power transmitting system 14 is placed in its O/D input split HV reverse drive sub-mode, with a forward input of the drive force of the engine 12. The O/D input split HV reverse drive sub-mode with the forward input of the engine drive force (represented as "O/D INPUT SPLIT", "REVERSE DRIVE" and "FORWARD ENGINE DRIVE FORCE INPUT" in FIG. 3) is established in the released states of the clutch CL1 and the brake BR1 and in the engaged state of the clutch CLc. In the O/D input split HV reverse drive sub-mode with the forward engine drive force input in which the clutch CLc is placed in the engaged state, the first differential mechanism 38 and the second differential mechanism 40 cooperate to function as a single differential device. In addition, in the O/D input split HV reverse drive sub-mode with the forward engine drive force input in which the clutch CL1 and the brake BR1 are placed in the released states, the first differential mechanism 38 and the second differential mechanism 40 cooperate to function as an electrically controlled continuously variable transmission a proportion of distribution of the engine drive force of which is different from that of the second differential mechanism 40 alone. In the first power transmitting portion 20, therefore, the drive force of the engine 12 received by the first carrier C1 can be distributed to the second sun gear S2 and the second carrier C2. The hybrid control portion 92 commands the engine 12 to be operated (started), and commands the first motor/generator MG1 to operate as an electric generator for generating the MG1 torque Tg corresponding to the reaction force against the engine torque Te, so that the second motor/generator MG2 is operated with the electric power generated by the first motor/generator MG1, to generate the MG2 torque Tm. In the example of FIG. 17, the vehicle 10 is driven in the reverse direction with a negative torque generated by the second motor/generator MG2 operated in a negative direction. It is noted that while the directly transmitted engine torque is positive, the vehicle 10 can be driven in the reverse direction in this O/D input split HV reverse drive sub-mode (with the forward engine drive force input), as in the U/D input split HV reverse drive sub-mode (with the forward engine drive force input).

As described above by reference to FIGS. 13-17, when the first power transmitting portion 20 functions as the electrically controlled continuously variable transmission, the selected rotary elements of the first power transmitting portion 20 to which the drive force of the engine 12 is distributed in the U/D input split HV drive sub-modes are different from those in the O/D input split HV drive sub-modes, and the proportion of distribution of the engine drive force to the selected rotary elements in the U/D input split HV drive sub-modes is different from that in the O/D input split HV drive sub-modes. Namely, the ratios of the output torques and operating speeds of the first motor/generator MG1 and the second motor/generator MG2 with respect to the output torque and the operating speed of the engine 12 can be changed depending upon whether the O/D input split HV drive sub-modes or the U/D input split HV drive sub-modes are established. The operating state of the clutch CLc is changed to change the ratios of the output torques and operating speeds of the motor/generator MG1 and motor/generator MG2 to those of the engine 12, in the engine drive mode (HV drive mode).

In a so-called "mechanical point state" of the power transmitting system 14, the drive force of the engine 12 is entirely mechanically transmitted to the second carrier C2, without transmission through an electric power transmitting path involving electric power supply and reception to and from the first motor/generator MG1 and the second motor/generator MG2, while the MG1 speed Ng is held at zero. When the rotary motion of the engine 12 is output from the second carrier C2 after the operating speed of the engine 12 is reduced, in the mechanical point state, the power transmitting system 14 is placed in the U/D (under-drive) input split HV drive sub-modes. When the rotary motion of the engine 12 is output from the second carrier C2 after the operating speed of the engine 12 is raised, in the mechanical point state, the power transmitting system 14 is placed in the O/D (over-drive) input split HV drive sub-modes. It is noted that the torque directly transmitted for the engine 12 to the second carrier C2 in the U/D input split HV drive sub-modes is increased with respect to the engine torque Te, while the torque directly transmitted from the engine 12 to the second carrier C2 in the O/D input split HV drive sub-modes is reduced with respect to the engine torque Te.

Figure 18:
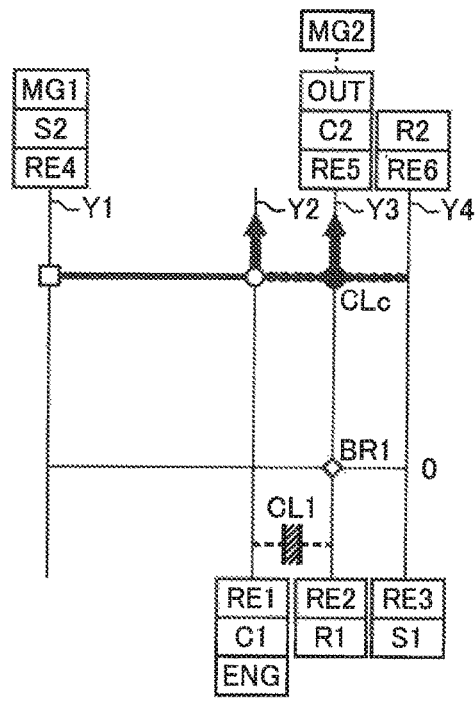
FIG. 18 is a collinear chart indicating the relative rotating speeds of the rotary elements when the vehicular power transmitting system is placed in its fixed-speed-position direct-engine-force input HV drive sub-mode.

FIG. 18 is the collinear chart indicating the relative rotating speeds of the rotary elements RE1-RE6 when the power transmitting system 14 is placed in its fixed-speed-position direct-engine-force input HV drive sub-mode while the rotary elements of each of the first and second differential mechanisms 38 and 40 are rotated as a unit. The fixed-speed-position direct-engine-force-input HV drive sub-mode (represented as "FIXED SPEED POSITION", "FORWARD DRIVE" and "DIRECT ENGINE FORCE INPUT" in FIG. 3) is established in the engaged states of the clutch CL1 and the clutch CLc, and in the released state of the brake BR1. In this fixed-speed-position direct-engine-force-input HV drive sub-mode in which the clutch CL1 is placed in the engaged state and the brake BR1 is placed in the released state, the first differential mechanism 38 is directly connected to the engine 12, and the rotary elements of each of the first differential mechanism 38 and the second differential mechanism 40 are rotated as a unit. Accordingly, the drive force of the engine 12 can be directly transmitted from the second carrier C2 through the first power transmitting portion 20. The hybrid control portion 92 commands the engine 12 to generate the vehicle driving engine torque Te. In the fixed-speed-position direct-engine-force-input HV drive sub-mode, the drive force of the first motor/generator MG1 operated with an electric power supplied from the battery unit 52 can also be transmitted directly to the second carrier C2, and the drive force of the second motor/generator MG2 operated with the electric power supplied from the battery unit 52 can also be transmitted to the drive wheels 16. Accordingly, the hybrid control portion 92 may command at least one of the first motor/generator MG1 and the second motor/generator MG2 to generate the vehicle driving torque, in addition to the engine torque Te. Namely, in the fixed-speed-position direct-engine-force input HV drive sub-mode, the vehicle 10 may be driven with only the drive force of the engine 12, or together with an assisting torque generated by the first motor/generator MG1 and/or the second motor/generator MG2.

Figure 19:
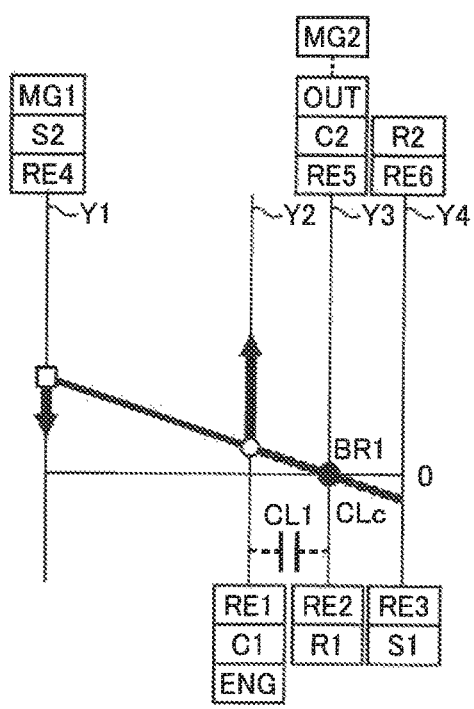
FIG. 19 is a collinear chart indicating the relative rotating speeds of the rotary elements when the vehicular power transmitting system is placed in its fixed-speed-position stationary-output-shaft HV drive sub-mode.

FIG. 19 is the collinear chart indicating the relative rotating speeds of the rotary elements RE1-RE6 when the power transmitting system 14 is placed in its fixed-speed-position stationary-output-shaft HV drive sub-mode, namely, while the second carrier C2 is held stationary. The fixed-speed-position stationary-output-shaft HV drive sub-mode (represented as "FIXED SPEED POSITION", "FORWARD DRIVE" and "STATIONARY OUTPUT SHAFT" in FIG. 3) is established in the engaged states of the brake BR1 and the clutch CLc and in the released state of the clutch CL1. In the fixed-speed-position stationary-output-shaft HV drive sub-mode in which the clutch CLc is placed in the engaged state, the first differential mechanism 38 and the second differential mechanism 40 cooperate to constitute one differential mechanism. In addition, the second carrier C2 is held stationary in the fixed-speed-position stationary-output-shaft HV drive sub-mode in which the brake BR1 is placed in the engaged state and the clutch CL1 is placed in the released state. In the first power transmitting portion 20, therefore, the first motor/generator MG1 can withstand the reaction force against the drive force of the engine 12 transmitted to the first carrier C1, so that the battery unit 52 can be charged with an electric power generated by the first motor/generator MG1 operated with the drive force of the engine 12. The hybrid control portion 92 commands the engine 12 to be operated (started), and commands the first motor/generator MG1 to be operated as an electric generator to generate the electric power for charging the battery unit 52 through the electric power control unit 50 while the reaction force is generated. The present fixed-speed-position stationary-output-shaft HV drive sub-mode in which the second carrier C2 is held stationary is an HV drive sub-mode exclusively used to charge the battery unit 52 while the vehicle 10 is held stationary. As described above by reference to FIGS. 18 and 19, the clutch CLc is placed in the engaged state in the fixed-speed-position direct-engine-force-input HV drive sub-mode and the fixed-speed-position stationary-output-shaft HV drive sub-mode.

When a speed reduction ratio I (=Ne/No) of the first power transmitting portion 20 is comparatively high, an absolute value of an output ratio Pg/Pe of an MG1 power Pg of the first motor/generator MG1 to an engine power Pe of the engine 12, and an absolute value of an output ratio Pm/Pe of an MG2 power Pm of the second motor/generator MG2 to the engine power Pe are lower in the U/D input split HV drive sub-modes than in the O/D input split HV drive sub-modes. When the speed reduction ratio I is comparatively high, therefore, an increase of the MG1 power Pg and an increase of the MG2 power Pm can be restricted in the U/D input split HV drive sub-modes. When the speed reduction ratio I is comparatively low, such as lower than 1, on the other hand, the output ratio Pm/Pe is a negative value (namely, the output ratio Pg/Pe is a positive value), so that the absolute values of the output ratios Pm/Pe and Pg/Pe are higher in the U/D input split HV drive sub-modes than in the O/D input split HV drive sub-modes. When the output ratio Pm/Pe is negative (namely, when the output ratio Pg/Pe is positive), the power transmitting system 14 is placed in a drive force circulating state in which the second motor/generator MG2 is operated as an electric generator to generate an electric power to be supplied to the first motor/generator MG1. However, it is desirable to prevent from this drive force circulating state as much as possible. Accordingly, an amount of power required in the drive force circulating state can be reduced by establishing the O/D input split HV drive sub-modes when the speed reduction ratio I is comparatively low. By suitably switching the HV drive mode between the U/D input split HV drive sub-modes and the O/D input split HV drive sub-modes according to the speed reduction ratio I, the power of the engine 12 can be transmitted with reduced outputs of the motor/generator MG1 and the motor/generator MG2.

That is, it is desirable to selectively establish the U/D input split HV drive sub-modes and the O/D input split HV drive sub-modes such that the U/D input split HV drive sub-modes are established in a high-load state of the engine 12 in which the speed reduction ratio I is comparatively high, while the O/D input split HV drive sub-modes are established in a low-load state of the engine 12 or in a high-speed running state of the vehicle 10 in which the speed reduction ratio I is comparatively low, so that the increases of the torques and speeds of the motor/generator MG1 and the motor/generator MG2 are prevented or reduced, and so that the amount of power required in the drive force circulating state can be reduced in the high-speed running state of the vehicle 10. By selectively establishing the U/D and O/D input split HV drive sub-modes as described above, an energy conversion loss in the electric path can be reduced, and the fuel economy of the vehicle 10 can be improved, or the required sizes or output capacities of the motor/generator MG1 and the motor/generator MG2 can be reduced.

Figure 20:
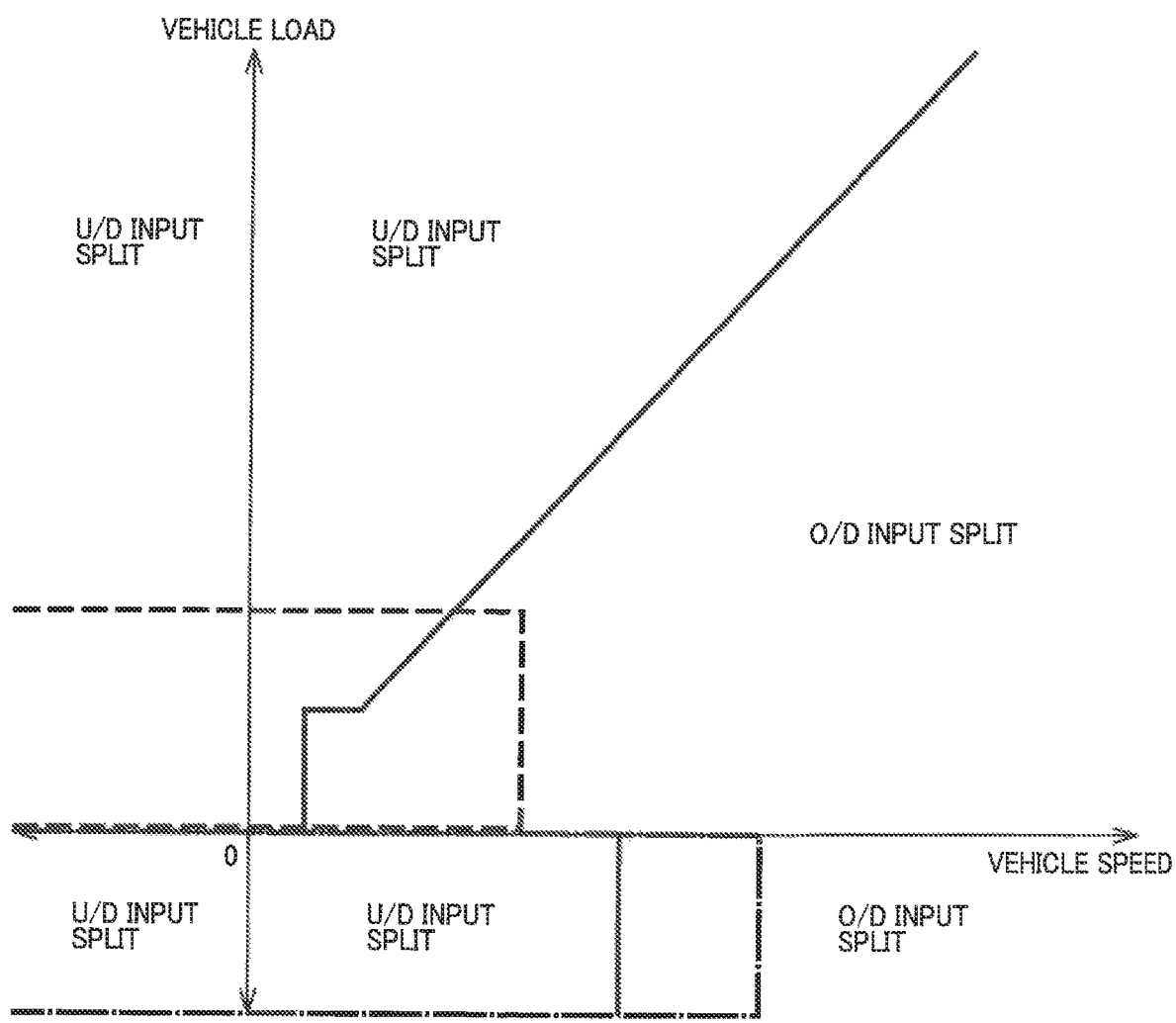
FIG. 20 is a view showing an example of a drive mode switching map formulated according to one embodiment of this invention, to selectively establish sub-modes of an engine drive mode and a motor drive mode such that an amount of electric power stored in a battery is held constant.
Figure 21:
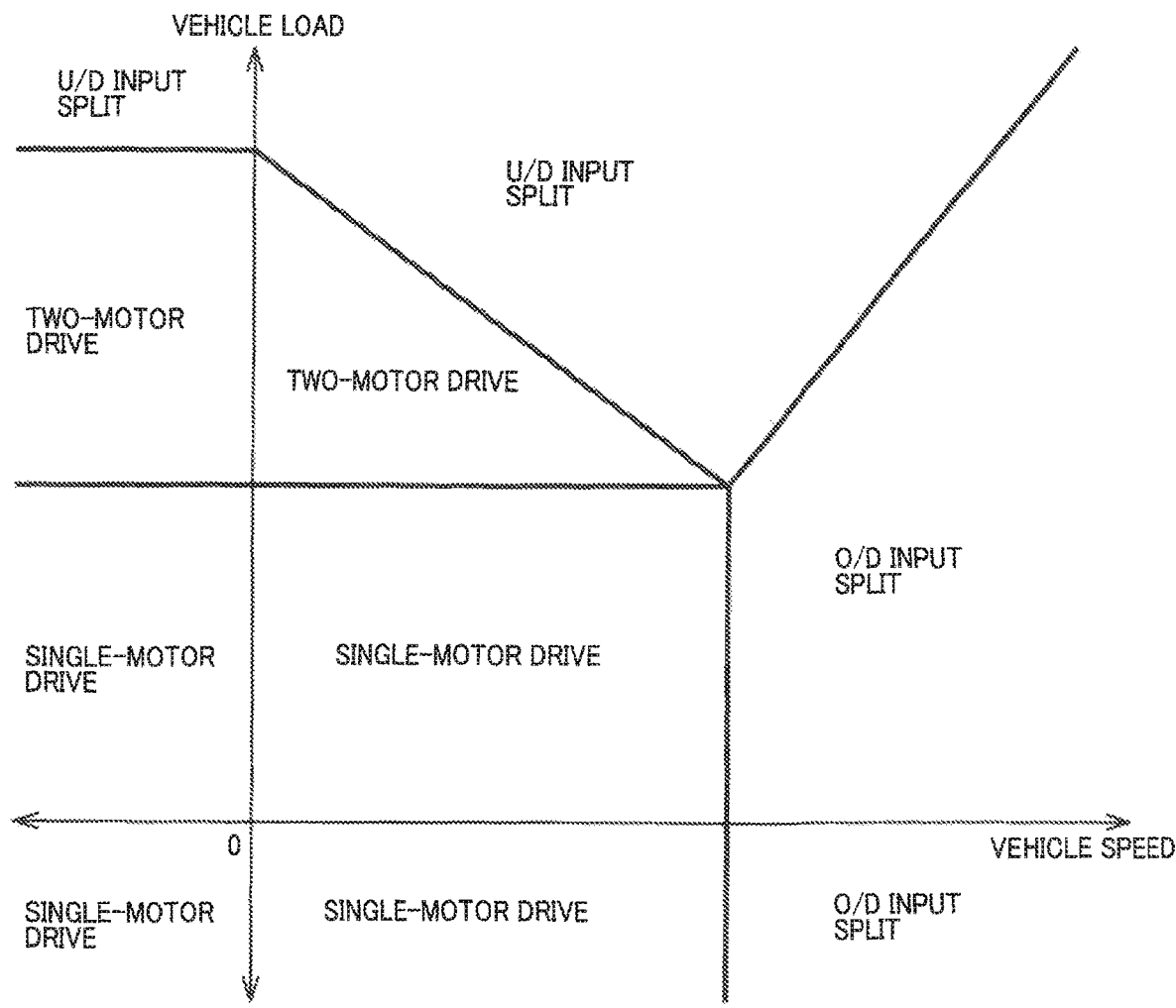
FIG. 21 is a view showing an example of a drive mode switching map formulated to selectively establish sub-modes of the engine drive mode and the motor drive mode such that the electric power stored in the battery is consumed.

FIGS. 20 and 21 are the views showing examples of drive mode switching maps used to selectively establish the sub-modes of the engine drive mode (HV drive mode) and the motor drive mode (EV drive mode). Each of these drive mode switching maps is defined in a two-dimensional coordinate system wherein the vehicle running speed V is taken along a horizontal axis while a running load of the vehicle 10 (hereinafter referred to as "vehicle load" as represented by the required vehicle drive torque) is taken along a vertical axis. Namely, the vehicle speed V and the vehicle load are selected control parameters used to selectively establish the sub-modes of the HV drive mode and the EV drive mode. The drive mode switching maps have switching boundary lines defining the different sub-modes of the HV drive mode and the EV drive mode. The drive mode switching maps are obtained by experimentation or theoretical analysis, and are stored in a memory of the electronic control device 90.

The drive mode switching map of FIG. 20 is formulated to selectively establish the sub-modes while the power transmitting system 14 is placed in a CS state (charge sustainable state) in which the electric power amount SOC stored in the battery unit 52 is held constant. The drive mode switching map of FIG. 20 is used where the vehicle 10 is a hybrid vehicle wherein the maximum electric power amount SOC that can be stored in the battery unit 52 is comparatively small, or while the vehicle 10 is running in a mode to hold the electric power amount SOC constant and where the vehicle 10 is a plug-in hybrid vehicle or a "drive-range-extended" vehicle wherein the maximum electric power amount SOC is comparatively large. On the other hand, the drive mode switching map of FIG. 21 is used while the power transmitting system 14 is placed in a CD state (charge depleting state) in which the electric power amount SOC is consumed. The drive mode switching map of FIG. 21 is used while the vehicle 10 is running in a mode to consume the electric power amount SOC, and where the vehicle 10 is the plug-in hybrid vehicle or "drive-range-extended" vehicle wherein the maximum electric power amount SOC is comparatively large. Where the vehicle 10 is a hybrid vehicle wherein the maximum electric power amount SOC is comparatively small, it is desirable not to use the drive mode switching map of FIG. 21.

In the drive mode switching map of FIG. 20, the switching boundary lines are determined to selectively establish the sub-modes of the HV drive mode according to the running state of the vehicle 10 as represented by the its running speed V and load, such that the U/D input split HV drive sub-modes are established in a high-load state of the vehicle 10, or the O/D input split HV drive sub-modes are easily established in a low-load state or a high-speed state of the vehicle 10. When the electric power stored in the battery unit 52 can be consumed (or after a warm-up operation of the engine 12 is finished, or warm-up operations of various devices of the vehicle 10 by the engine 12 are finished), the second motor/generator MG2 is operated to generate a vehicle driving torque in the motor drive mode (EV drive mode) when the vehicle 10 is in a running state in which the engine 12 has a low degree of operating efficiency. Accordingly, single-motor-drive EV drive sub-modes are established in a low-speed low-load state of the vehicle 10, as indicated by broken lines in FIG. 20. Further, when the load of the vehicle 10 is negative, the U/D input split HV drive sub-modes or the O/D input split HV drive sub-modes are established to decelerate the vehicle 10 with an engine brake applied by the engine 12 having a negative torque. When the battery unit 52 can store an electric power, the second motor/generator MG2 is operated as an electric generator in the motor drive mode. The single-motor-drive EV drive sub-modes are established in a negative-load state of the vehicle 10, as indicated by one-dot chain lines in FIG. 20. According to the drive mode switching map of FIG. 20 used in the CS state of the vehicle 10, the U/D input split HV drive sub-modes are established upon starting of the vehicle 10 in both of the forward and reverse directions. Thus, the engine power Pe can be more effectively utilized, so that driving performance of the vehicle 10 in starting can be improved. The speed reduction ratio I of the first power transmitting portion 20 becomes close to "1" as the vehicle running speed V is raised during forward running of the vehicle 10. In this state, the power transmitting system 14 may be switched to the fixed-speed-position direct-engine-force-input sub-mode. In the low-speed state of the vehicle 10 in which the engine speed Ne is extremely low, the power transmitting system 14 is switched from the U/D input split HV drive sub-modes directly to the O/D input split HV drive sub-modes. In the fixed-speed-position direct-engine-force-input sub-mode of the HV drive mode in which the drive force of the engine 12 is not transmitted through the first motor/generator MG1 and the second motor/generator MG2, there is not a heat loss generated due to conversion between mechanical and electric energies, resulting in effective improvement of the fuel economy and prevention of heat generation. In this respect, it is considered desirable to positively establish the fixed-speed-position direct-engine-force-input sub-mode during towing or in any other high-load state or in a high-speed state of the vehicle 10. When the motor drive mode is established by operation of a motor-drive-mode selector switch by the vehicle operator, the single-motor-drive sub-modes of the motor drive mode are established in the running state of the vehicle 10 indicated by the broken lines of FIG. 20.

In the drive mode switching map of FIG. 21, the switching boundary lines are determined to selectively establish the EV drive sub-modes according to the running state of the vehicle 10 as represented by its running speed V and load such that the single-motor-drive EV drive sub-modes are established in a low-load state of the vehicle 10, and two-motor-drive EV drive sub-mode is established in a high-load state of the vehicle 10. In the two-motor-drive EV drive sub-mode, the power output ratio of the first motor/generator MG1 and the second motor/generator MG2 is determined on the basis of operating efficiencies of the motor/generator MG1 and motor/generator MG2, so as to improve the power consumption economy and lower the temperature of the motor/generator MG1 and motor/generator MG2, and to lower the temperature of the electric power control unit 50. The switching boundary lines may be determined to establish the sub-modes of the HV drive mode in the high-load and high-speed states of the vehicle 10, as indicated in FIG. 21, to use the engine 12 as the vehicle drive power source, according to maximum output of the battery unit 52 and maximum outputs of the motor/generators MG1, MG2 or in a case where a rise of the rotating speed of any of the rotary elements of the power transmitting system 14 due to an amount of rise of the vehicle running speed V in the EV drive mode is reduced with an operation of the engine 12. Further, the switching boundary lines are determined to establish the single-motor-drive EV drive sub-modes in a negative-load state of the vehicle 10, so that the second motor/generator MG2 performs a regenerative operation. According to the thus formulated drive mode switching map of FIG. 21 used in the CD state, a rise of the vehicle running speed V causes rises of the operating speeds of the motor/generator MG1 and the motor/generator MG2 and the rotating speeds of the rotary elements of the differential mechanisms 38 and 40. To prevent this problem, the drive mode is switched from the EV drive sub-modes to the HV drive sub-modes according to the drive mode switching map of FIG. 20 used in the CS state. It is noted that since the first motor/generator MG1 and the engine 12 are disconnected from each other (power transmission between the first motor/generator MG1 and the engine 12 is interrupted) in the single-motor-drive EV drive sub-modes, the drive mode switching map of FIG. 21 may be modified to establish the single-motor-drive sub-modes of the EV drive mode in a wider range of the vehicle speed V an upper limit of which is higher than that of a range in which the two-motor-drive sub-mode is established. Although the switching map of FIG. 21 is formulated such that the single-motor-drive sub-modes of the EV drive modes are established to perform a regenerative operation in a negative-load state of the vehicle 10, the single-motor-drive sub-modes may be replaced by the two-motor-drive sub-modes. Further, the switching map of FIG. 21 may be formulated to prevent starting of the engine 12 and consumption of the fuel, by limiting the vehicle drive torque or the vehicle speed V within a predetermined upper limit.

Referring back to FIG. 1, the hybrid control portion 92 selects one of the sub-modes of the EV and HV drive modes, on the basis of the actual vehicle speed V and load (e.g., required vehicle drive torque), and according to the drive mode switching maps of FIGS. 20 and 21. The power transmission switching portion 94 implements a shifting control to establish the EV drive or HV drive sub-mode selected by the hybrid control portion 92, by controlling relevant ones of the clutch CL1, brake BR1 and clutch CLc, first motor/generator MG1 and second motor/generator MG2. Where the U/D input split HV forward drive sub-mode is selected by the hybrid control portion 92 during running of the vehicle 10 in the O/D input split HV forward drive sub-mode, for example, the power transmission switching portion 94 switches the power transmitting system 14 from the O/D input split HV forward drive sub-mode to the U/D input split HV forward drive sub-mode through the fixed-speed-position direct-engine-force input HV drive sub-mode of FIG. 18, or establishes the U/D input split HV forward drive sub-mode with concurrent or synchronous engaging and releasing actions of the respective clutches CL1 and CLc (so-called "clutch-to-clutch shifting actions"). The hybrid control portion 92 maintains the present sub-mode where the present sub-mode is selected, and changes the present sub-mode to the newly selected sub-mode where the newly selected sub-mode is different from the present sub-mode.

When the hybrid control portion 92 selects one of the single-motor-drive EV drive sub-modes, the vehicle 10 can be driven with only the second motor/generator MG2 used as the vehicle drive power source. When the hybrid control portion 92 selects the two-motor-drive EV drive sub-mode, the vehicle 10 can be driven with both of the first motor/generator MG1 and the second motor/generator MG2 used as the vehicle drive power source.

When the hybrid control portion 92 selects the U/D input split HV drive sub-mode shown in FIG. 12, or the O/D input split HV drive sub-mode shown in FIG. 13, the vehicle 10 can be driven with a torque transmitted to the drive wheels 16 from the second motor/generator MG2 operated with an electric power generated by the first motor/generator MG1, while a torque is transmitted from the engine 12 directly to the second carrier C2, with the first motor/generator MG1 operating as an electric generator so as to withstand a reaction torque against the drive force of the engine 12. In the U/D input split HV drive sub-modes and the O/D input split HV drive sub-modes, the hybrid control portion 92 commands the engine 12 to be operated at its operating point (represented by the engine speed Ne and the engine torque Te), which is determined according to a known highest fuel economy line of the engine 12. In this respect, it is noted that the second motor/generator MG2 may be operated with an electric power supplied from the battery unit 52, as well as the electric power generated by the first motor/generator MG1, in the U/D input split HV drive sub-modes and the O/D input split HV drive sub-modes.

When the hybrid control portion 92 selects the fixed-speed-position direct-engine-force-input HV drive sub-mode shown in FIG. 18, the vehicle 10 can be driven with the drive force of the engine 12 directly output to the second carrier C2. In the fixed-speed-position direct-engine-force-input HV drive sub-mode, the hybrid control portion 92 may command the first motor/generator MG1 to be operated with the drive force of the engine 12, as well as the electric power supplied from the battery unit 52, so that a drive force of the first motor/generator MG1 is directly output from the second carrier C2, or command the second motor/generator MG2 to be operated with the electric power supplied from the battery unit 52, so that the drive force of the second motor/generator MG2 is transmitted to the drive wheels 16.

When the vehicle 10 is stopping and the electric power amount SOC stored in the battery unit 52 is smaller than a predetermined lower limit below which the battery unit 52 is required to be charged, the hybrid control portion 92 selects the fixed-speed-position stationary-output-shaft HV drive sub-mode. In the fixed-speed-position stationary-output-shaft HV drive sub-mode, the hybrid control portion 92 commands the first motor/generator MG1 to be operated as an electric generator to generate an electric power for charging the battery unit 52 through the electric power control unit 50, while the first motor/generator MG1 withstands the reaction force against the drive force of the engine 12.

In both of the U/D input split HV drive sub-mode shown in FIG. 12 and the O/D input split HV drive sub-mode shown in FIG. 13, the first power transmitting portion 20 functions as an electrically controlled continuously variable transmission. A state of the power transmitting system 14 in which the speed reduction ratio I of the first power transmitting portion 20 is equal to "1" is equivalent to a state in the fixed-speed-position direct-engine-force-input HV drive sub-mode (shown in FIG. 18) in which both of the clutch CL1 and the clutch CLc are placed in the engaged states. Accordingly, where the acceleration requirement determining portion 98 determines that a predetermined condition is not satisfied, the power transmission switching portion 94 commands one of the clutch CL1 and the clutch CLc to be brought into its released state so that the vehicular power transmitting system 14 is switched between the U/D input split HV drive sub-mode (in which the clutch CL1 is placed in the engaged state) and the O/D input split HV drive sub-mode (in which the clutch CLc is placed in the engaged state), through the fixed-speed-position direct-engine-force-input HV drive sub-mode of FIG. 18, which is temporarily established in the engaged states of the clutches CL1 and CLc while the speed reduction ratio I is equal to "1", i.e., in the synchronized state. The predetermined condition indicated above is not satisfied when a degree of change of a manual operation to accelerate the vehicle 10 is lower than a predetermined threshold value θk1 while the output signal of the mode selector switch 68 does not indicate the sporty drive mode for driving the vehicle 10 with a high degree of driving performance. For instance, the degree of change of the manual operation to accelerate the vehicle 10 is represented by the angle θ of opening of the throttle valve, a rate of change dθ/dt of the throttle valve opening angle θ, or an amount of change (θ1−θ2) of the throttle valve opening angle θ. As a result, it is possible to reduce an amount of change of the torque to be transmitted through the first power transmitting portion 20 during switching of the HV drive mode between the U/D input split sub-mode and the O/D input split sub-mode, and a risk of generation of a shifting shock upon switching of the HV drive mode, since the functions of the first motor/generator MG1 and the second motor/generator MG2 remain unchanged during switching between the U/D input split HV drive sub-mode and the fixed-speed-position direct-engine-force-input sub mode, and during switching between the fixed-speed-position direct-engine-force-input sub-mode and the O/D input split HV drive sub-mode.

On the other hand, where the acceleration requirement determining portion 98 determines that the predetermined condition for determining that a required vehicle drive force Fr is comparatively large is satisfied, namely, while the vehicle 10 is driven in a high-load state with a large amount of the required vehicle drive force Fr, for instance, where the degree of change of the manual operation to accelerate the vehicle 10 is larger than the predetermined threshold value θk1, and/or where the sporty drive mode for driving the vehicle 10 with high driving performance is selected by the mode selector switch 68, the power transmission switching portion 94 commands the clutch CL1 and the clutch CLc to perform concurrent or synchronous engaging and releasing actions (so-called "clutch-to-clutch shifting actions") so that the vehicular power transmitting system 14 is switched between the U/D input split HV drive sub-mode (in which the clutch CL1 is placed in the engaged state) and the O/D input split HV drive sub-mode (in which the clutch CLc is placed in the engaged state). Accordingly, the HV drive mode is smoothly switched between the U/D input split sub-mode and the O/D input split sub-mode. It is noted that the above-indicated rate of change dθ/dt of the throttle valve opening angle θ may be replaced by a rate of change dθacc/dt of the accelerator pedal operation amount θacc or any other parameter reflecting the vehicle drive force Fr required by the vehicle operator. The above-indicated threshold value θk1 of the degree of change of the manual operation to accelerate the vehicle 10, which is used as the predetermined condition, is a lower limit above which it is considered that the required vehicle drive force Fr is comparatively high or the vehicle 10 is actually driven in a comparatively high-load state or such vehicle drive force is output. This threshold value θk1 is obtained by experimentation. The "sporty drive" mode is interpreted to include a fixed-speed-position drive mode and a drive-range-hold drive mode.

Figure 24:
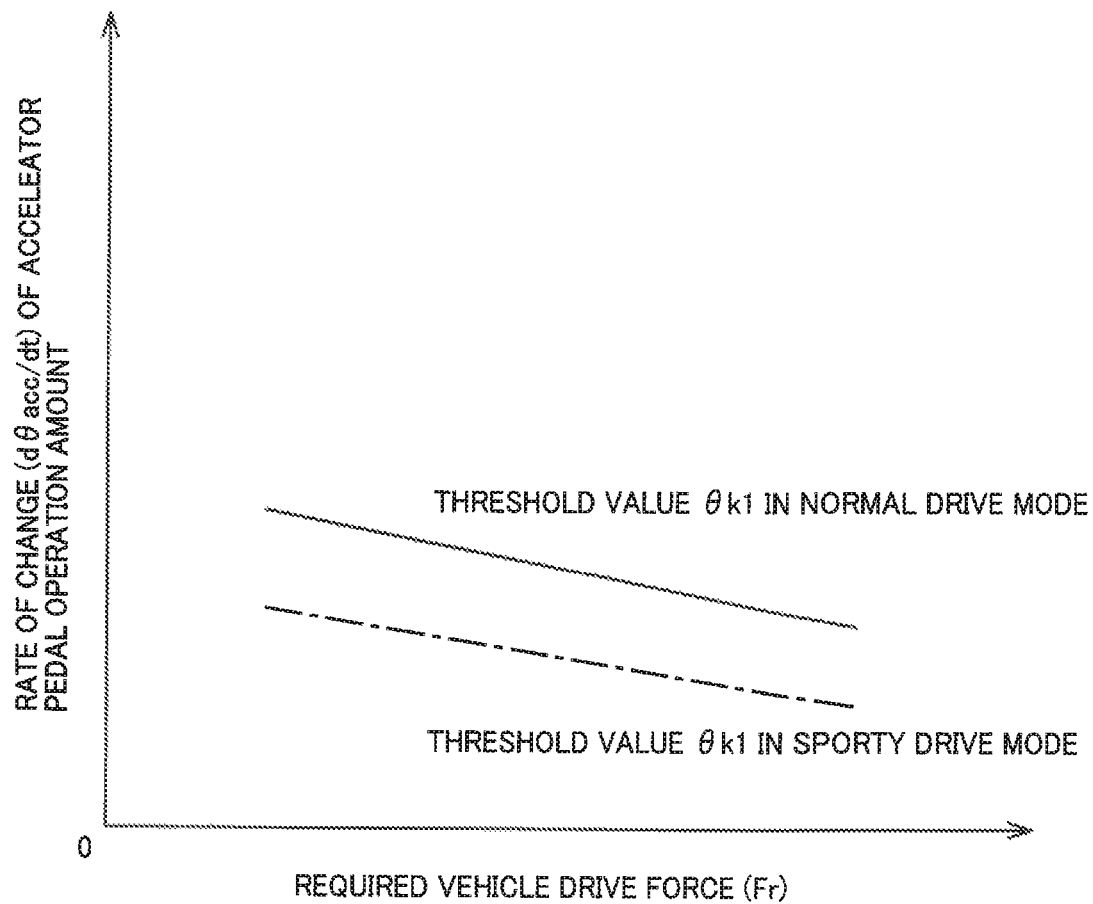
FIG. 24 is a view indicating a relationship which is stored in a memory and which is used to determine a threshold value of a rate of change of an operation amount of a vehicle accelerating member.

The threshold value θk1 (of the degree of change of the manual operation to accelerate the vehicle 10 or the accelerator pedal operation amount θacc) used as the above-indicated predetermined condition may be a constant value, but is preferably changed on the basis of the required vehicle drive force Fr and the rate of change dθacc/dt (as the changing amount of required vehicle drive force Mt) of the accelerator pedal operation amount θacc, and according to a predetermined relationship between these values Fr and dθacc/dt, such that the threshold value θk1 decreases with an increase of the required vehicle drive force Fr. Examples of this relationship are shown in FIG. 24, wherein a solid line represents the relationship in the normal drive mode, while a one-dot chain line represents the relationship in the sporty drive mode. The threshold value θk1 used in the sporty drive mode is smaller than in the normal drive mode. The sporty drive mode permits the engine speed Ne and the vehicle drive torque to be comparatively easily raised and increased, rather than reducing the risk of generation of the shifting shock. The acceleration requirement determining portion 98 may calculate the required vehicle drive force Fr on the basis of the throttle valve opening angle θ or the accelerator pedal operation amount θacc and the vehicle running speed V, and according to a predetermined relationship, and determine whether the calculated required vehicle drive force Fr is larger than a threshold value.

In the single-motor-drive EV drive sub-modes, the clutch CL1 or the clutch CLc is placed in the engaged state, so that the engine 12 is forcibly driven with the reverse drive force transmitted from the drive wheels 16. When the hybrid control portion 92 commands the engine 12 to be started in the single-motor-drive sub-modes of the EV drive mode, the power transmission switching portion 94 commands the clutch CL1 or the clutch CLc to be brought into its engaged state, for raising the engine speed Ne for ignition of the engine 12. In this case, the hybrid control portion 92 may command the first motor/generator MG1 to be operated to raise the engine speed Ne.

Alternatively, the hybrid control portion 92 commands the engine 12 to be started in the single-motor-drive EV drive sub-modes, by controlling the first motor/generator MG1 to implement a synchronous control of the rotating speeds of the rotary elements of the first and second differential mechanisms 38 and 40, such that the differential mechanisms 38 and 40 are placed in a state identical with a state in which the clutch CL1 or the clutch CLc is placed in the engaged state while the engine speed Ne is zero [rpm]. The power transmission switching portion 94 commands the clutch CL1 to be brought into the engaged state when the state of the differential mechanisms 38, 40 becomes identical with the state in which the clutch CL1 is placed in the engaged state, or commands the clutch CLc to be brought into the engaged state when the state of the differential mechanisms 38, 40 becomes identical with the state in which the clutch CLc is placed in the engaged state, so that the engine speed Ne is raised by the first motor/generator MG1, for ignition of the engine 12. Namely, when the engine 12 is started in the single-motor-drive EV drive sub-modes, the hybrid control portion 92 implements the synchronous control of the rotating speeds of the rotary elements of the differential mechanisms 38, 40 with the first motor/generator MG1, such that the rotating speeds are the same as in the standby sub-modes, although the standby sub-modes are not yet established, that is, before the clutch CL1 or CLc to establish the corresponding standby sub-mode is brought into the engaged state. After the synchronous control is implemented, the relevant clutch CL1 or CLc is brought into the engaged state to temporarily establish the standby sub-mode. In the thus established standby sub-mode, the first motor/generator MG1 is operated to raise the engine speed Ne for thereby igniting the engine 12. As described above, the engine 12 may be started in the single-motor-drive EV drive sub-modes, by switching the drive mode from the single-motor-drive EV drive sub-modes to the engine drive mode (HV drive mode) through the standby sub-modes of the EV drive mode. In this case, the vehicular power transmitting system 14 is switched to the U/D input split HV drive sub-mode through the corresponding U/D input split EV drive sub-mode, or to the O/D input split HV drive sub-mode through the corresponding O/D input split EV drive sub-mode.

Upon starting of the engine 12, a negative torque of the engine 12 is transmitted to the second carrier C2 connected to the drive wheels 16, as a reaction force to raise the speed Ne of the engine 12 held at rest, so that the vehicle drive torque is reduced. When the engine 12 is started in the single-motor-drive EV drive sub-modes, the hybrid control portion 92 commands the second motor/generator MG2 to generate an assisting drive torque (reaction force canceling torque) for compensation for an amount of reduction of the vehicle drive torque, to reduce a risk of generation of an engine starting shock.

In the two-motor-drive EV drive sub-mode in which the clutch CL1 and the brake BR1 are placed in the engaged states, the engine 12 is forcibly driven if the brake BR1 is brought into the released state. To start the engine 12 in the two-motor-drive EV drive sub-mode, therefore, the power transmission switching portion 94 commands the brake BR1 to be brought into the released state and then commands the clutch CLc to be brought into the engaged state, to raise the engine speed Ne for ignition of the engine 12. In this case, the hybrid control portion 92 may command the first motor/generator MG1 to be operated to raise the engine speed Ne. Alternatively, the power transmission switching portion 94 may command the brake BR1 to be brought into the released state, to raise the engine speed Ne for ignition of the engine 12, for starting the engine 12 in the two-motor-drive EV drive sub-mode. Further alternatively, the engine 12 can be started in the single-motor-drive EV drive sub-mode, by bringing the clutch CL1 and the brake BR1 into the released states, since the differential mechanisms 38 and 40 in the two-motor-drive EV drive sub-mode are placed in the same state as in the single-motor-drive EV drive sub-mode, by placing the clutch CL1 and the brake BR1 in the released states. The hybrid control portion 92 commands the second motor/generator MG2 to generate the reaction force canceling force as the assisting drive torque, for starting the engine 12 in the two-motor-drive EV drive sub-mode.

Figure 22:
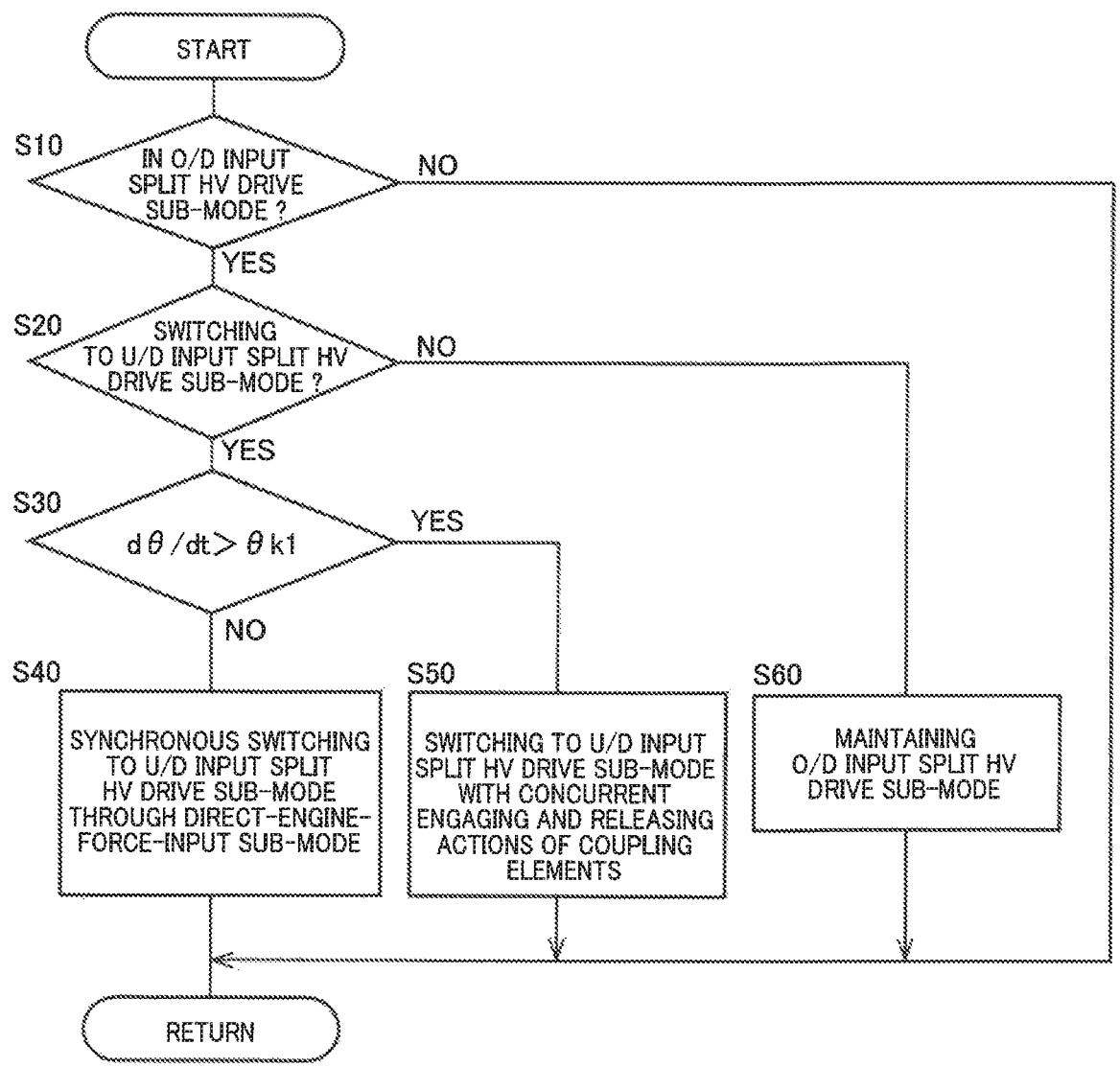
FIG. 22 is a flow chart illustrating major portions of a control operation performed by an electronic control device, namely, a control operation to change a manner of switching between the U/D input split HV drive sub-mode and the O/D input split HV drive sub-mode, according to a required drive force Fr of the vehicle.
Figure 23:
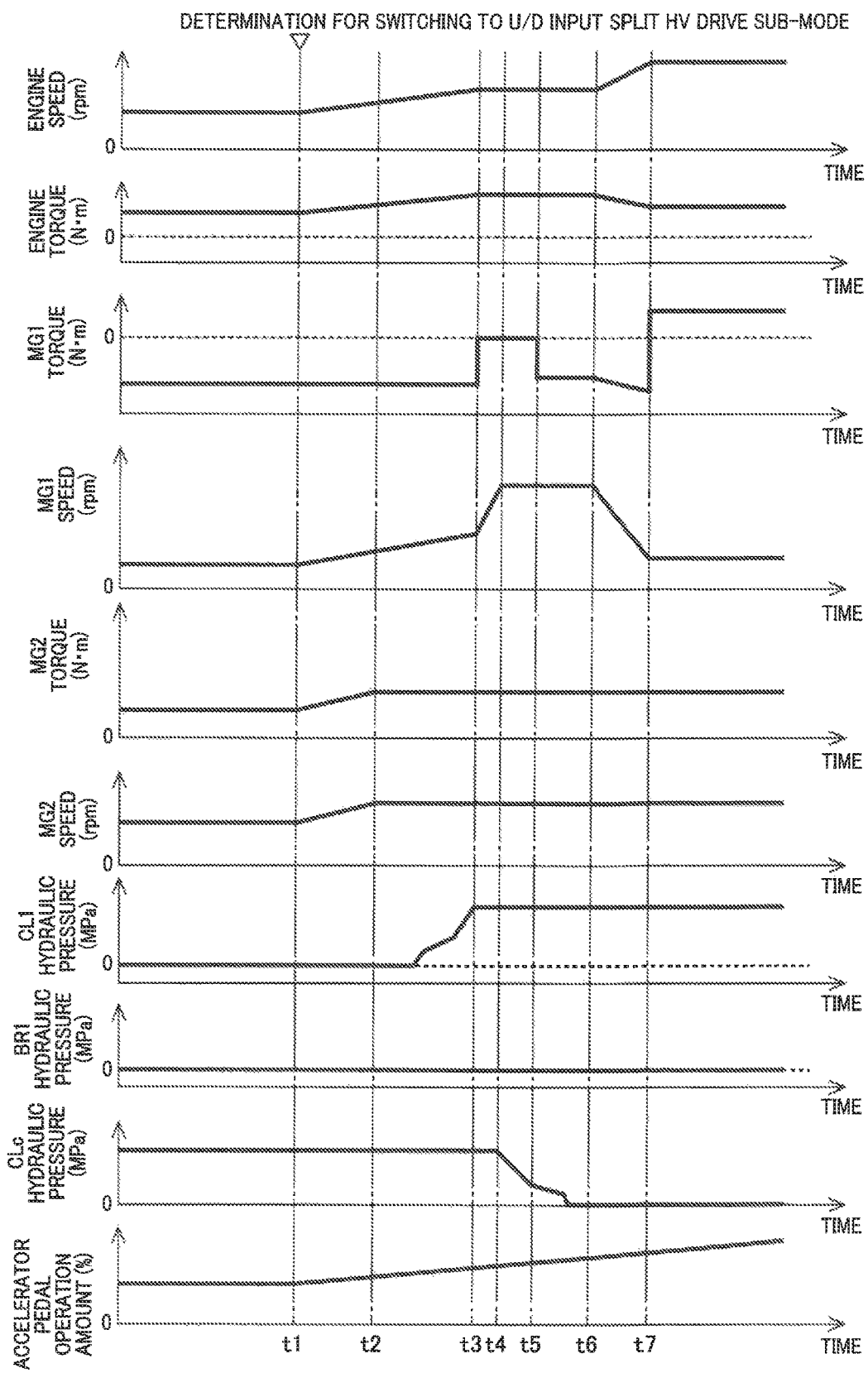
FIG. 23 is a time chart indicating changes of various parameters when the control operation of FIG. 22 is performed for switching from the O/D input split HV drive sub-mode to the U/D input split HV drive sub-mode, with concurrent or synchronous switching actions of the coupling elements.

FIG. 22 is the flow chart illustrating major portions of a control operation performed by the electronic control device 90, namely, a control operation to change a manner of switching between the U/D input split HV drive sub-modes and the O/D input split HV drive sub-modes, according to the required drive force Fr. FIG. 23 is the time chart indicating changes of the various parameters when the control operation of FIG. 22 is performed for switching from the O/D input split HV drive sub-modes to the U/D input split HV drive sub-modes, with concurrent or synchronous switching actions of the coupling elements. FIG. 24 is the view indicating a predetermined relationship used in the control operation of FIG. 22.

The control operation of FIG. 22 is initiated with a step S10 corresponding to the hybrid control portion 92, to determine whether one of the O/D input split HV drive sub-modes is established by the power transmission switching portion 94. If a negative determination is obtained in the step S10, one cycle of execution of the present control operation is terminated. If an affirmative determination is obtained in the step S10, the control flow goes to a step S20 also corresponding to the hybrid control portion 92, to determine whether a determination to switch the vehicular power transmitting system 14 to one of the U/D input split HV drive sub-modes has been made. In the time chart of FIG. 23, "t1" represents a point of time at which this determination is made, and at which an operation of the accelerator pedal to accelerate the vehicle 10 is initiated. If a negative determination is obtained in the step S20, the control flow goes to a step S60 corresponding to the power transmission switching portion 94, to maintain the O/D input split HV drive sub-mode. If an affirmative determination is obtained in the step S20, on the other hand, the control flow goes to a step S30 corresponding to the acceleration requirement determining portion 98 to determine whether the degree of change of the manual operation to accelerate the vehicle 20, which is represented by the angle $\theta$ of opening of the throttle valve, the rate of change $d\theta/dt$ of the throttle valve opening angle $\theta$, and the amount of change ($\theta 1 - \theta 2$) of the throttle valve opening angle $\theta$, for example, is higher than the predetermined threshold value $\theta k1$.

If a negative determination is obtained in the step S30, the control flow goes to a step S40 corresponding to the power transmission switching portion 40, to initiate the synchronous control of the switching actions of the clutches CL1 and CLc, for switching of the power transmitting system 14 from the O/D input split HV drive sub-mode of FIG. 13 (established in the engaged state of the clutch CLc) to the U/D input split HV drive sub-mode of FIG. 12 (established in the engaged state of the clutch CL1) through the fixed-speed-position direct-engine-force-input HV drive sub-mode (established in the engaged states of the clutches CL1 and CLc). In FIG. 23, "t2" represents a point of time at which the synchronous control is initiated. As a result, the engaging and releasing actions of the clutches CL1 and CLc are performed in a synchronized state thereof in which differential rotation speeds are zero. The fixed-speed-position direct-engine-force-input HV drive sub-mode of FIG. 18 is established for a time period from a point of time t3 to a point of time t4 indicated in FIG. 23. The clutch CLc is brought into the released state after the power transmitting system 14 is once placed in the fixed-speed-position direct-engine-force-input HV drive sub-mode, whereby the risk of generation of the shifting shock is avoided. While the power transmitting system 14 is switched from the O/D input split HV drive sub-mode to the U/D input split HV drive sub-mode through the fixed-speed-position direct-engine-force-input sub-mode, with the synchronous switching control of the clutches CL1 and CLc, the operating speed and torque of the second motor/generator MG2 are held constant, but the operating speed and torque of the first motor/generator MG1 are controlled from the point of time t3 to a point of time t7, as indicated in the time chart of FIG. 23.

If an affirmative determination is obtained in the step S30, the control flow goes to a step S50 corresponding to the power transmission switching portion 94, to implement concurrent or synchronous engaging action (clutch-to-clutch shifting actions) of the clutch CL1 and releasing action of the clutch CLc, for quickly switching the power transmitting system 14 from the O/D input split HV drive sub-mode of FIG. 13 (established in the engaged state of the clutch CLc) to the U/D input split HV drive sub-mode of FIG. 12 (established in the engaged state of the clutch CL1). Where the required vehicle drive force is comparatively high, it is desirable to quickly switch the power transmitting system 14 to the U/D input split HV drive sub-mode, for increasing the driving force quickly rather than to reduce the risk of generation of the shifting shock.

As described above, the electronic control device 90 for the power transmitting system 14 in the present embodiment is configured to switch the vehicular power transmitting system 14 between the U/D input split HV drive sub-mode (first drive mode) to be established in the engaged state of the clutch CL1 (first coupling element), and the O/D input split HV drive sub-mode (second drive mode) to be established in the engaged state of the clutch CLc (second coupling element), through the fixed-speed-position direct-engine-force-input HV drive sub-mode (third drive mode) to be established in the engaged states of both of the clutches CL1 and CLc, when a degree of change of the required vehicle drive force Fr (required amount of acceleration of the vehicle 10) is comparatively low. In this case, the HV drive mode can be switched from the third drive mode to the first or second drive mode by simply bringing one of the clutches CL1 and CLc. Accordingly, a change of the operating speed Ne of the engine 12 can take place smoothly without a discomfort being given to the vehicle operator when the vehicular power transmitting system 14 is switched between the first and second drive modes, whereby the risk of generation of the shifting shock upon switching of the vehicular power transmitting system 14 between the first and second modes can be reduced. In addition, where the predetermined condition described above is satisfied, that is, where the degree of change of the required vehicle drive force Fr (required amount of acceleration of the vehicle 10) is comparatively high, the vehicular power transmitting system 14 can be switched between the first and second drive modes, with the concurrent or synchronous engaging and releasing actions of the clutches CL1 and CLc, with a high degree of switching response. When the vehicular power transmitting system 14 is switched between the U/D input split HV drive sub-mode (first drive mode) and the O/D input split HV drive sub-mode (second drive mode), the functions of the first motor/generator MG1 and the second motor/generator MG2 remain unchanged, so that the concurrent engaging and releasing actions of the clutches CL1 and CLc permit quick switching of the vehicular power transmitting system 14 between the first and second drive modes.

The electronic control device 90 for the vehicular power transmitting system 14 in the first embodiment is further configured to determine that the predetermined condition is satisfied, when the degree of change of the manual operation to accelerate the vehicle 10 in relation to the required vehicle drive force Fr is higher than the predetermined threshold value, for instance, when the rate of change dθ/dt of the accelerator pedal operation amount θacc is higher than the predetermined threshold value θk1. Accordingly, the vehicular power transmitting system 14 is switched between the U/D input split HV drive sub-mode (first drive mode) and the O/D input split HV drive sub-mode (second drive mode) with the concurrent engaging and releasing actions of the clutches CL1 and CLc, during running of the vehicle 10 in a high-load state in which the required vehicle drive force Fr is comparatively high, so that the HV drive mode can be switched between the U/D and O/D input split HV drive sub-modes with a high degree of switching response.

The electronic control device 90 for the vehicular power transmitting system 14 in the present embodiment is also configured to determine that the predetermined condition is satisfied, when the sporty drive mode in which the vehicle is driven with a high degree of driving performance is selected. Accordingly, the vehicular power transmitting system 14 can be switched between the U/D input split HV drive sub-mode (first drive mode) and the O/D input split HV drive sub-mode (second drive mode) with a high degree of switching response when the sporty drive mode in which the vehicle is driven with a high degree of driving performance is selected, so that the vehicle 10 can be driven in a sporty fashion.

Second Embodiment

Other embodiments of this invention will be described. It is to be understood that the same reference signs will be used in the following embodiments, to identify the corresponding elements, which will not be described redundantly.

Figure 25:
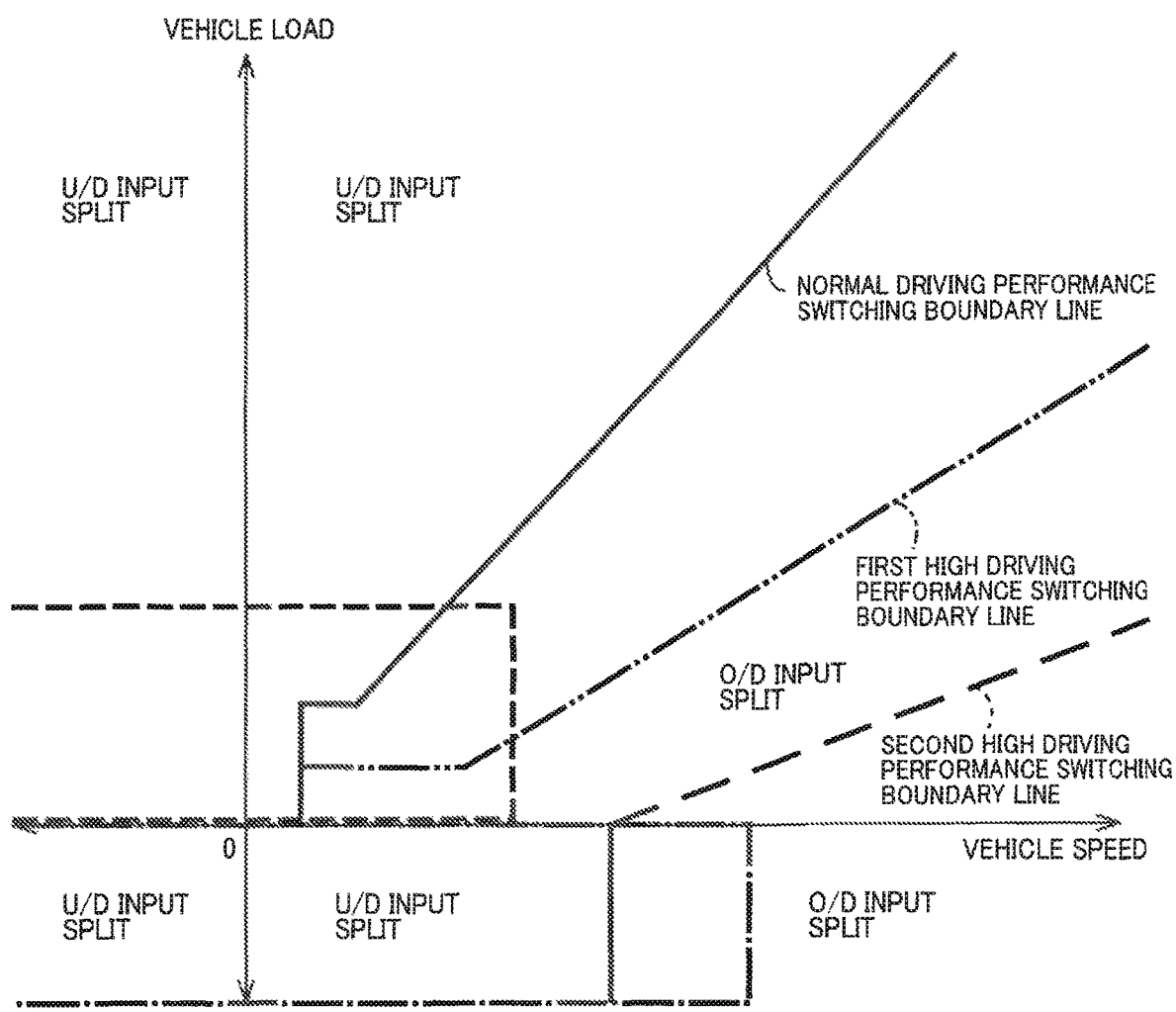
FIG. 25 is a view showing an example of a drive mode switching map formulated according to another (second) embodiment of this invention, to change sub-modes of the engine drive mode and motor drive mode such that an amount of electric power stored in a battery is held constant.
Figure 26:
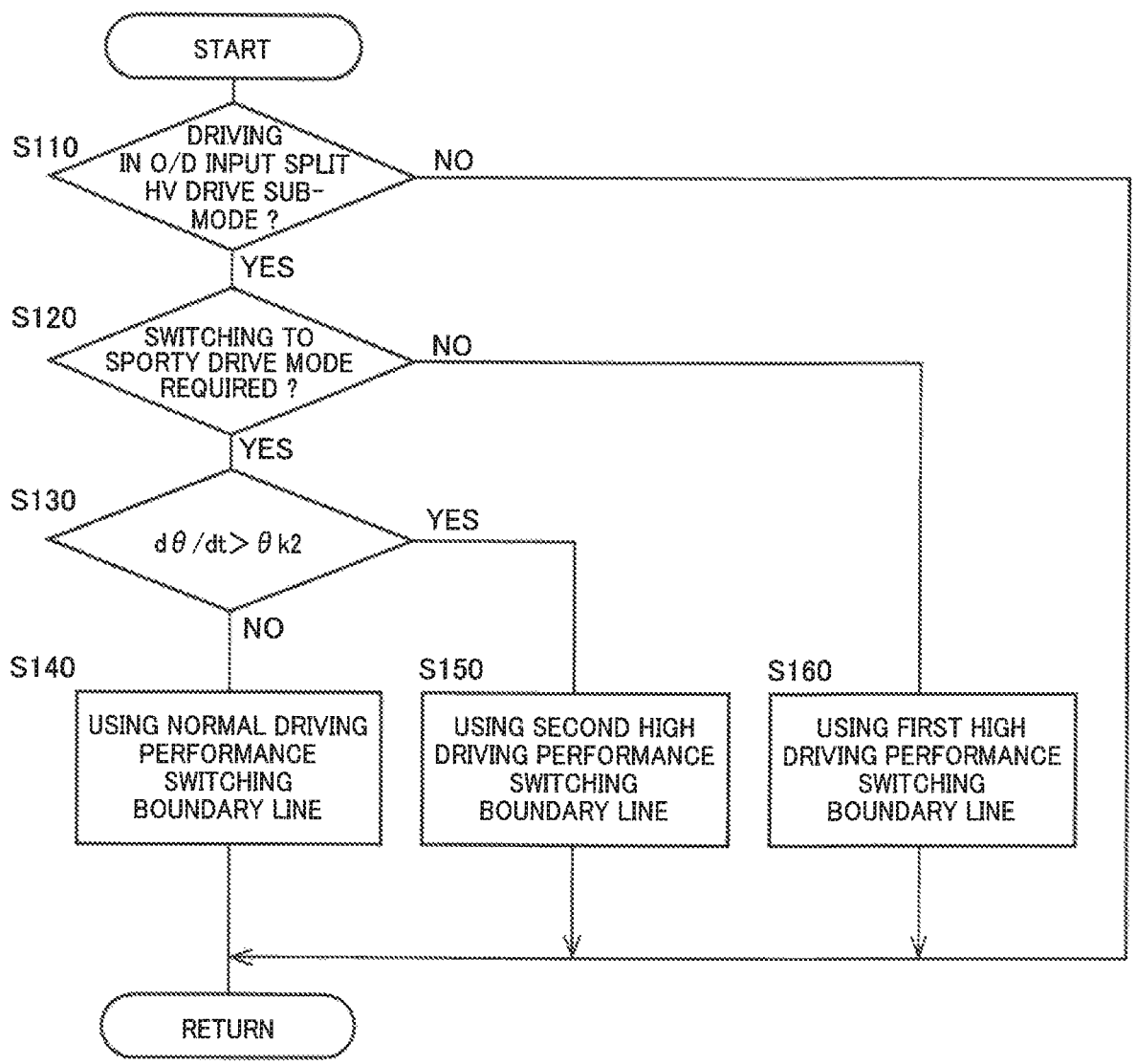
FIG. 26 is a flow chart illustrating major portions of a control operation performed by the electronic control device, namely, a control operation to change the manner of switching between the U/D input split HV drive sub-mode and the O/D input split HV drive sub-mode, in another (second) embodiment of the invention.
Figure 27:
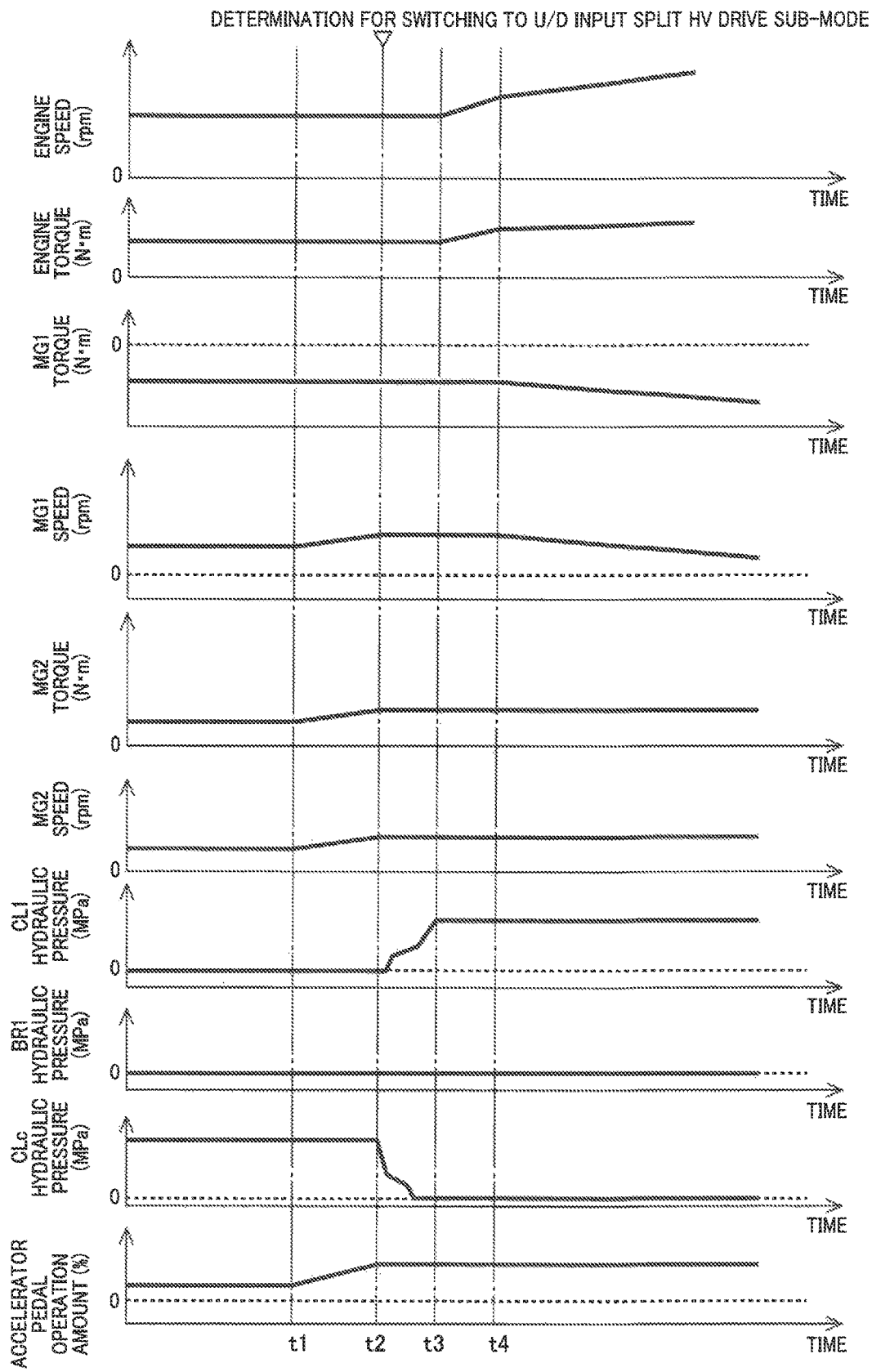
FIG. 27 is a time chart indicating changes of various parameters when the control operation of FIG. 26 is performed in the second embodiment of the invention.

FIG. 25 is the view similar to that of FIG. 20, showing an example of a drive mode switching map used to change the sub-modes of the HV drive mode such that the electric power amount SOC stored in the battery unit 52 is held constant. This drive mode switching map has a normal driving performance switching boundary line (solid line), a first high driving performance switching boundary line (two-dot chain) and a second high driving performance switching boundary line (broken line), which are used for switching the vehicular power transmitting system 14 between the O/D input split HV drive sub-mode (second drive mode) of FIG. 13 to be established in the engaged state of the clutch CLc, and the U/D input split HV drive sub-mode (first drive mode) of FIG. 12 to be established in the engaged state of the clutch CL1. FIG. 26 is the flow chart illustrating major portions of a control operation performed by the electronic control device 90 according to the present second embodiment, and FIG. 27 is the time chart indicating changes of the various parameters when the HV drive mode is switched from the O/D input split HV drive sub-mode to the U/D input split HV drive sub-mode, with concurrent engaging and releasing actions of the clutches CL1 and CLc. The control operation illustrated in the flow chart of FIG. 26 is preferably performed together with the control operation illustrated in the flow chart of FIG. 22 according to the first embodiment described above.

Figure 28:
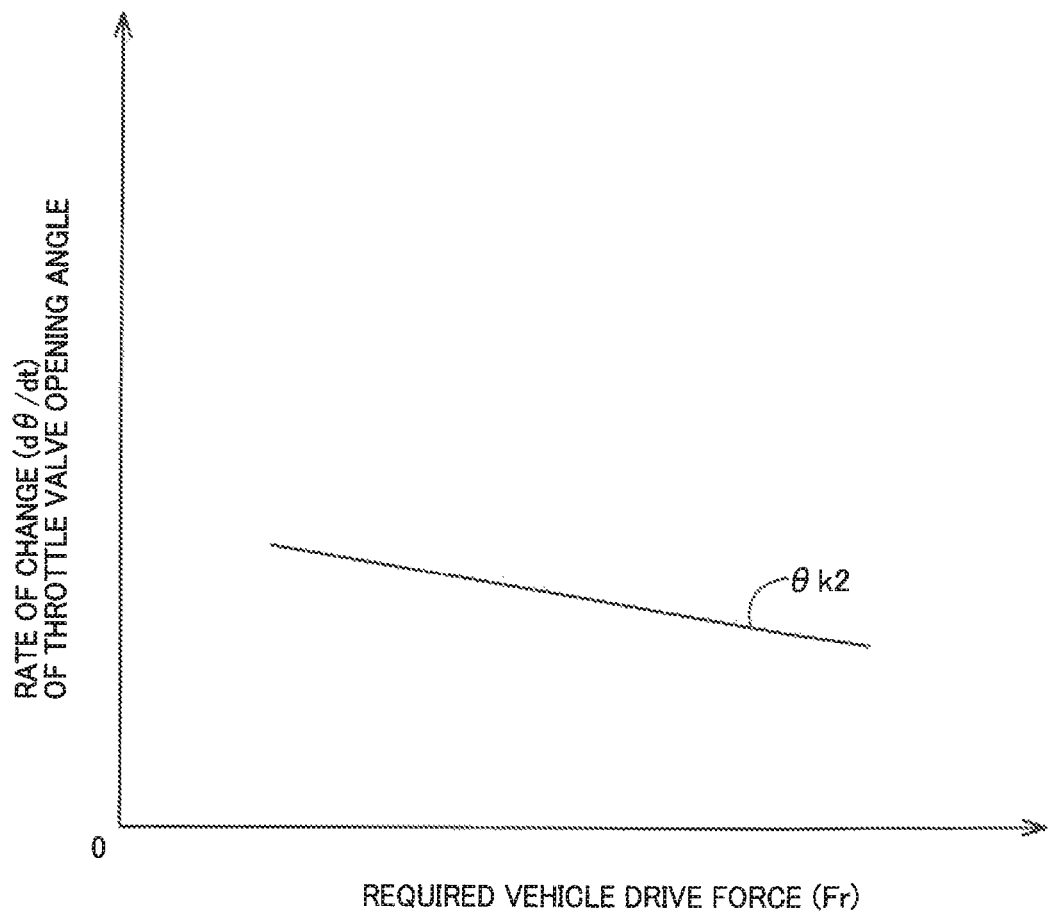
FIG. 28 is a view indicating a relationship which is stored in the memory and which is used in the second embodiment of FIG. 26 to determine the threshold value of the rate of change of the operation amount of the vehicle accelerating member.

The control operation of FIG. 26 is initiated with a step S110 corresponding to the hybrid control portion 92, to determine whether the vehicular power transmitting system 14 is placed in the O/D input split HV drive sub-mode. If a negative determination is obtained in the step S110, one cycle of execution of the control routine of FIG. 26 is terminated. If an affirmative determination is obtained in the step S110, a step S120 also corresponding to the hybrid control portion 92 is executed to determine whether switching to the U/D input split HV drive sub-mode has been required, for example, whether the sporty drive mode has been selected by the mode selector switch 68. In the time chart of FIG. 27, "t1" represents a point of time at which the switching to the U/D input split HV drive sub-mode has been required, namely, at which the manual operation to accelerate the vehicle 10 is initiated. If a negative determination is obtained in the step S120, the control flow goes to a step S160 corresponding to the power transmission switching portion 94, to switch the HV drive mode from the O/D input split HV drive sub-mode to the U/D input split HV drive sub-mode, according to the first high driving performance switching boundary line indicated in FIG. 25. If an affirmative determination is obtained in the step S120, the control flow goes to a step S130 corresponding to the acceleration requirement determining portion 98, to determine whether the degree of change of the manual operation to accelerate the vehicle 10 is higher than a predetermined threshold value θk2. As described above, the degree of change is represented by the angle θ of opening of the throttle valve, the rate of change dθ/dt of the throttle valve opening angle θ, or the amount of change (θ1−θ2) of the throttle valve opening angle θ, for example. The threshold value θk2 is determined on the basis of the required vehicle drive force Fr and the rate of change dθ/dt of the throttle valve opening angle θ, and according to a predetermined relationship between these values Fr and dθ/dt, which is indicated in FIG. 28 by way of example.

When a negative determination is obtained in the step S130, the control flow goes to a step S140 also corresponding to the power transmission switching portion 94, to switch the HV drive mode from the O/D input split HV drive sub-mode (second drive mode) of FIG. 13 to the U/D input split HV drive sub-mode (first drive mode) of FIG. 12, with the concurrent engaging and releasing actions of the clutches CL1 and CLc, according to the normal switching boundary line indicated in FIG. 25. The concurrent engaging and releasing actions of the clutches CL1 and CLc are implemented during a time period from a point of time t2 to a point of time t3, as indicated in the time chart of FIG. 27. The concurrent or synchronous releasing action of the clutch CLc and engaging action of the clutch CL1 permit quick switching of the HV drive mode. As indicated in the time chart of FIG. 27, the control of the concurrent engaging and releasing actions of the clutches CL1 and CLc is terminated at a point of time t4.

When an affirmative determination is obtained in the step S130, the control flow goes to a step S150 also corresponding to the power transmission switching portion 94, to switch the HV drive mode from the O/D input split HV drive sub-mode to the U/D input split HV drive sub-mode according to the second high driving performance switching boundary line indicated in FIG. 25. As described above, with respect to the steps S140-S160, the HV drive mode is switched in the step S160 from the O/D input split HV drive sub-mode to the U/D input split HV drive sub-mode according to the first high driving performance switching boundary line, where the sporty drive mode is not selected. Where the sporty drive mode is selected, on the other hand, the HV drive mode is switched in the step S140 from the O/D input split HV drive sub-mode to the U/D input split HV drive sub-mode, with the concurrent engaging and releasing actions of the clutches CL1 and CLc according to the normal driving performance switching boundary line, when the required vehicle drive force Fr is comparatively small, and switched in the step S150 from the O/D input split HV drive sub-mode to the U/D input split HV drive sub-mode according to the second high driving performance switching boundary line, when the required vehicle drive force Fr is comparatively large. The second high driving performance switching boundary line permits easier switching to the U/D input split HV drive sub-mode during running of the vehicle 10 in a high-speed low-load state, than the first high driving performance switching boundary line, so that the vehicle 10 is driven so as to reflect a desire of the vehicle operator to accelerate the vehicle 10, when the HV drive mode is switched according to the second high driving performance switching boundary line.

According to the electronic control device 90 for the power transmitting system 14 in the present second embodiment, the vehicular power transmitting system 14 is switched from the O/D input split HV drive sub-mode (second drive mode) to the U/D input split HV drive sub-mode (first drive mode), on the basis of the required vehicle drive force Fr represented by the accelerator pedal operation amount θacc, and the vehicle running speed V, and according to the predetermined drive mode switching map of FIG. 25 having a switching boundary line defining two areas in which the first and second drive modes are respectively selected. The switching boundary line (first high driving performance switching boundary line) used in the sporty drive mode is moved with respect to the switching boundary line (normal driving performance switching boundary line) used in the normal drive mode, in at least one of a direction in which the vehicle running speed V is raised, and a direction in which the required vehicle drive force Fr is reduced. Further, the switching boundary line (second high driving performance switching boundary line) used when the degree of change of the manual operation to accelerate the vehicle 10 in the sporty drive mode is higher than the predetermined threshold value ek2 is further moved with respect to the normal driving performance switching boundary line, in at least one of the above-indicated two directions. Thus, the switching boundary line is moved such that the area in which the U/D input split HV drive sub-mode is selected is enlarged when the sporty drive mode is selected, so that the driving performance of the vehicle 10 is improved in the sporty drive mode.

Third Embodiment

Figure 29:
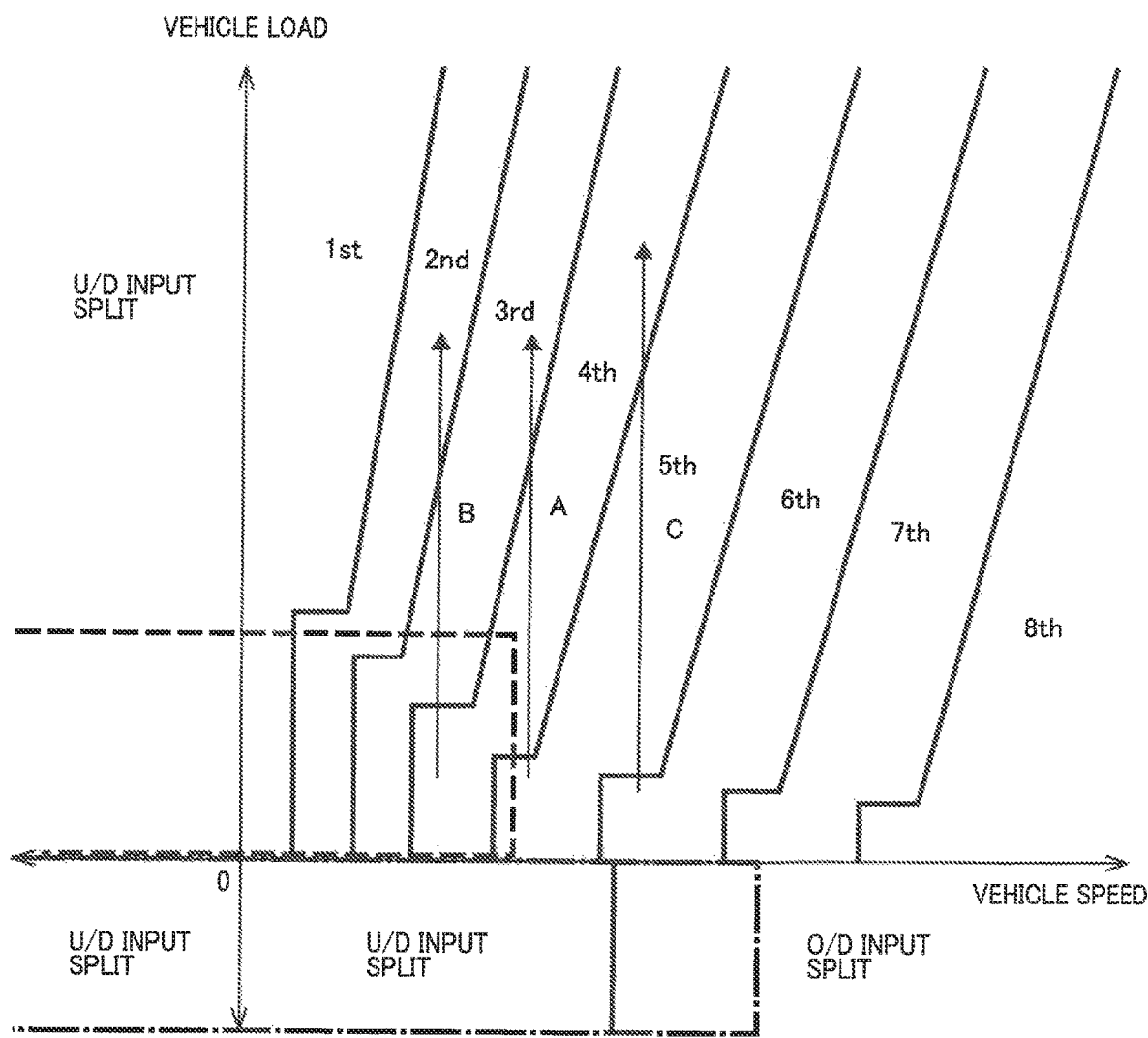
FIG. 29 is a view showing a drive mode switching map formulated according to a further (third) embodiment of this invention, to change the HV drive mode such that the amount of electric power stored in the battery is held constant.
Figure 30:
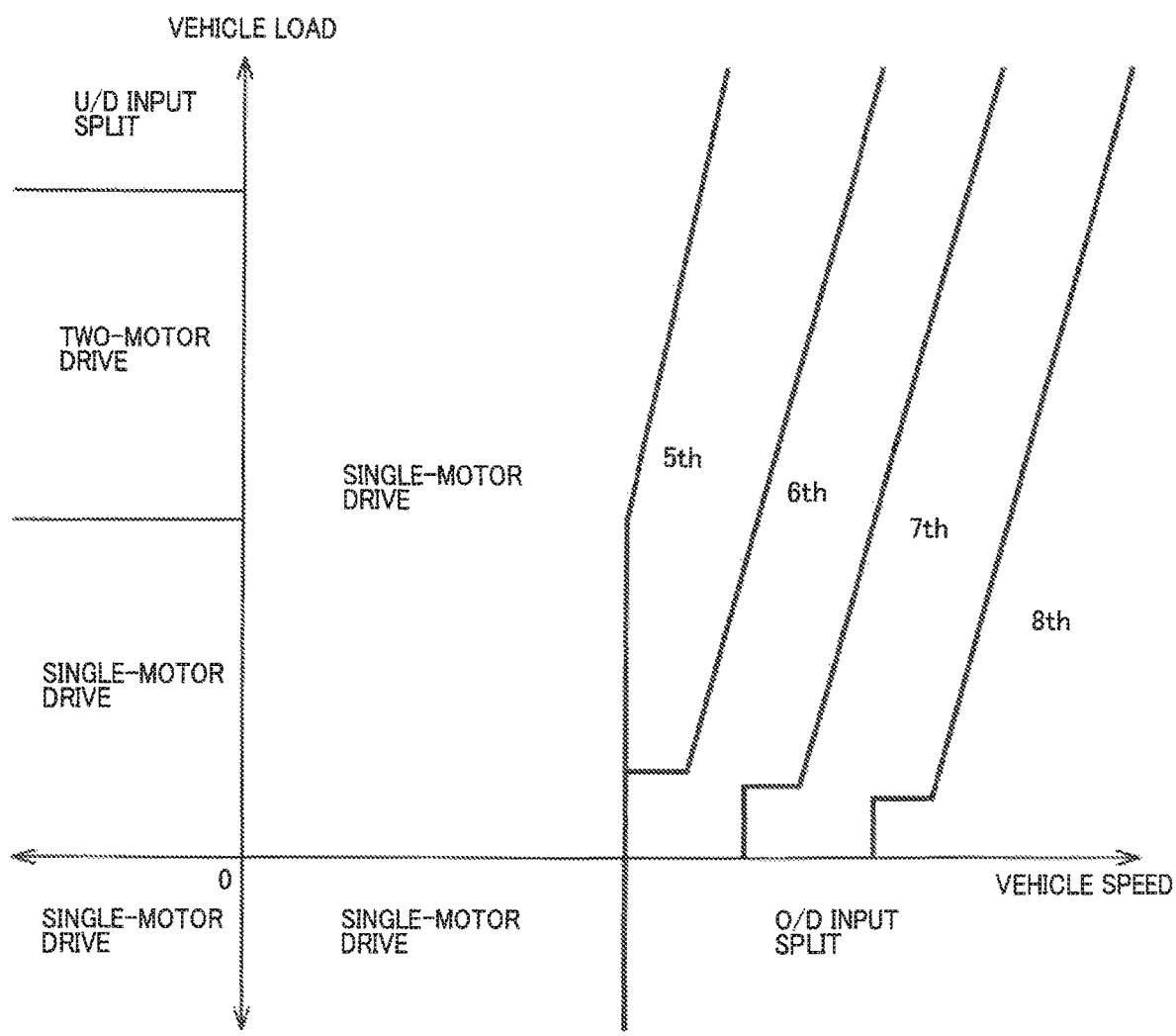
FIG. 30 is a view showing a drive mode switching map formulated according to the third embodiment of FIG. 29, to change the drive mode such that the electric power stored in the battery is consumed.

FIG. 29 is the view showing a drive mode switching map used to change the HV drive mode among the U/D input split HV drive sub-mode (first drive mode), the O/D input split HV drive sub-mode (second drive mode), and the fixed-speed-position engine-drive-force-input HV drive sub-mode (third drive mode), such that the amount of electric power stored in the battery unit 52 is held constant. In the drive mode switching map of FIG. 29, first through eighth overall speed positions are assigned to the U/D input split HV drive sub-mode, the O/D input split HV drive sub-mode, and the fixed-speed-position direct-engine-force-input sub-mode. FIG. 30 is the view showing a drive mode switching map used to change the HV drive mode among drive mode among the U/D input split HV drive sub-mode (first drive mode), the O/D input split HV drive sub-mode (second drive mode), and the fixed-speed-position engine-drive-force-input HV drive sub-mode (third drive mode), such that the electric power stored in the battery unit 52 is consumed. In the switching map of FIG. 30, fifth through eighth overall speed positions are assigned to the U/D input split HV drive sub-mode (first drive mode), the O/D input split HV drive sub-mode (second drive mode), and the fixed-speed-position direct-engine-force-input HV drive sub-mode (third drive mode). FIG. 31 is the table indicating relationships between the overall speed position of the power transmitting system 14 and its HV drive sub-modes. In the table of FIG. 31, a pattern 1 is an assignment pattern where the overall speed positions are assigned to the U/D input split HV drive sub-mode, the O/D input split HV drive sub-mode as well as the fixed-speed-position direct-engine-force-input sub-mode having a high switching response, while a pattern 2 is an assignment pattern where the overall speed positions are assigned to the U/D input split HV drive sub-mode and the O/D input split HV drive sub-mode and are not assigned to the fixed-speed-position direct-engine-force-input sub-mode. The overall speed positions indicated above have respective predetermined speed ratio values of the vehicular power transmitting system 14, which are established by controlling the vehicular power transmitting system 14. In FIG. 29, arrow-headed lines A, B and C indicate amounts of increase of the vehicle load represented by the opening angle θ of the throttle valve, when the accelerator pedal is operated to accelerate the vehicle 10.

Figure 32:
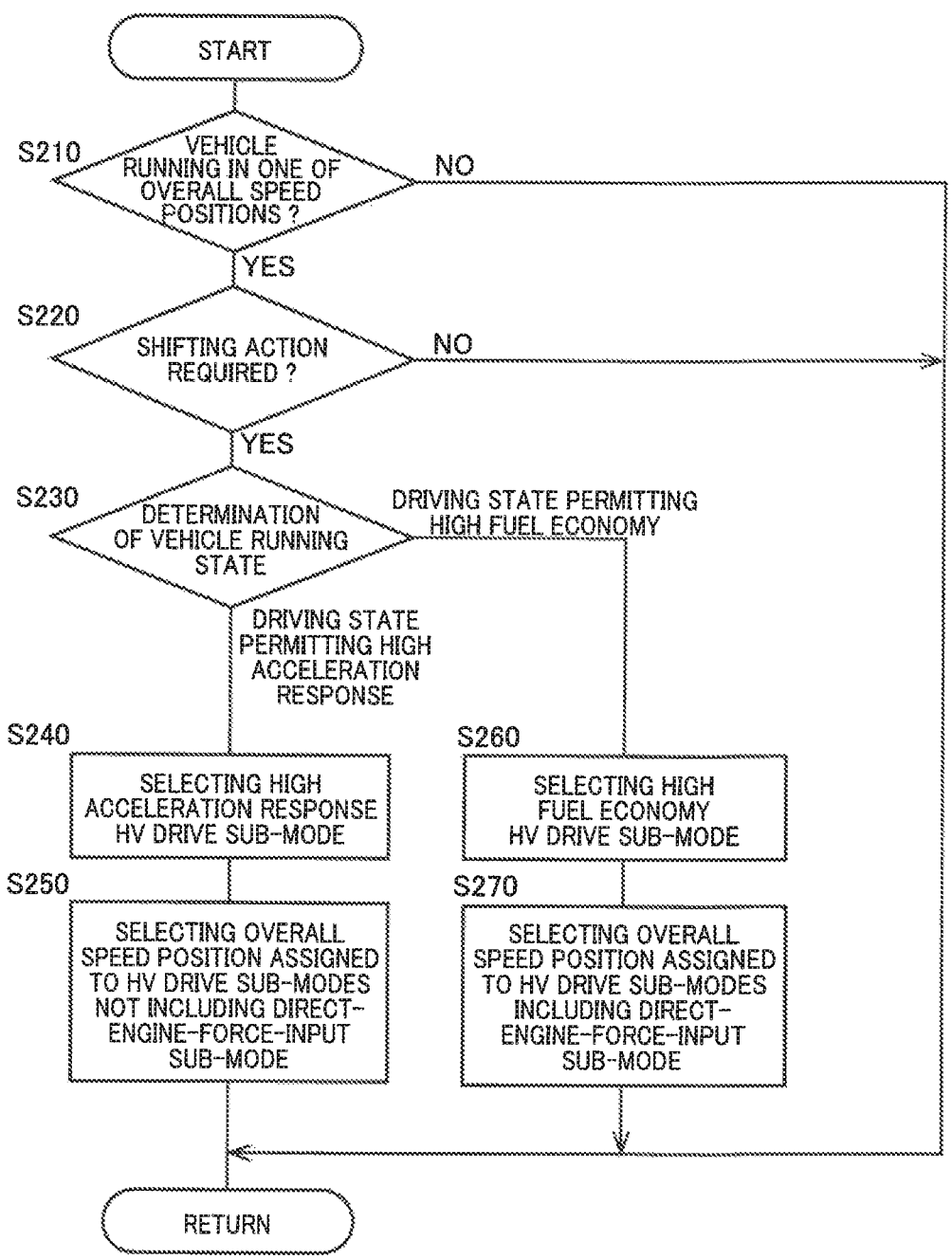
FIG. 32 is a flow chart illustrating major portions of a control operation performed by the electronic control device according to the third embodiment of FIG. 29.
Figure 33:
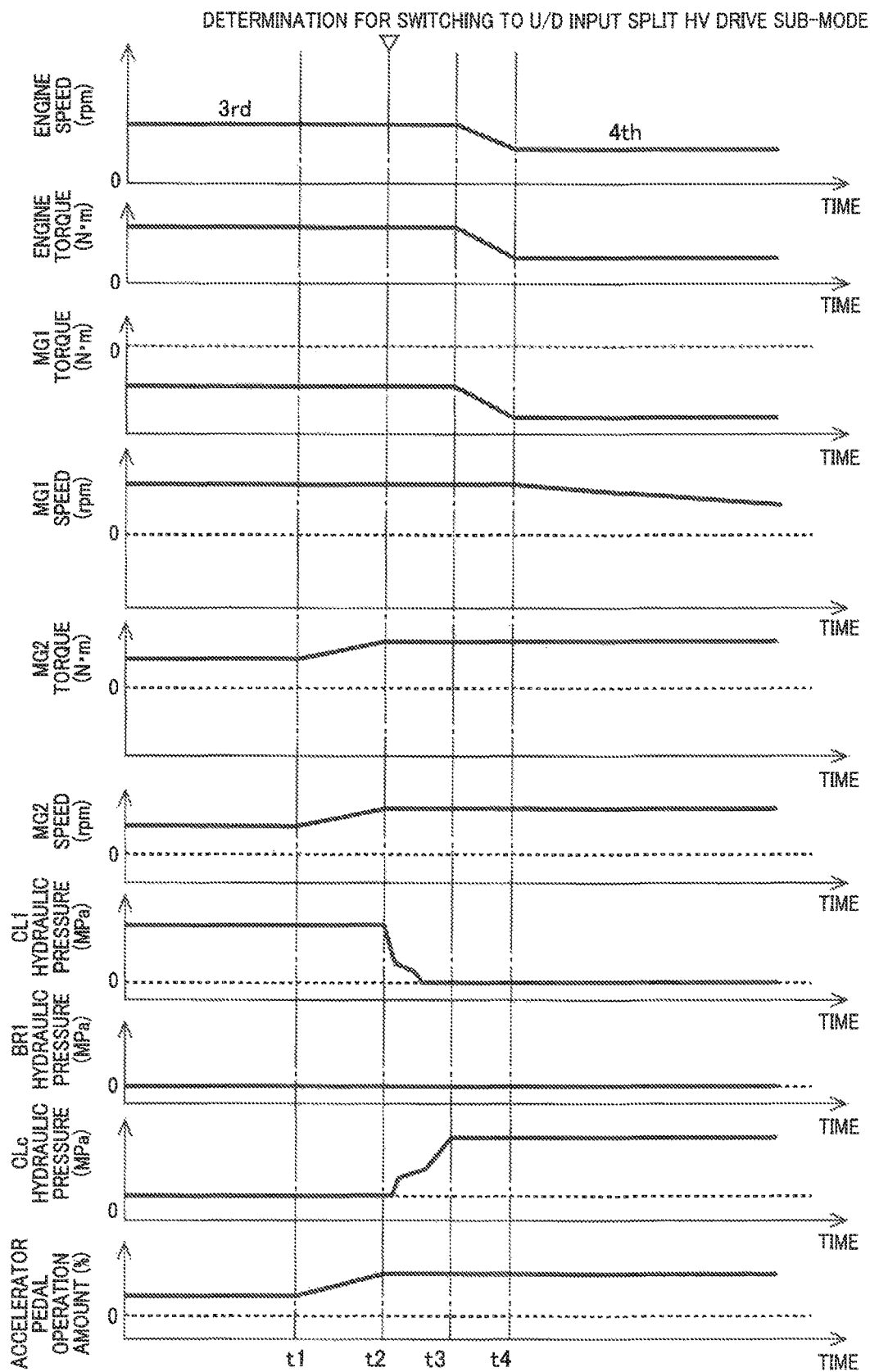
FIG. 33 is a time chart indicating changes of the various parameters when the power transmitting system is shifted up from the O/D input split HV drive sub-mode to the U/D input split HV drive sub-mode, with synchronous engaging and releasing actions of the coupling elements, in the control operation of FIG. 32 in the third embodiment of FIG. 29.

FIG. 32 is the flow chart illustrating major portions of a control operation performed by the electronic control device 90 according to the present third embodiment, and FIG. 33 is the time chart indicating changes of the various parameters when the power transmitting system 14 is shifted up from the O/D input split HV drive sub-mode to the U/D input split HV drive sub-mode with concurrent engaging and releasing actions of the clutches CL1 and CLc, in the control operation of FIG. 32.

The control operation illustrated in FIG. 32 is initiated with a step S210 corresponding to the hybrid control portion 92, to determine whether the vehicle 10 is running with the vehicular power transmitting system 14 being placed in one of the plurality of overall speed positions. This determination is made depending upon whether the vehicle 10 is running in the forward direction in one of the overall speed positions of the vehicular power transmitting system 14, which is selected on the basis of the vehicle running speed V and the vehicle load (required vehicle drive force Fr), and according to the drive mode switching map of FIG. 29. Where the vehicle 10 is provided with a step-variable shifting switch which is operated to shift the power transmitting system 14 in a step-variable manner, the above-described determination is made depending upon whether the step-variable shifting switch is operated. When the step-variable shifting switch is not operated, the power transmitting system 14 is shifted in a continuously variable manner.

If a negative determination is obtained in the step S210, one cycle of execution of the control routine of FIG. 32 is terminated. If an affirmative determination is obtained in the step S210, the control flow goes to a step S220 also corresponding to the hybrid control portion 92, to determine whether the vehicular power transmitting system 14 should be shifted in a step-variable manner during forward running of the vehicle 10. This determination is made on the basis of the vehicle running speed V and the vehicle load (required vehicle drive force Fr), and according to the drive mode switching map of FIG. 29. If a negative determination is obtained in the step S220, one cycle of execution of the control routine is terminated. If an affirmative determination is obtained in the step S220, the control flow goes to a step S230 also corresponding to the hybrid control portion 92, to determine the running state of the vehicle 10, more specifically, whether the vehicle 10 is running in a state requiring a high degree of acceleration response, or in a state requiring a high degree of fuel economy. This determination is made on the basis of the degree of change of the manual operation to accelerate the vehicle 10, or on the basis of an output signal of a vehicle driving state selector switch.

If a determination that the vehicle 10 is running in the state requiring the high degree of acceleration response is obtained in the step S230, the control flow goes to steps S240 and S250 also corresponding to the hybrid control portion 92, to select a group of the HV drive sub-modes permitting the high degree of acceleration response, and then select one of the overall speed positions which are assigned to the HV drive sub-modes not including the fixed-speed-position direct-engine-force-input sub-mode, according to the pattern 2 of the relationship indicated in FIG. 31. As a result, the vehicular power transmitting system 14 is quickly shifted to the selected overall speed position not assigned to the direct-engine-force-input sub-mode. If a determination that the vehicle 10 is running in the state requiring the high degree of fuel economy is obtained in the step S230, the control flow goes to steps S260 and S270 also corresponding to the hybrid control portion 92, to select a group of the HV drive sub-modes permitting the high degree of fuel economy, and then select the pattern 1 of the relationship indicated in FIG. 31 in which one of the overall speed positions is assigned to the fixed-speed-position direct-engine-force-input sub-mode. As a result, the vehicular power transmitting system 14 is shifted to the selected overall speed position which is assigned according to the pattern 1 with the synchronous control, so that shifting shock is reduced.

The time chart of FIG. 33 indicates changes of the various parameters when the group of the HV drive sub-modes permitting the high degree of acceleration response is selected, and the vehicular power transmitting system 14 is shifted from the overall third speed position to the overall fourth speed position not assigned to the direct-engine-force-input sub-mode, according to the pattern 2 of FIG. 31. When an increase of the accelerator pedal operation amount θacc is initiated to accelerate the vehicle 10 at a point of time t1 indicated in FIG. 33, the vehicular power transmitting system 14 is quickly switched from the O/D input split HV drive-sub mode of FIG. 13 (established in the engaged state of the clutch CLc) to the U/D input split HV drive sub-mode of FIG. 12 (establish in the engaged state of the clutch CL1), without transient establishment of the fixed-speed-position direct-engine-force-input sub-mode in which the clutches CL1 and CLc are engaged, with concurrent releasing and engaging actions of the clutches CLc and CL1, and is shifted up from the overall third speed position to the overall fourth speed position, during a time period from a point of time t2 to a point of time t3. During this time period, the first motor/generator MG1 and the second motor/generator MG2 are controlled as indicated in the time chart of FIG. 33. The shift-up action is completed at a point of time t4 at which the engine speed Ne has been lowered to a value corresponding to the overall fourth speed position, with a decrease of the speed ratio of the vehicular power transmitting system 14 as a result of its shift-up action.

The electronic control device 90 for the power transmitting system 14 in the present third embodiment is configured to control the vehicular power transmitting system 14 having the plurality of assignment patterns in each of which plurality overall speed positions are assigned to the U/D input split HV drive sub-modes (first drive mode), the O/D input split HV drive sub-modes (second drive mode) and the fixed-speed-position direct-engine-force-input HV drive sub-mode (third drive mode), as indicated in FIGS. 29 and 31. When the group of the HV drive sub-modes permitting the high fuel economy is selected, the assignment pattern in which at least one of the overall speed positions is assigned to the fixed-speed-position direct-engine-force-input sub-mode is selected according to the pattern 1 of the relationship of FIG. 31, and the vehicular power transmitting system 14 is shifted between the U/D input split HV drive sub-mode and the O/D input split HV drive sub-mode, through the fixed-speed-position direct-engine-force-input sub-mode, so that the risk of generation of the shifting shock upon switching between the U/D and O/D input split HV drive sub-modes is reduced. When the group of the HV drive sub-modes permitting the high acceleration response is selected, the assignment pattern in which none of the overall speed positions is assigned to the fixed-speed-position direct-engine-force-input sub-mode is selected according to the pattern 2 of the relationship of FIG. 31, and the vehicular power transmitting system 14 is shifted between the U/D and O/D input split HV drive sub-modes, with the concurrent engaging and releasing actions of the clutches CL1 and CLc, so that the control response of switching between the U/D and O/D input split HV drive sub-modes can be improved.

Fourth Embodiment

Figure 34:
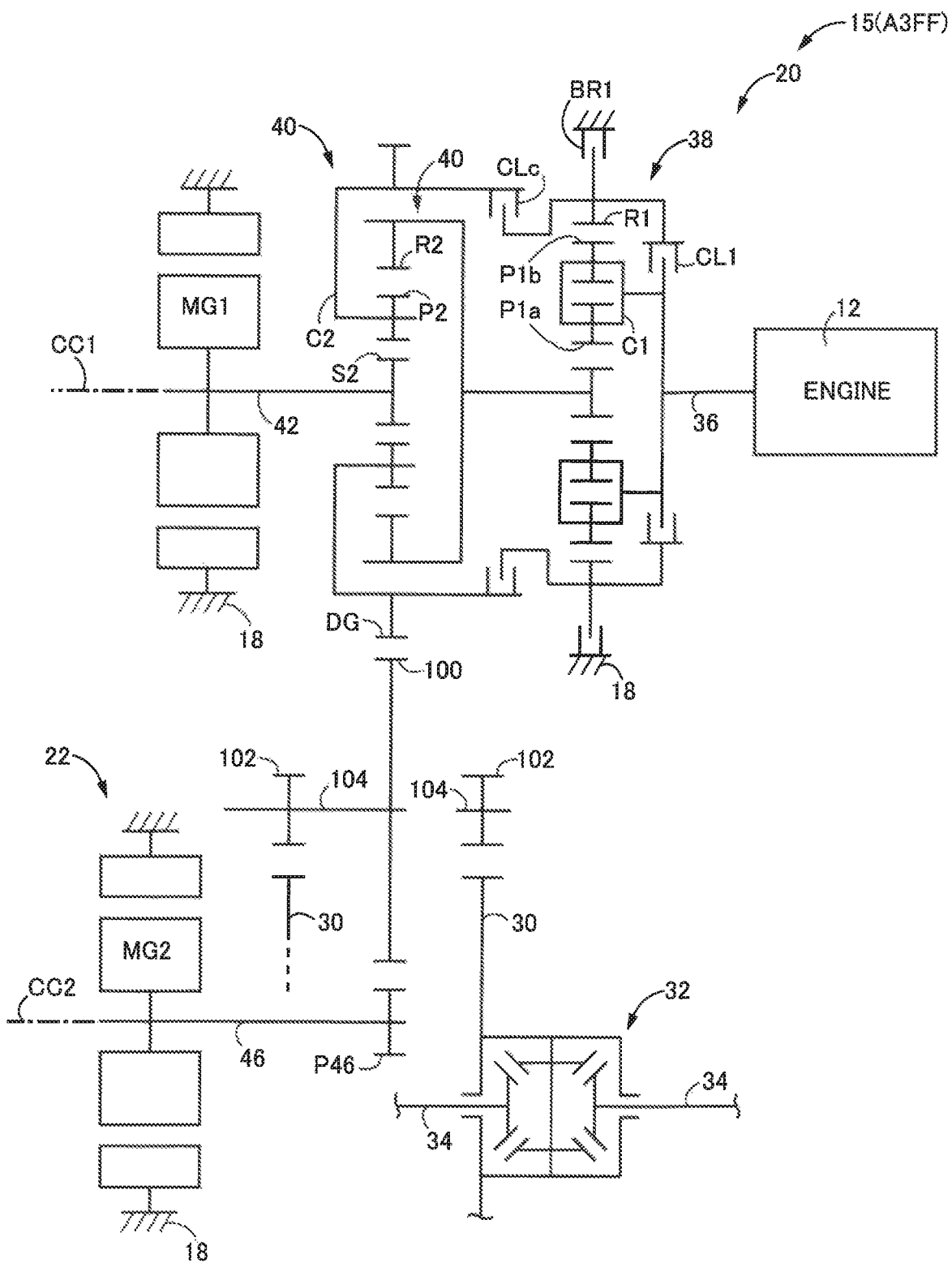
FIG. 34 is a schematic view showing an arrangement of a vehicular power transmitting system having a gear train A3FF according to a still further (fourth) embodiment of this invention.

FIG. 34 is the schematic view showing an arrangement of a vehicular power transmitting system 15 having a gear train A3FF according to a fourth embodiment of this invention. The gear train A3FF in the present vehicular power transmitting system 15 is different from the gear train A3FR of FIG. 1 in that the gear train A3FF is adapted for use for a vehicle of a front-engine front-drive type while the gear train A2FR is adapted for use for a vehicle of a front-engine rear-drive type. The gear train A3FR of FIG. 1 includes the first motor/generator MG1, the second motor/generator MG2, the first power transmitting portion 20 and the second power transmitting portion 22, which are disposed coaxially with each other. In the gear train A3FF of FIG. 34, the first motor/generator MG1 and the first power transmitting portion 20 are disposed coaxially with a first axis C1, while the second motor/generator MG2 and the second power transmitting portion 22 are disposed coaxially with a second axis C2 parallel to the first axis C1.

The gear train A3FF shown in FIG. 34 is different from the gear train A3FR of FIG. 1 in that the gear train A3FF includes: a drum gear DG connected to the second carrier C2 of the second differential mechanism 40; a second motor/generator output gear P46 fixed to the rotor shaft 46 of the second motor/generator MG2; a counter driven gear 100 meshing with the drum gear DG and the second motor/generator output gear P46; and a counter shaft 104 provided with a counter drive gear 102 meshing with the differential ring gear 30 of the differential gear device 32. In the other aspects, the present gear train A3FF is identical with the gear train A3FR of FIG. 1. The present vehicular power transmitting system 15 has substantially the same operational functions and advantages as the vehicular power transmitting system 14 of the first embodiment shown in FIGS. 1-24.

Fifth Embodiment

Figure 35:
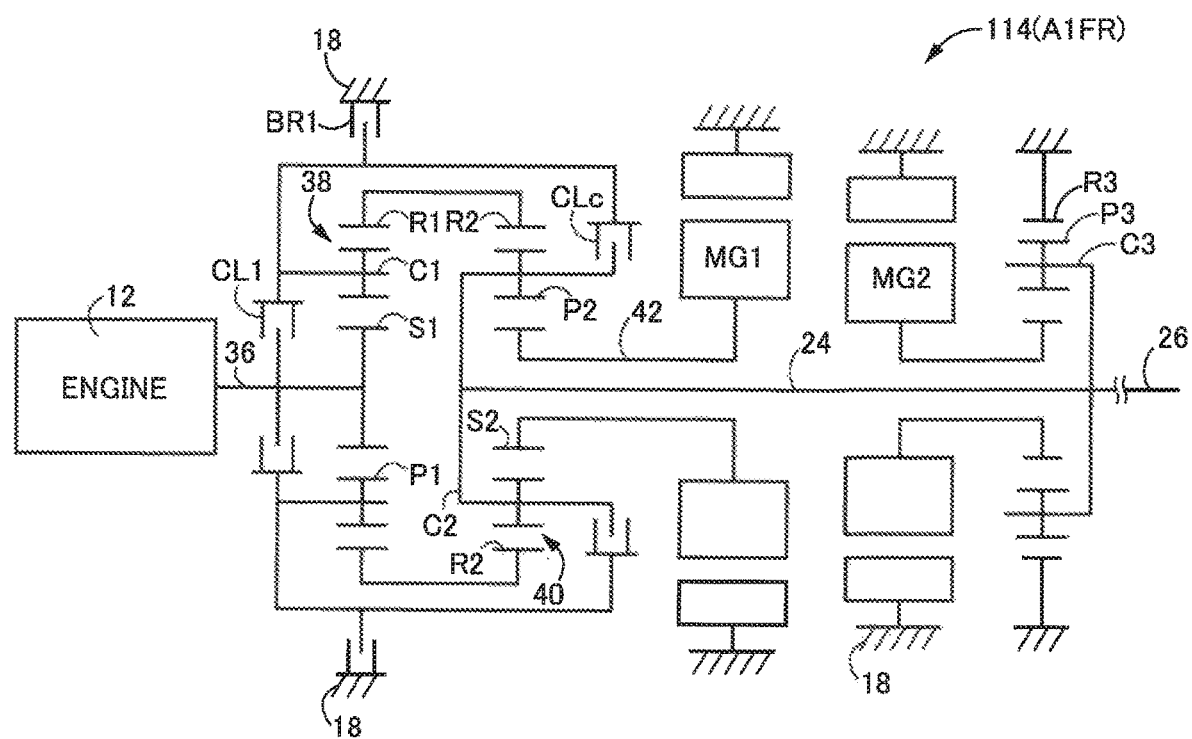
FIG. 35 is a schematic view showing an arrangement of a vehicular power transmitting system having a gear train A1FR according to a yet further (fifth) embodiment of the invention.

FIG. 35 is the schematic view showing an arrangement of a vehicular power transmitting system 114 having a gear train A1FR according to a fifth embodiment of the invention. The present gear train A1FR in the vehicular power transmitting system 114 is similar to the gear train A3FR in the vehicular power transmitting system 14 of FIG. 1 in that the gear train A1FR and the gear train A3FR are adapted for use for the front-engine rear-drive type vehicle. However, the gear train A1FR of FIG. 35 is different from the gear train A3FR of FIG. 1 in that the output of the engine 12 is transmitted to the first sun gear S1 in the first differential mechanism 38 in the gear train A1FR, but is transmitted to the first carrier C1 in the gear train A3FR, and in that the first differential mechanism 38 in the gear train A1FR is a planetary gear mechanism of a single-pinion type. Accordingly, the gear train A1FR of FIG. 35 is different from the gear train A3FR of FIG. 1 in that in the gear train A1FR, the clutch CL1 is disposed between the first sun gear S1 and the first carrier C1, the brake BR1 is disposed between a stationary member in the form of the casing 18 and the first carrier C1, while the clutch CLc is disposed between the first carrier C1 and the second carrier C2. However, the gear train A1FR is identical with the gear train A3FR in the other aspects.

Figure 36:
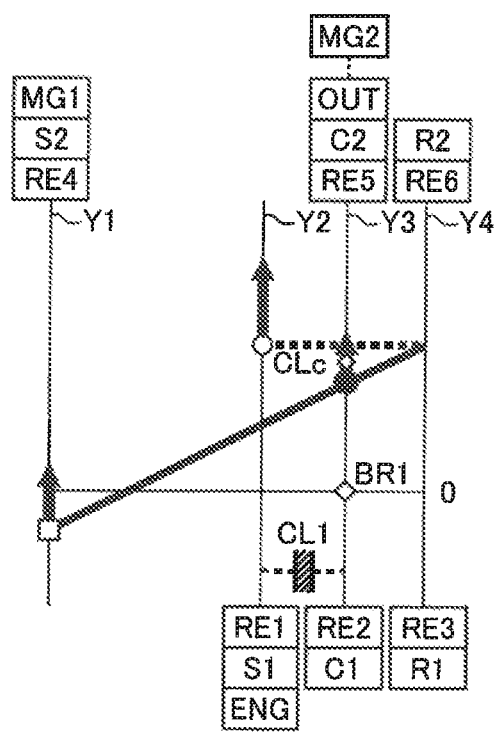
FIG. 36 is a collinear chart corresponding to that of FIG. 12, indicating the relative rotating speeds of the rotary elements when the vehicular power transmitting system according to the fifth embodiment of FIG. 35 is placed in its U/D input split HV drive sub-mode.
Figure 37:
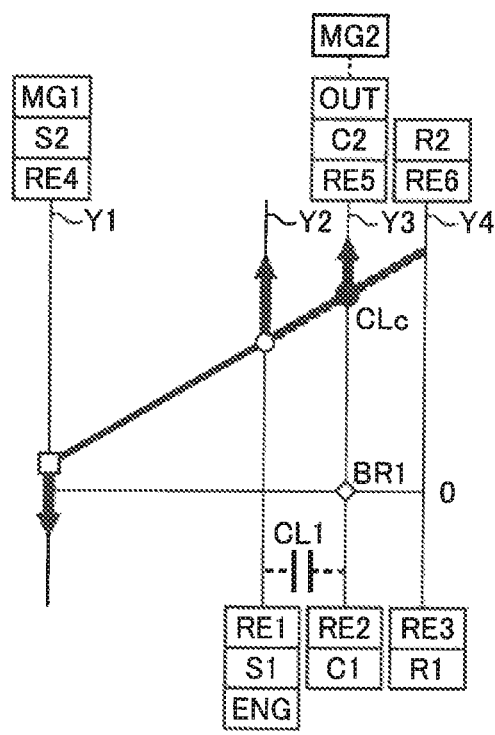
FIG. 37 is a collinear chart corresponding to that of FIG. 13, indicating the relative rotating speeds of the rotary elements when the vehicular power transmitting system according to the fifth embodiment of FIG. 35 is placed in its O/D input split HV drive sub-modes.

The vehicular power transmitting system 114 according to the present fifth embodiment has substantially the same operational functions and advantages as the vehicular power transmitting system 14 of the first embodiment shown in FIGS. 1-24. In the present gear train A1FR, however, the first sun gear S1, the first carrier C1 and the first ring gear R1 of the first differential mechanism 38 respectively correspond to the first, second and third rotary elements RE1, RE2 and RE3. Therefore, the relative rotating speeds of the first sun gear S1, first carrier C1 and first ring gear R1 in the present gear train A1FR are indicated along the respective vertical lines Y2, Y3 and Y4 corresponding to the respective first, second and third rotary elements RE1, RE2 and RE3 in the collinear charts of FIGS. 4-19 as modified such that the first carrier C1 as the first rotary element RE1 is replaced by the first sun gear S1, and the first ring gear R1 as the second rotary element RE2 is replaced by the first carrier C1, while the first sun gear S1 as the third rotary element RE3 is replaced by the first ring gear R1. FIGS. 36 and 37 are the collinear charts corresponding to those of FIGS. 12 and 13, indicating the relative rotating speeds of the rotary elements in the respective U/D input split HV drive sub-mode and the O/D input split HV drive sub-mode.

Sixth Embodiment

Figure 38:
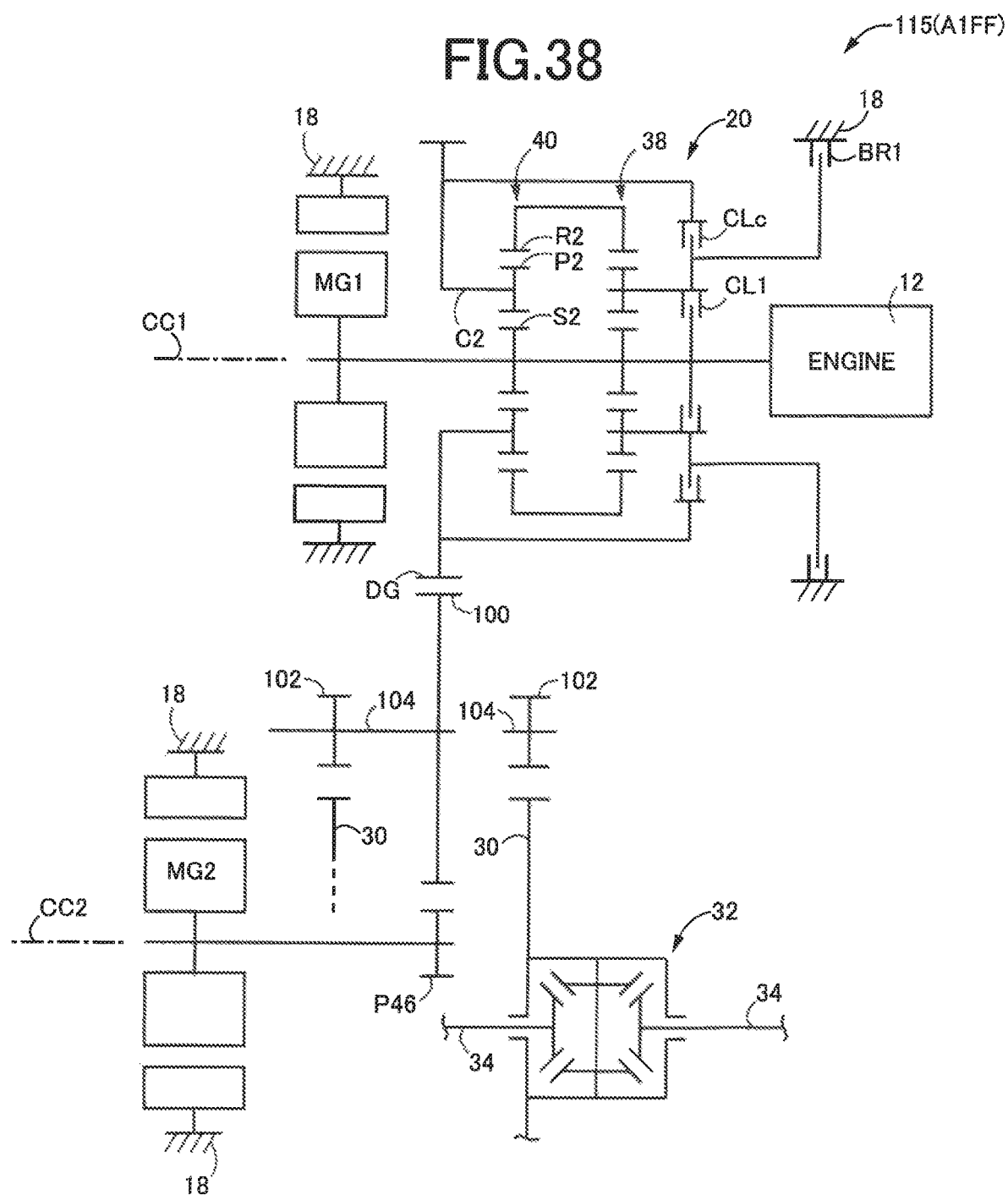
FIG. 38 is a schematic view showing an arrangement of a vehicular power transmitting system having a gear train A1FF according to still another (sixth) embodiment of this invention.

FIG. 38 is the schematic view showing an arrangement of a vehicular power transmitting system 115 having a gear train A1FF according to a sixth embodiment of this invention. The gear train A1FF in the present vehicular power transmitting system 115 is different from the gear train A1FR of FIG. 35 in that the gear train A1FF is adapted for use for a vehicle of a front-engine front-drive type while the gear train A1FR is adapted for use for a vehicle of a front-engine rear-drive type. The gear train A1FR of FIG. 35 includes the first motor/generator MG1, the second motor/generator MG2, the first power transmitting portion 20 and the second power transmitting portion 22, which are disposed coaxially with each other. In the gear train A1FF of FIG. 38, the first motor/generator MG1 and the first power transmitting portion 20 are disposed coaxially with a first axis C1, while the second motor/generator MG2 and the second power transmitting portion 22 are disposed coaxially with a second axis C2 parallel to the first axis C1.

The gear train A1FF shown in FIG. 38 is different from the gear train A1FR of FIG. 35 in that the gear train A1FF includes: a drum gear DG connected to the second carrier C2 of the second differential mechanism 40; a second motor/generator output gear P46 fixed to the rotor shaft 46 of the second motor/generator MG2; a counter driven gear 100 meshing with the drum gear DG and the second motor/generator output gear P46; and a counter shaft 104 provided with a counter drive gear 102 meshing with the differential ring gear 30 of the differential gear device 32. In the other aspects, the present gear train A1FF is identical with the gear train A1FR. The present vehicular power transmitting system 115 has substantially the same operational functions and advantages as the vehicular power transmitting system 114 of the fifth embodiment shown in FIG. 35.

Seventh Embodiment

Figure 39:
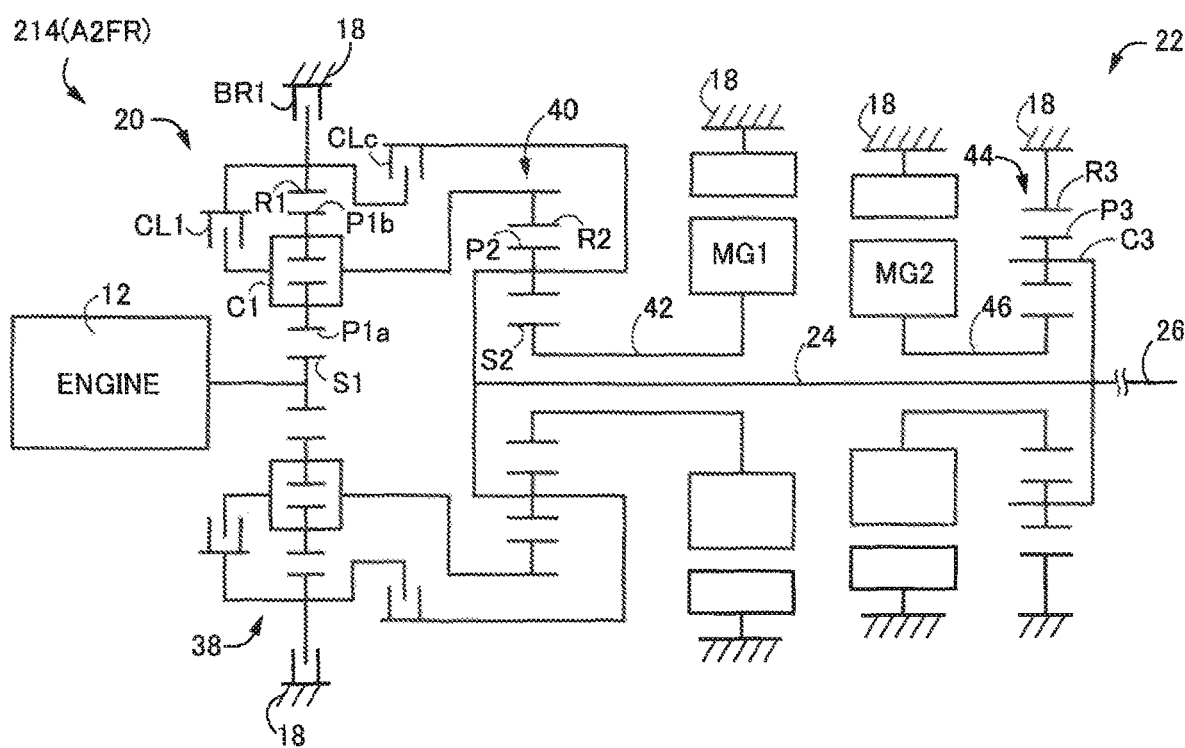
FIG. 39 is a schematic view showing an arrangement of a vehicular power transmitting system having a gear train A2FR according to yet another (seventh) embodiment of this invention.
Figure 40:
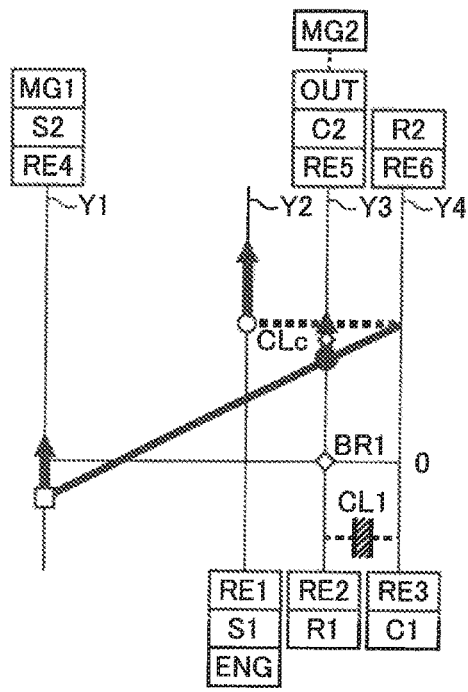
FIG. 40 is a collinear chart corresponding to that of FIG. 12, indicating the relative rotating speeds of the rotary elements when the vehicular power transmitting system according to the seventh embodiment of FIG. 39 is placed in its U/D input split HV drive sub-mode.
Figure 41:
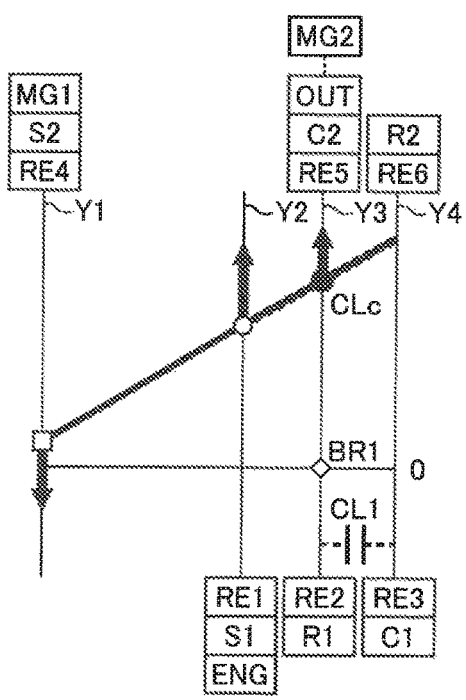
FIG. 41 is a collinear chart corresponding to that of FIG. 13, indicating the relative rotating speeds of the rotary elements when the vehicular power transmitting system according to the seventh embodiment of FIG. 39 is placed in its O/D input split HV drive sub-mode.

FIG. 39 is the schematic view showing an arrangement of a vehicular power transmitting system 214 having a gear train A2FR according to a seventh embodiment of this invention. The present gear train A2FR in the vehicular power transmitting system 214 is similar to the gear train A3FR in the vehicular power transmitting system 14 of FIG. 1 in that the gear train A2FR and the gear train A3FR are adapted for use for the front-engine rear-drive type vehicle. However, the gear train A2FR of FIG. 39 is different from the gear train A3FR of FIG. 1 in that the output of the engine 12 is transmitted to the first sun gear S1 in the first differential mechanism 38 in the gear train A2FR, but is transmitted to the first carrier C1 in the gear train A3FR. In other aspects, the present gear train A2FR is identical with the gear train A3FR. The present vehicular power transmitting system 214 has substantially the same operational functions and advantages as the vehicular power transmitting system 14 of the first embodiment of FIGS. 1-24. In the present gear train A2FR, however, the first sun gear S1, the first ring gear R1 and the first carrier C1 of the first differential mechanism 38 respectively correspond to the first, second and third rotary elements RE1, RE2 and RE3. Therefore, the relative rotating speeds of the first sun gear S1, first ring gear R1 and first carrier C1 in the present gear train A2FR are indicated along the respective vertical lines Y2, Y3 and Y4 corresponding to the respective first, second and third rotary elements RE1, RE2 and RE3 in the collinear charts of FIGS. 4-19 as modified such that the first carrier C1 as the first rotary element RE1 is replaced by the first sun gear S1, and the first sun gear S1 as the third rotary element RE3 is replaced by the first carrier C1. FIGS. 40 and 41 are the collinear charts indicating the relative rotating speeds of the rotary elements in the respective U/D input split HV drive sub-mode and O/D input split HV drive sub-mode corresponding to those of FIGS. 12 and 13.

Eighth Embodiment

Figure 42:
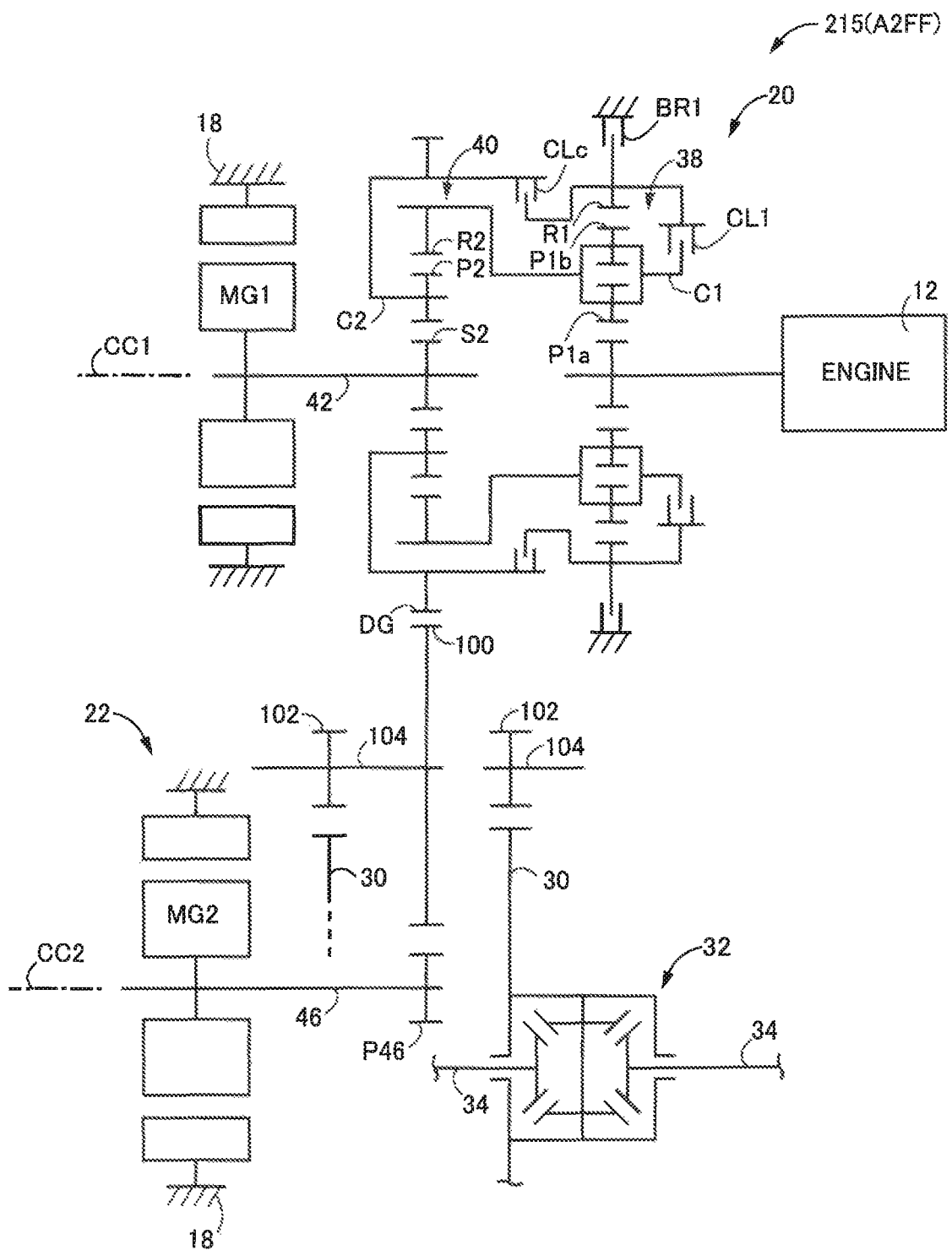
FIG. 42 is a schematic view showing an arrangement of a vehicular power transmitting system having a gear train A2FF according to a further (eighth) embodiment of this invention.

FIG. 42 is the schematic view showing an arrangement of a vehicular power transmitting system 215 having a gear train A2FF according to an eighth embodiment of this invention. The gear train A2FF in the present vehicular power transmitting system 215 is different from the gear train A2FR of FIG. 39 in that the gear train A2FF is adapted for use for a vehicle of a front-engine front-drive type while the gear train A2FR is adapted for use for a vehicle of a front-engine rear-drive type. The gear train A2FR of FIG. 39 includes the first motor/generator MG1, the second motor/generator MG2, the first power transmitting portion 20 and the second power transmitting portion 22, which are disposed coaxially with each other. In the gear train A2FF of FIG. 42, the first motor/generator MG1 and the first power transmitting portion 20 are disposed coaxially with a first axis C1, while the second motor/generator MG2 and the second power transmitting portion 22 are disposed coaxially with a second axis C2 parallel to the first axis C1.

The gear train A2FF shown in FIG. 42 is different from the gear train A2FR of FIG. 39 in that the gear train A2FF includes: a drum gear DG connected to the second carrier C2 of the second differential mechanism 40; a second motor/generator output gear P46 fixed to the rotor shaft 46 of the second motor/generator MG2; a counter driven gear 100 meshing with the drum gear DG and the second motor/generator output gear P46; and a counter shaft 104 provided with a counter drive gear 102 meshing with the differential ring gear 30 of the differential gear device 32. In the other aspects, the present gear train A2FF is identical with the gear train A2FR of FIG. 39. The present vehicular power transmitting system 215 has substantially the same operational functions and advantages as the vehicular power transmitting system 214 of the seventh embodiment shown in FIG. 39.

Ninth Embodiment

Figure 43:
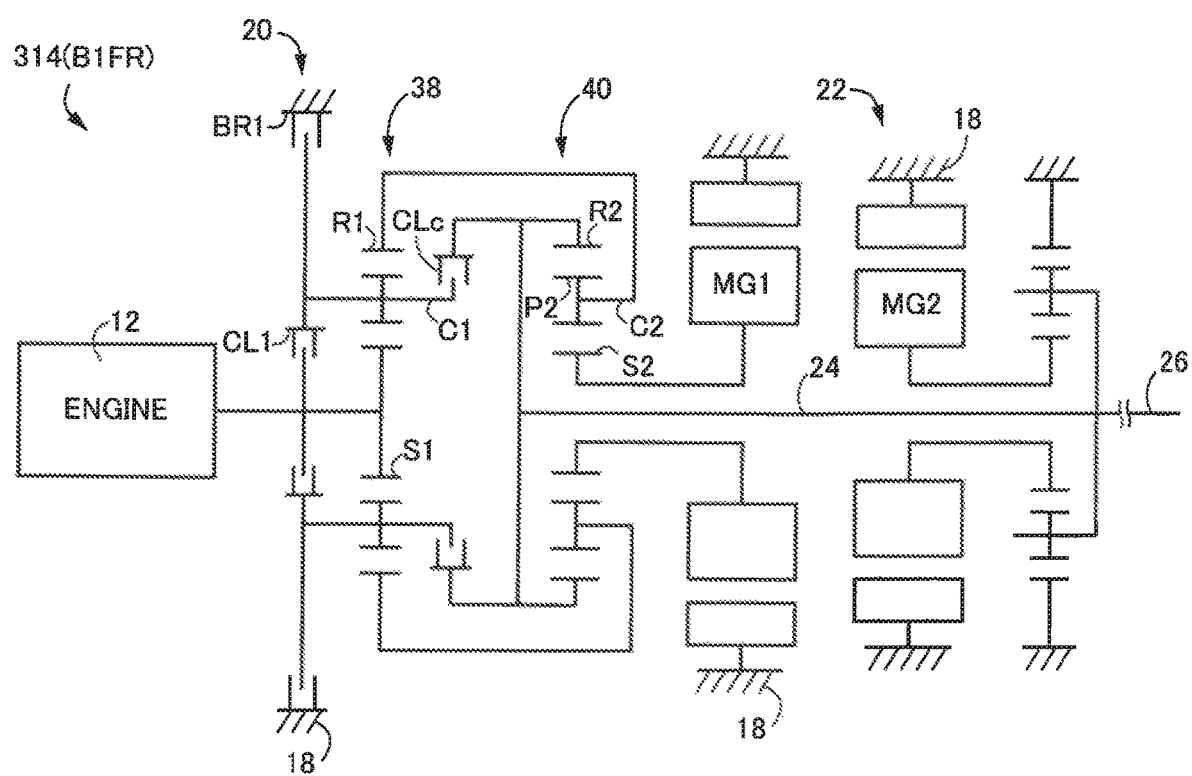
FIG. 43 is a schematic view showing an arrangement of a vehicular power transmitting system having a gear train B1FR according to a still further (ninth) embodiment of the invention.

FIG. 43 is the schematic view showing an arrangement of a vehicular power transmitting system 314 having a gear train B1FR according to a ninth embodiment of the invention. The present gear train B1FR in the vehicular power transmitting system 314 is similar to the gear train A3FR in the vehicular power transmitting system 14 of FIG. 1 in that the gear train B1FR and the gear train A3FR are adapted for use for the front-engine rear-drive type vehicle. However, the gear train B1FR of FIG. 43 is different from the gear train A3FR of FIG. 1 in that the first differential mechanism 38 in the gear train B1FR is a planetary gear mechanism of a single-pinion type, and in that the output of the engine 12 is transmitted to the first sun gear S1 in the first differential mechanism 38 in the gear train B1FR, but is transmitted to the first carrier C1 in the gear train A3FR. Accordingly, the gear train B1FR of FIG. 43 is different from the gear train A3FR of FIG. 1 in that in the gear train B1FR, the clutch CL1 is disposed between the first sun gear S1 and the first carrier C1, the brake BR1 is disposed between a stationary member in the form of the casing 18 and the first carrier C1, while the clutch CLc is disposed between the first carrier C1 and the second ring gear R2, and the second ring gear R2 functions as an output rotary element of the gear train B1FR. The present vehicular power transmitting system 314 has substantially the same operational functions and advantages as the vehicular power transmitting system 14 of the first embodiment of FIGS. 1-24.

Figure 44:
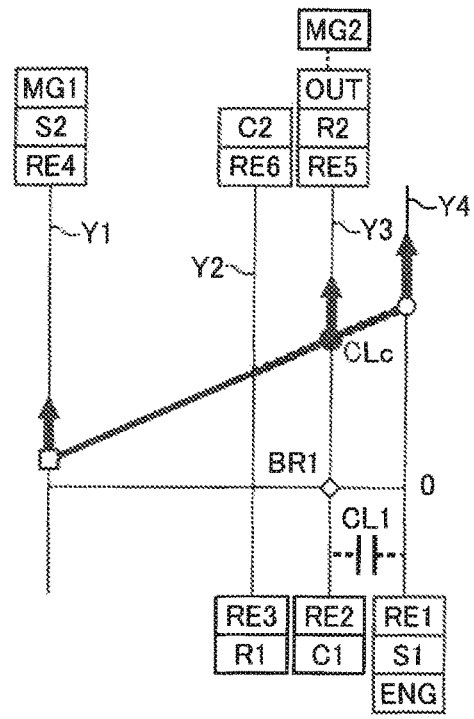
FIG. 44 is a collinear chart corresponding to that of FIG. 12, indicating the relative rotating speeds of the rotary elements when the vehicular power transmitting system according to the ninth embodiment of FIG. 43 is placed in its U/D input split HV drive sub-mode.
Figure 45:
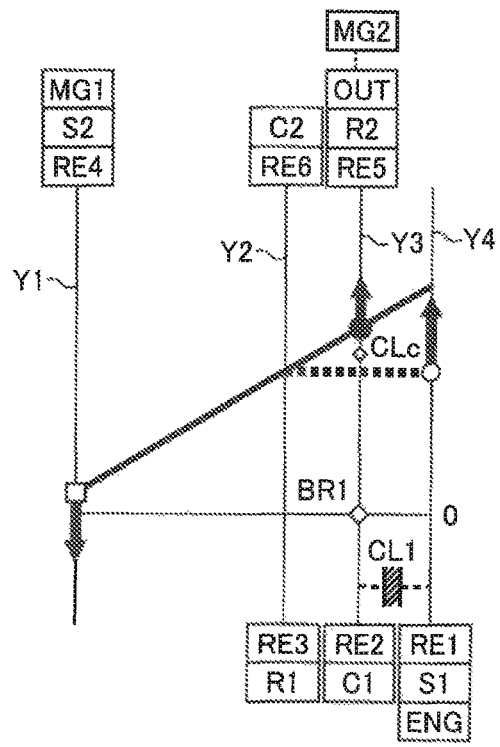
FIG. 45 is a collinear chart corresponding to that of FIG. 13, indicating the relative rotating speeds of the rotary elements when the vehicular power transmitting system according to the ninth embodiment of FIG. 43 is placed in its O/D input split HV drive sub-mode.

In the present gear train B1FR according to the ninth embodiment, the first rotary element RE1 in the form of the first sun gear S1 is connected to the engine 12, the second rotary element RE2 in the form of the first carrier C1 is selectively connected through the clutch CLc to the fifth rotary element RE5 in the form of the second ring gear R2 and the output shaft 24, the third rotary element RE3 in the form of the first ring gear R1 is connected to the sixth rotary element RE6 in the form of the second carrier C2, the fourth rotary element RE4 in the form of the second sun gear S2 is connected to the first motor/generator MG1, and the output shaft 24 is operatively connected to the second motor/generator MG2 in a power transmittable manner. FIGS. 44 and 45 are the collinear charts indicating the relative rotating speeds of the rotary elements RE1-RE6 in the respective U/D input split HV drive sub-mode and the O/D input split HV drive sub-mode corresponding to those of FIGS. 12 and 13. In the first embodiment, the first drive mode (U/D input split HV forward drive sub-mode) is established in the engaged state of the clutch CL1, while the second drive mode (O/D input split HV forward drive sub-mode) is established in the engaged state of the clutch CLc. In the present embodiment of FIG. 43, however, the first drive mode is established in the engaged state of the clutch CLc, while the second drive mode is established in the engaged state of the clutch CL1. FIG. 46 is the table indicating the operating states of the coupling elements in the different sub-modes of the EV and HV drive modes according to the present ninth embodiment.

In the power transmitting system 314 according to the present ninth embodiment, the vertical lines Y1, Y2, Y3 and Y4 in the collinear charts of FIGS. 44 and 45 respectively represent the rotating speed of the fourth rotary element RE4 in the form of the second sun gear S2, the rotating speed of the third and sixth rotary elements RE3 and RE6 in the form of the first ring gear R1 and the second carrier C2, respectively, the rotating speed of the second and fifth rotary elements RE2 and RE5 in the form of the first carrier C1 and the second ring gear R2, respectively, and the rotating speed of the first rotary element RE1 in the form of the first sun gear S1 and the operating speed of the engine 12. The present vehicular power transmitting system 314 is controlled in substantially the same manner as illustrated in FIGS. 22-33, and has substantially the same operational functions and advantages as the vehicular power transmitting system 14 of the first embodiment of FIG. 1.

Tenth Embodiment

Figure 47:
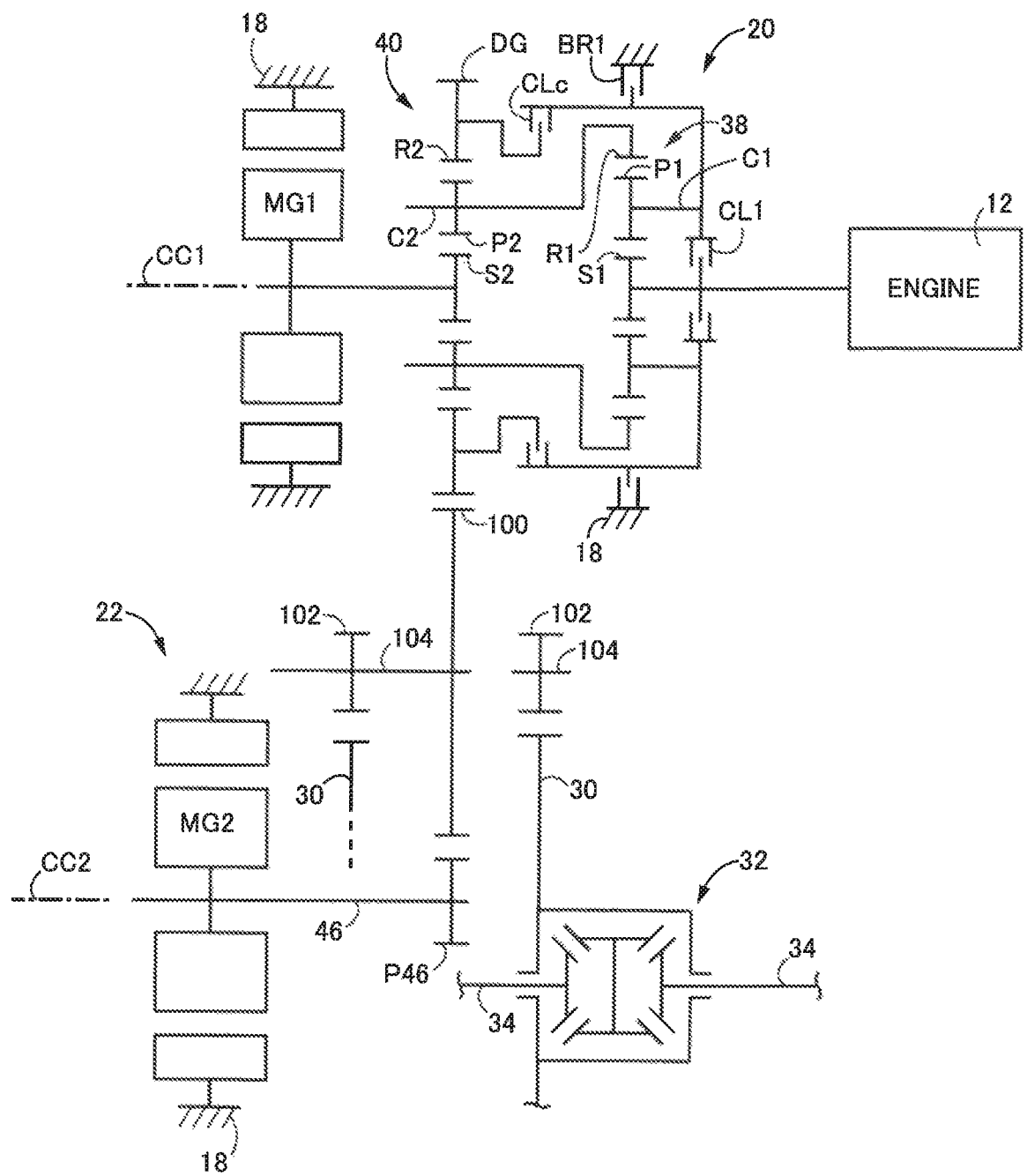
FIG. 47 is a schematic view showing an arrangement of a vehicular power transmitting system having a gear train B1FF according to a yet further (tenth) embodiment of this invention.

FIG. 47 is the schematic view showing an arrangement of a vehicular power transmitting system 315 having a gear train B1FF according to a tenth embodiment of this invention. The gear train B1FF in the present vehicular power transmitting system 315 is different from the gear train B1FR of FIG. 43 in that the gear train B1FF is adapted for use for a vehicle of a front-engine front-drive type while the gear train B1FR is adapted for use for a vehicle of a front-engine rear-drive type. The gear train B1FR of FIG. 43 includes the first motor/generator MG1, the second motor/generator MG2, the first power transmitting portion 20 and the second power transmitting portion 22, which are disposed coaxially with each other. In the gear train B1FF of FIG. 47, the first motor/generator MG1 and the first power transmitting portion 20 are disposed coaxially with a first axis C1, while the second motor/generator MG2 and the second power transmitting portion 22 are disposed coaxially with a second axis C2 parallel to the first axis C1.

The gear train B1FF shown in FIG. 47 is different from the gear train B1FR of FIG. 43 in that the gear train B1FF includes: a drum gear DG connected to the second carrier C2 of the second differential mechanism 40; a second motor/generator output gear P46 fixed to the rotor shaft 46 of the second motor/generator MG2; a counter driven gear 100 meshing with the drum gear DG and the second motor/generator output gear P46; and a counter shaft 104 provided with a counter drive gear 102 meshing with the differential ring gear 30 of the differential gear device 32. In the other aspects, the present gear train B1FF is identical with the gear train B1FR of FIG. 43. The present vehicular power transmitting system 315 has substantially the same operational functions and advantages as the vehicular power transmitting system 314 of the ninth embodiment of FIG. 43.

Eleventh Embodiment

Figure 48:
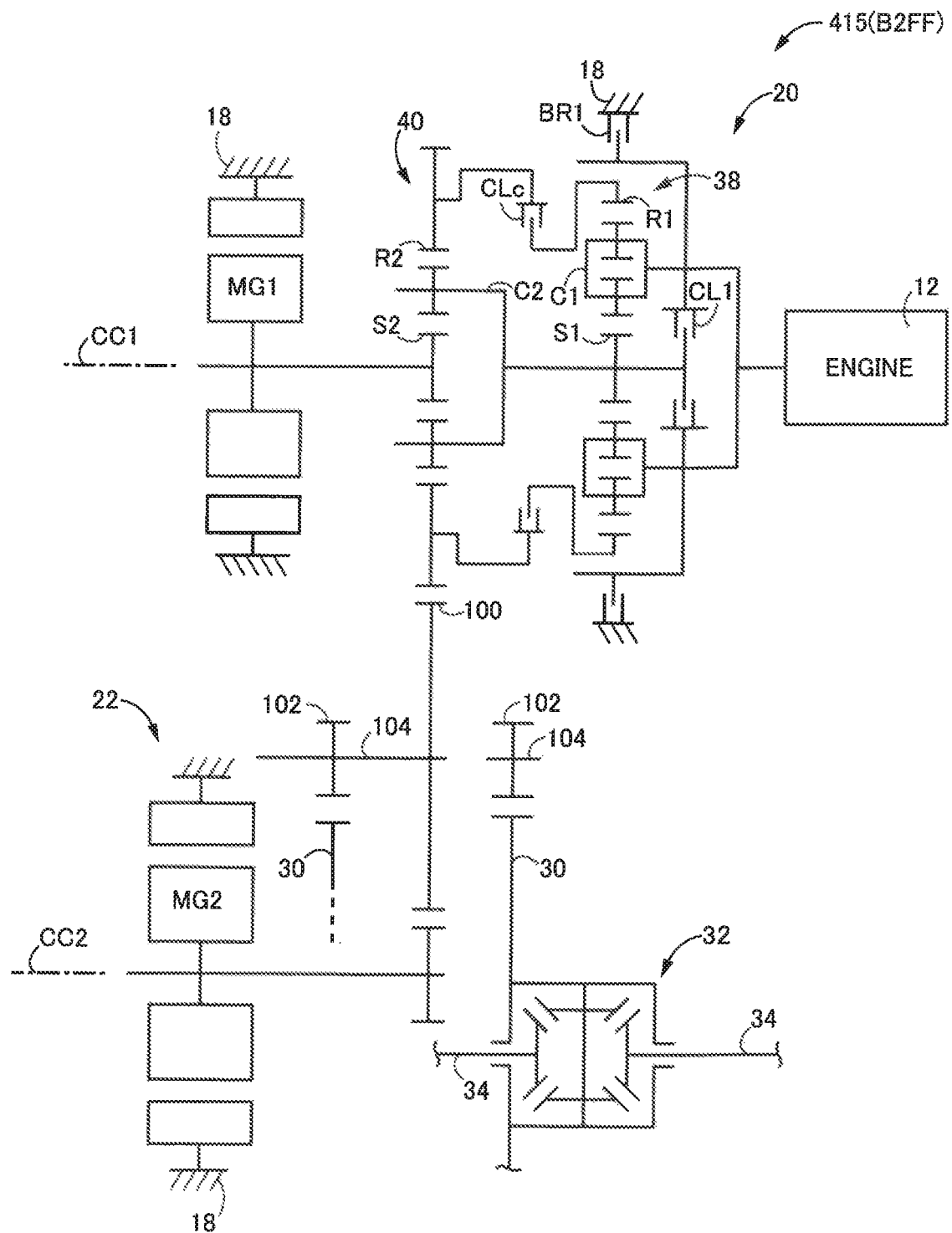
FIG. 48 is a schematic view showing an arrangement of a vehicular power transmitting system having a gear train B2FF according to another (eleventh) embodiment of the invention.

FIG. 48 is the schematic view showing an arrangement of a vehicular power transmitting system 415 having a gear train B2FF according to an eleventh embodiment of the invention. The gear train B2FF is different from the gear train B1FF in the power transmitting system 315 of FIG. 47 in that the first differential mechanism 38 is a planetary gear mechanism of a double-pinion type and in that the clutch CLc is disposed between the first ring gear R1 and the second ring gear R2 while the first sun gear S1 is connected to the second carrier C2. In the other aspects, the present gear train B2FF is identical with the gear train B1FF. The present vehicular power transmitting system 415 has substantially the same operational functions and advantages as the vehicular power transmitting system 314 of the ninth embodiment of FIG. 43.

Twelfth Embodiment

Figure 49:
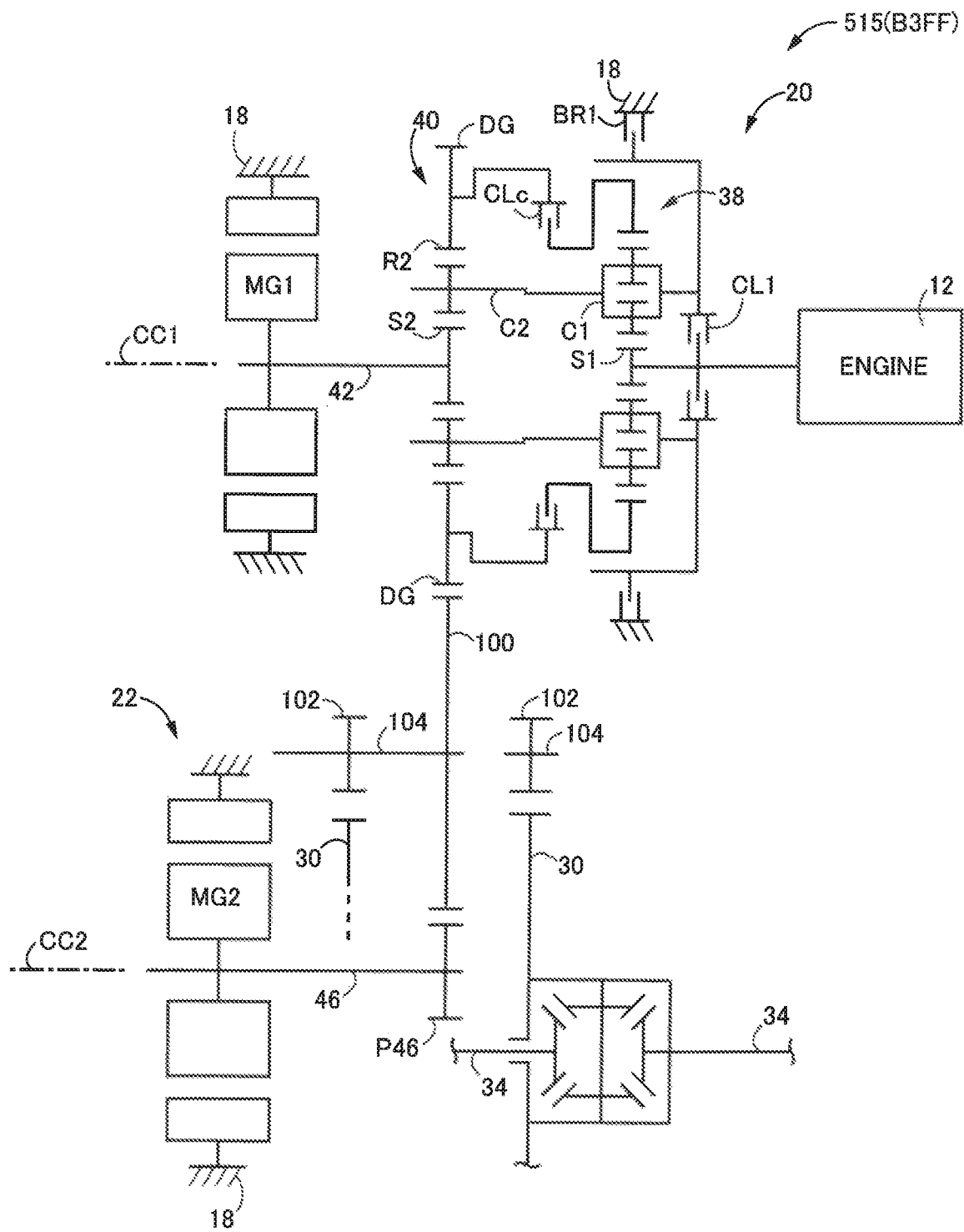
FIG. 49 is a schematic view showing an arrangement of a vehicular power transmitting system having a gear train B3FF according to a further (twelfth) embodiment of this invention.

FIG. 49 is the schematic view showing an arrangement of a vehicular power transmitting system 515 having a gear train B3FF according to a twelfth embodiment of this invention. The gear train B3FF is different from the gear train B1FF in the power transmitting system 315 of FIG. 47 in that the first differential mechanism 38 is a planetary gear mechanism of a double-pinion type and in that the clutch CLc is disposed between the first ring gear R1 and the drum gear DG while the first carrier C1 and the second carrier C2 are connected to each other. In the other aspects, the present gear train B3FF is identical with the gear train B1FF. The present vehicular power transmitting system 515 has substantially the same operational functions and advantages as the vehicular power transmitting system 314 of the ninth embodiment of FIG. 43.

Thirteenth Embodiment

Figure 50:
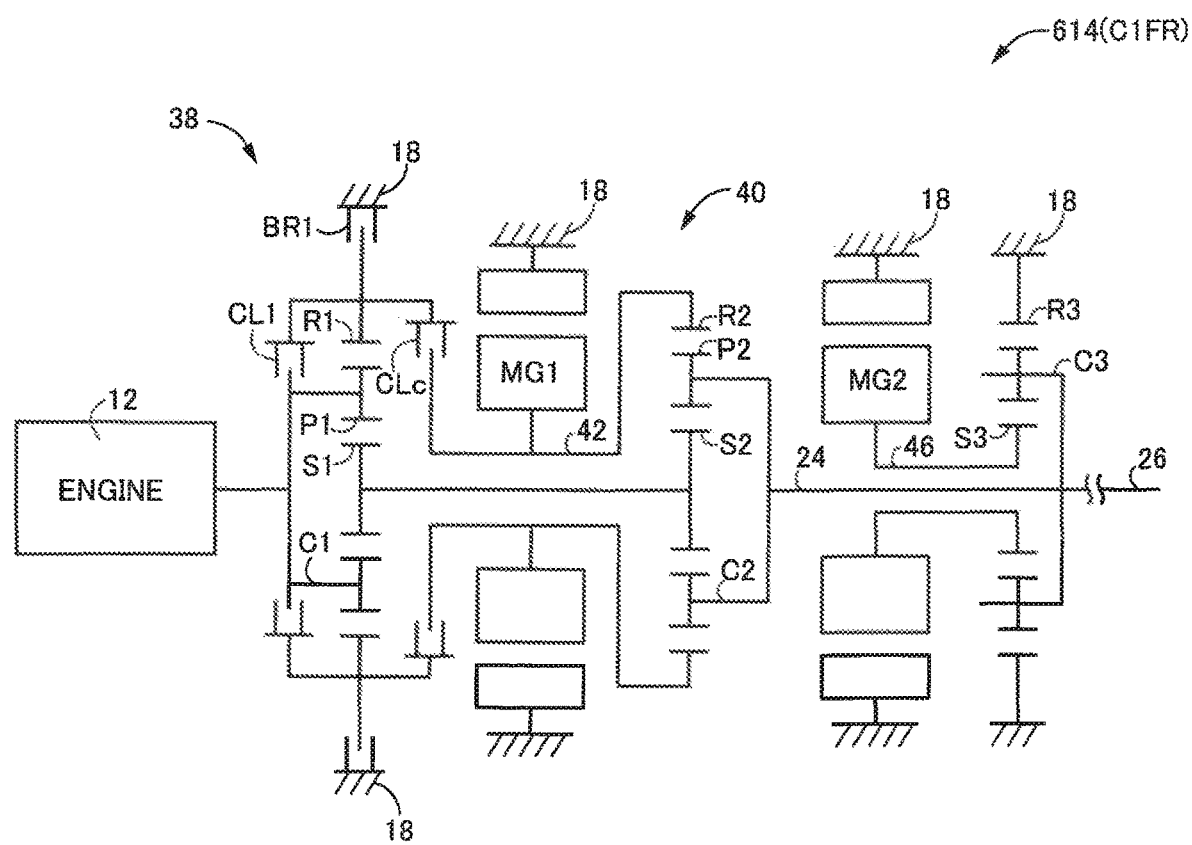
FIG. 50 is a schematic view showing an arrangement of a vehicular power transmitting system having a gear train C1FR according to a still further (thirteenth) embodiment of the invention.

FIG. 50 is the schematic view showing an arrangement of a vehicular power transmitting system 614 having a gear train C1FR according to a thirteenth embodiment of the invention. The present gear train C1FR in the vehicular power transmitting system 614 is similar to the gear train A3FR in the vehicular power transmitting system 14 of FIG. 1 in that the gear train C1FR and the gear train A3FR are adapted for use for the front-engine rear-drive type vehicle, and in that the output of the engine 12 is transmitted to the first carrier C1 in the first differential mechanism 38 in the gear train C1FR. However, the gear train C1FR of FIG. 50 is different from the gear train A3FR of FIG. 1 in that the first differential mechanism 38 in the gear train C1FR is a planetary gear mechanism of a singe-pinion type. The gear train C1FR of FIG. 50 is different from the gear train A3FR of FIG. 1 in that in the gear train C1FR of FIG. 50, the clutch CLc is disposed between the first ring gear R1 and the second ring gear R2 while the first motor/generator MG1 is connected to the second ring gear R2.

The power transmitting system 614 according to the present thirteenth embodiment has substantially the same operational functions and advantages as the vehicular power transmitting system 14 of the first embodiment of FIGS. 1-24. In the present power transmitting system 614, all of the rotary elements of the first differential mechanism 38 are rotated as a unit when the clutch CLc is placed in the engaged state in which the first ring gear R1 (second rotary element RE2) and the second ring gear R2 (fourth rotary element RE4) are connected to each other. In the present gear train C1FR, the first rotary element RE1 in the form of the first carrier C1 is connected to the engine 12, the second rotary element RE2 in the form of the first ring gear R1 is selectively connected through the clutch CLc to the fourth rotary element RE4 in the form of the second ring gear R2, the third rotary element RE3 in the form of the first sun gear S1 is connected to the sixth rotary element RE6 in the form of the second sun gear S2, the fourth rotary element RE4 in the form of the second ring gear R2 is connected to the first motor/generator MG1, and the output shaft 24 is operatively connected to the second motor/generator MG2 in a power transmittable manner.

Figure 51:
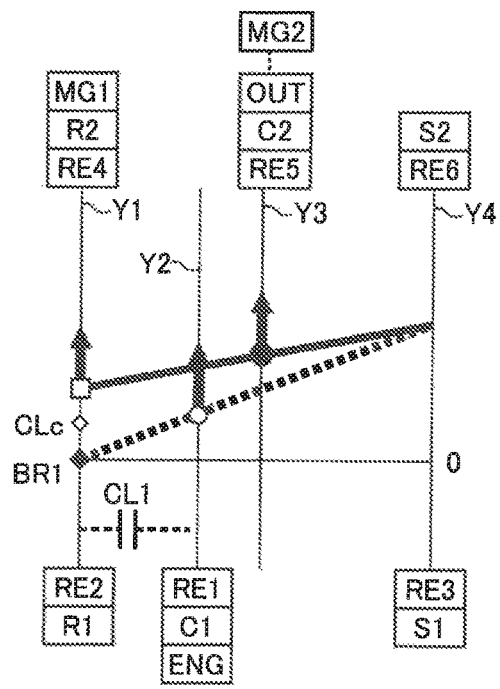
FIG. 51 is a collinear chart indicating the relative rotating speeds of the rotary elements when the vehicular power transmitting system according to the thirteenth embodiment of FIG. 50 is placed in its U/D input split HV drive sub-mode (high-drive mode)
Figure 52:
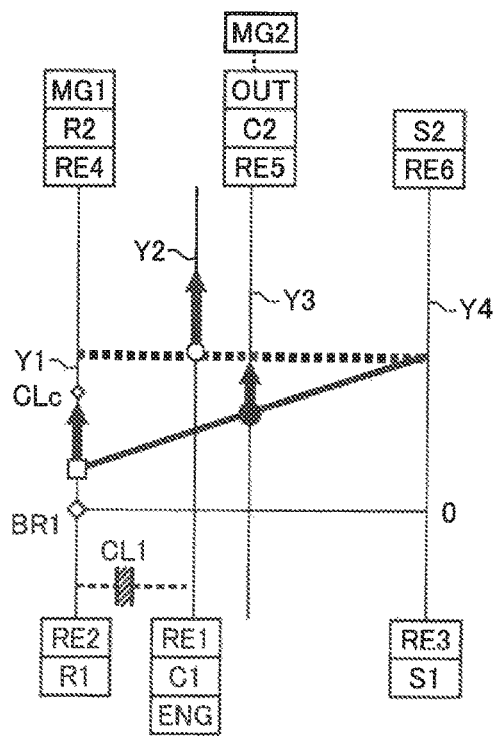
FIG. 52 is a collinear chart indicating the relative rotating speeds of the rotary elements when the vehicular power transmitting system according to the thirteenth embodiment of FIG. 50 is placed in its U/D input split HV drive sub-mode (low-drive mode)
Figure 53:
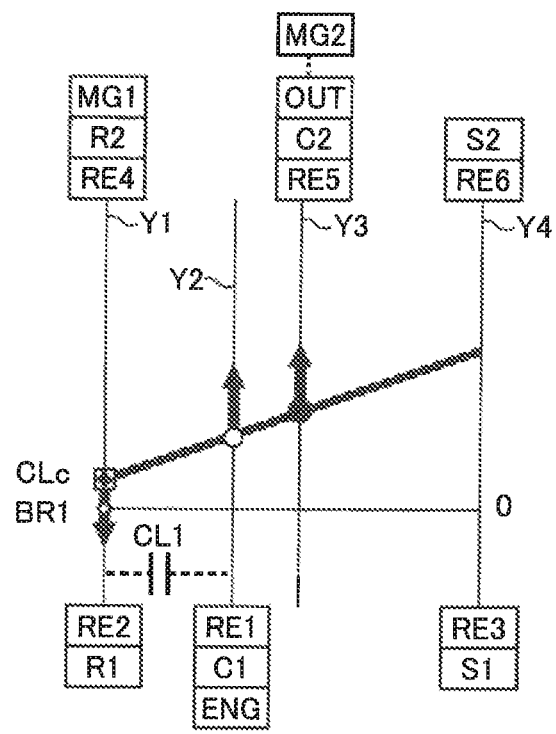
FIG. 53 is a collinear chart indicating the relative rotating speeds of the rotary elements when the vehicular power transmitting system according to the thirteenth embodiment of FIG. 50 is placed in its O/D input split HV drive sub-mode.

FIGS. 51, 52 and 53 are the collinear charts indicating the relative rotating speeds of the rotary elements in the respective U/D input split HV drive sub-mode (high-drive mode), U/D input split HV drive sub-mode (low-drive mode) and O/D input split HV drive sub-mode. The U/D input split HV drive sub-mode of FIG. 51 and the O/D input split HV drive sub-mode of FIG. 53 respectively correspond to those of FIGS. 12 and 13. In the first embodiment, the first drive mode (U/D input split HV forward drive sub-mode) is established in the engaged state of the clutch CL1, while the second drive mode (O/D input split HV forward drive sub-mode) is established in the engaged state of the clutch CLc. In the present thirteenth embodiment, however, the first drive mode is established in the engaged state of the clutch CLc, while the second drive mode is established in the engaged state of the clutch CL1. FIG. 54 is the table indicating the operating states of the coupling elements in the different sub-modes of the EV and HV drive modes according to the present thirteenth embodiment.

In the power transmitting system 614 according to the present thirteenth embodiment, the vertical lines Y1, Y2, Y3 and Y4 in the collinear charts of FIGS. 51-53 respectively represent the rotating speed of the second and fourth rotary elements RE2 and RE4 in the form of the first and second ring gears R1 and R2, the rotating speed of the first rotary element RE1 in the form of the first C1, the rotating speed of the fifth rotary element RE5 in the form of the second carrier C2, and the rotating speed of the third and sixth rotary elements RE3 and RE6 in the form of the first and second sun gears S1 and S2, respectively. The present vehicular power transmitting system 614 is controlled in substantially the same manner as illustrated in FIGS. 22-33, and has substantially the same operational functions and advantages as the vehicular power transmitting system 14 of the first embodiment of FIG. 1. In the present gear train C1FR, all of the rotary elements of the first differential mechanism 38 are rotated as a unit in the first drive mode.

Fourteenth Embodiment

Figure 55:
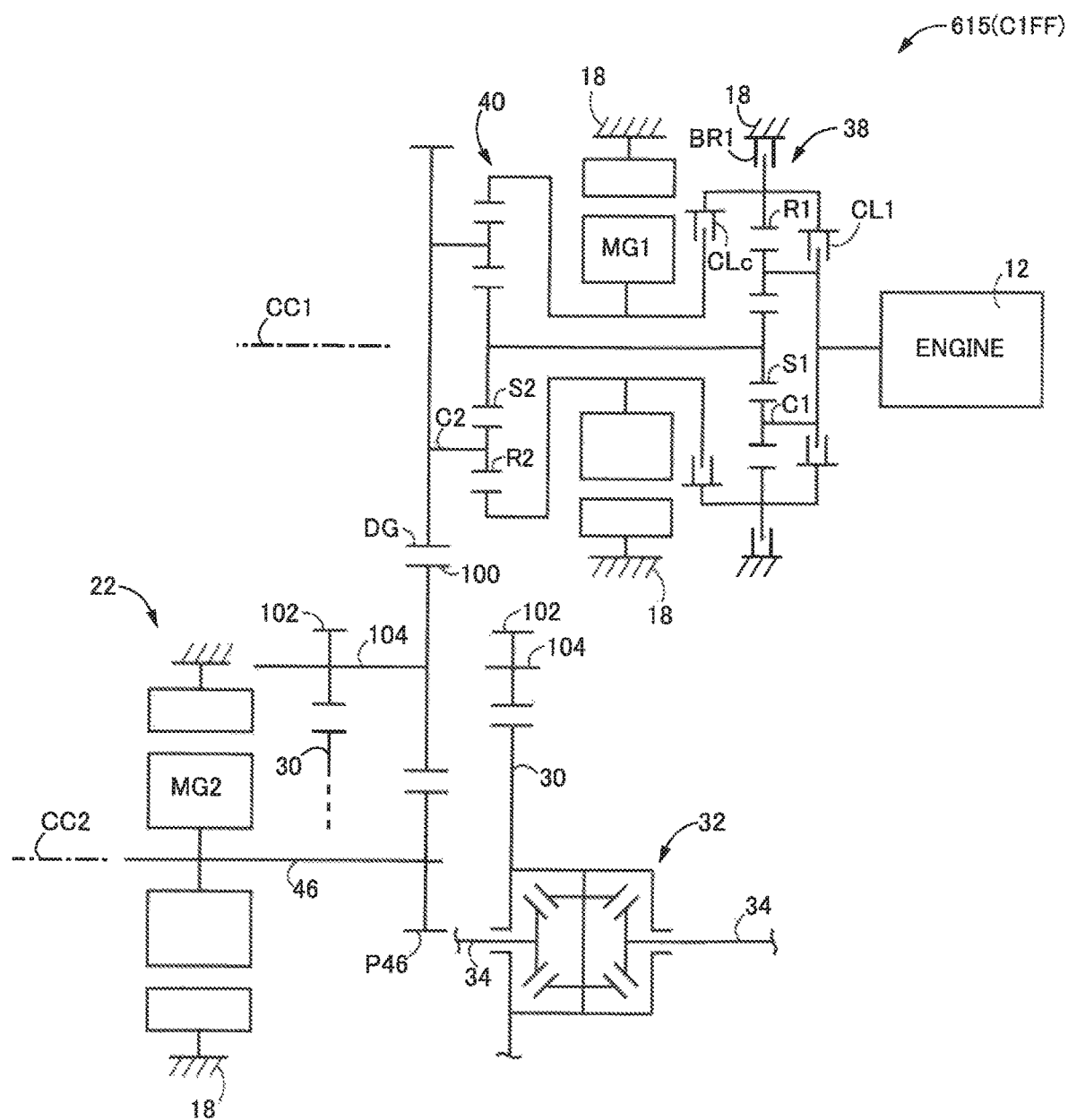
FIG. 55 is a schematic view showing an arrangement of a vehicular power transmitting system having a gear train C1FF according to another (fourteenth) embodiment of this invention.

FIG. 55 is the schematic view showing an arrangement of a vehicular power transmitting system 615 having a gear train C1FF according to a fourteenth embodiment of the invention. The gear train C1FF in the present vehicular power transmitting system 615 is different from the gear train C1FR of FIG. 50 in that the gear train C1FF is adapted for use for a vehicle of a front-engine front-drive type while the gear train C1FR is adapted for use for a vehicle of a front-engine rear-drive type. The gear train C1FR of FIG. 50 includes the first motor/generator MG1, the second motor/generator MG2, the first power transmitting portion 20 and the second power transmitting portion 22, which are disposed coaxially with each other. In the gear train C1FF of FIG. 55, the first motor/generator MG1 and the first power transmitting portion 20 are disposed coaxially with a first axis CC1, while the second motor/generator MG2 and the second power transmitting portion 22 are disposed coaxially with a second axis CC2 parallel to the first axis CC1.

The gear train C1FF shown in FIG. 55 is different from the gear train C1FR of FIG. 50 in that the gear train A3FF includes: a drum gear DG connected to the second carrier C2 of the second differential mechanism 40; a second motor/generator output gear P46 fixed to the output shaft 46 of the second motor/generator MG2; a counter driven gear 100 meshing with the drum gear DG and the second motor/generator output gear P46; and a counter shaft 104 provided with a counter drive gear 102 meshing with the differential ring gear 30 of the differential gear device 32. In the other aspects, the present gear train C1FF is identical with the gear train C1FR of FIG. 50. The present vehicular power transmitting system 615 has substantially the same operational functions and advantages as the vehicular power transmitting system 614 of the thirteenth embodiment shown in FIG. 50.

Fifteenth Embodiment

Figure 56:
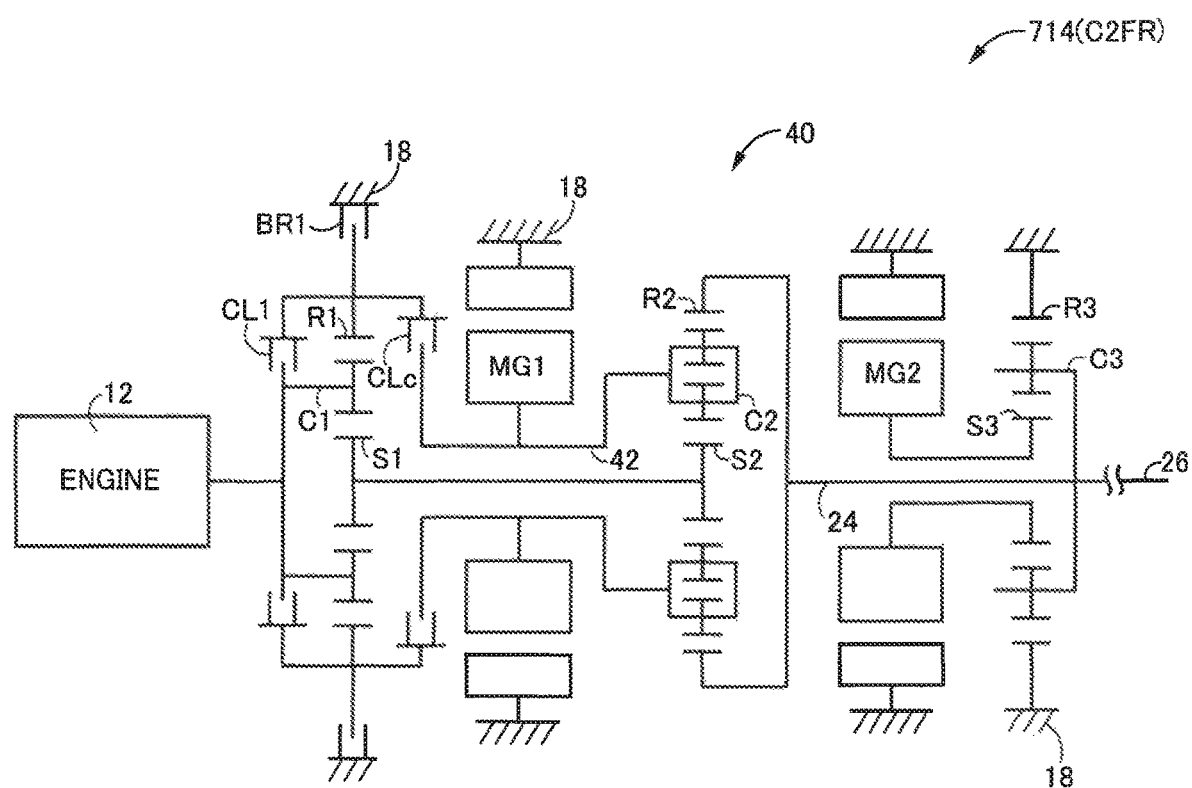
FIG. 56 is a schematic view showing an arrangement of a vehicular power transmitting system having a gear train C2FR according to still another (fifteenth) embodiment of the invention.

FIG. 56 is the schematic view showing an arrangement of a vehicular power transmitting system 714 having a gear train C2FR according to a fifteenth embodiment of the invention. The gear train C2FR is different from the gear train C1FR in the power transmitting system 614 of FIG. 50 in that the second differential mechanism 40 is a planetary gear mechanism of a double-pinion type. In the other aspects, the present gear train C2FR is identical with the gear train C1FR. The present vehicular power transmitting system 714 has substantially the same operational functions and advantages as the vehicular power transmitting system 614 shown in FIG. 50.

Sixteenth Embodiment

Figure 57:
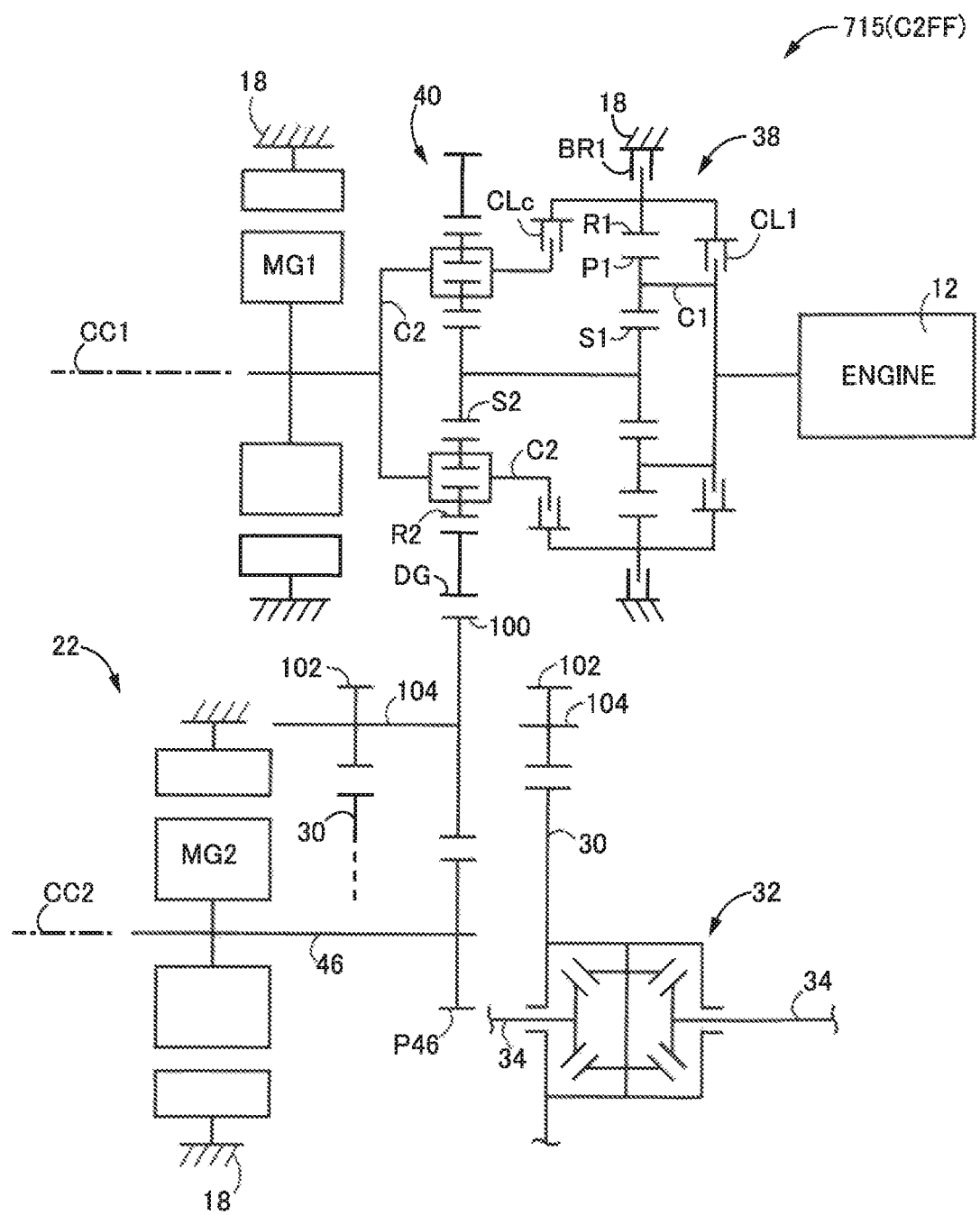
FIG. 57 is a schematic view showing an arrangement of a vehicular power transmitting system having a gear train C2FF according to yet another (sixteenth) embodiment of this invention.

FIG. 57 is the schematic view showing an arrangement of a vehicular power transmitting system 715 having a gear train C2FF according to a sixteenth embodiment of the invention. The gear train C2FF in the present vehicular power transmitting system 715 is different from the gear train C1FF in the power transmitting system 615 of FIG. 55 in that the second differential mechanism 40 is a planetary gear mechanism of a double-pinion type. In the other aspects, the present gear train C2FF is identical with the gear train C1FF. The present vehicular power transmitting system 715 has substantially the same operational functions and advantages as the vehicular power transmitting system 615 of the fourteenth embodiment of FIG. 55.

Seventeenth Embodiment

Figure 58:
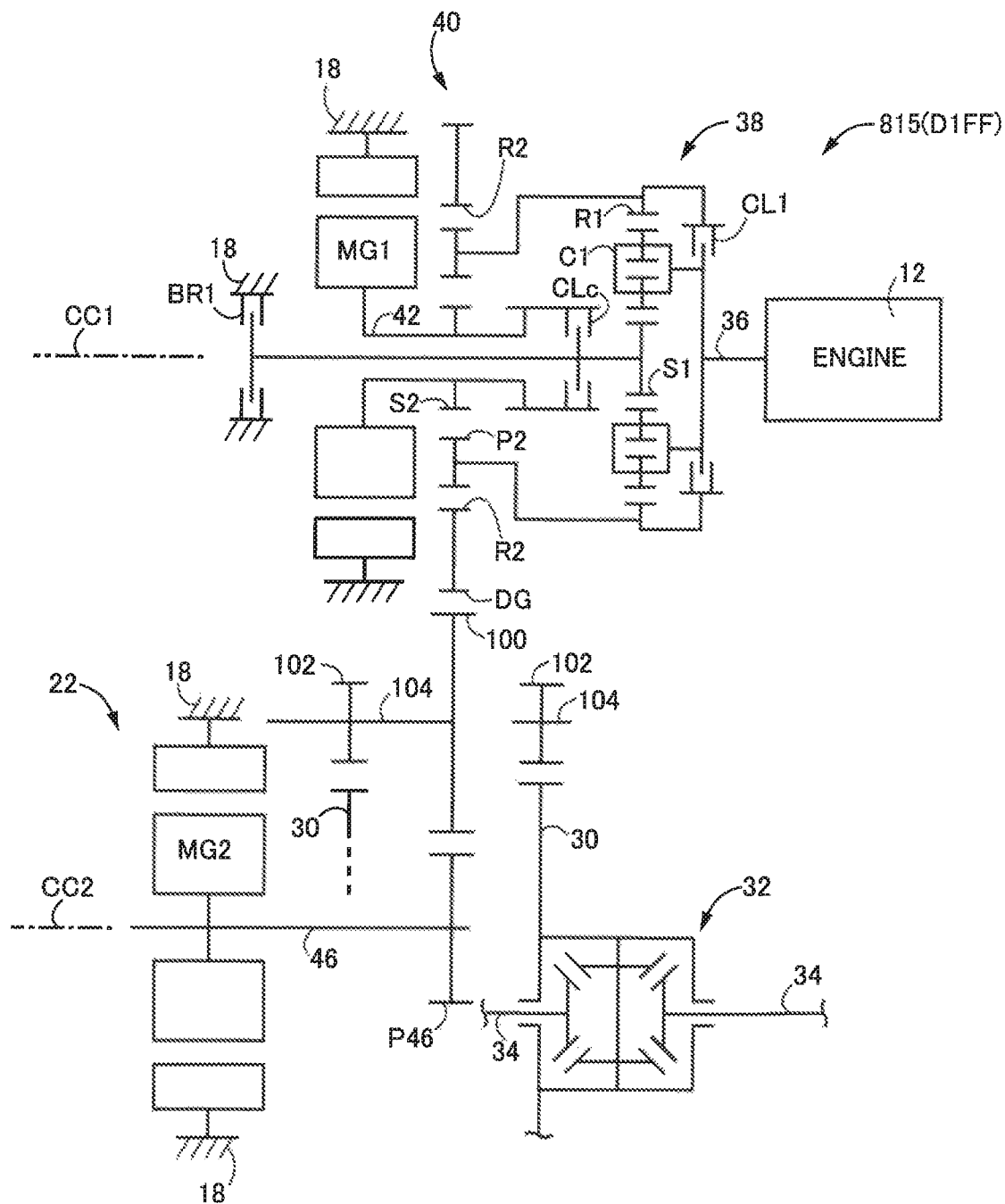
FIG. 58 is a schematic view showing an arrangement of a vehicular power transmitting system having a gear train D1FF according to a further (seventeenth) embodiment of the invention.

FIG. 58 is the schematic view showing an arrangement of a vehicular power transmitting system 815 having a gear train D1FF according to a thirteenth embodiment of the invention. The gear train D1FF in the present vehicular power transmitting system 815 is different from the gear train A3FR of FIG. 1 in that the gear train D1FF is adapted for use for a vehicle of a front-engine front-drive type while the gear train A3FR is adapted for use for a vehicle of a front-engine rear-drive type. The gear train A3FR of FIG. 1 includes the first motor/generator MG1, the second motor/generator MG2, the first power transmitting portion 20 and the second power transmitting portion 22, which are disposed coaxially with each other. In the gear train D1FF of FIG. 58, the first motor/generator MG1 and the first power transmitting portion 20 are disposed coaxially with a first axis CC1, while the second motor/generator MG2 and the second power transmitting portion 22 are disposed coaxially with a second axis CC2 parallel to the first axis CC1.

In the first differential mechanism 38 and the second differential mechanism 40 in the gear train D1FF of FIG. 58, the first ring gear R1 and the second carrier C2 are connected to each other, the clutch CL1 is disposed between the first carrier C1 and the second carrier C2, the brake BR1 is disposed between the stationary member in the form of the casing 18 and the first sun gear S1, the clutch CLc is disposed between the first sun gear S1 and the second sun gear S2, and the second ring gear R2 functions as an output rotary element of the gear train D1FF. In these aspects, the gear train D1FF is different from the gear train A3FR of FIG. 1. In the other aspects, the gear train D1FF is identical with the gear train A3FR. The vehicular power transmitting system 815 according to the present seventeenth embodiment has substantially the same operational functions and advantages as the vehicular power transmitting system 14 according to the first embodiment of FIGS. 1-24.

Figure 59:
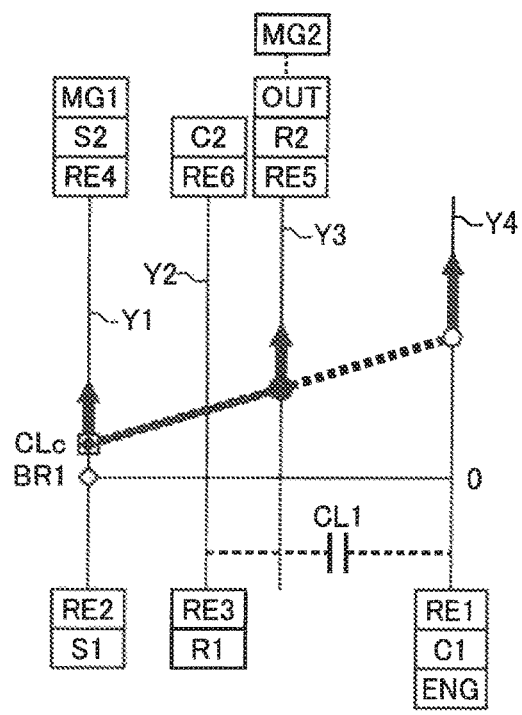
FIG. 59 is a collinear chart indicating the relative rotating speeds of the rotary elements when the vehicular power transmitting system according to the seventeenth embodiment of FIG. 58 is placed in its U/D input split HV drive sub-mode.
Figure 60:
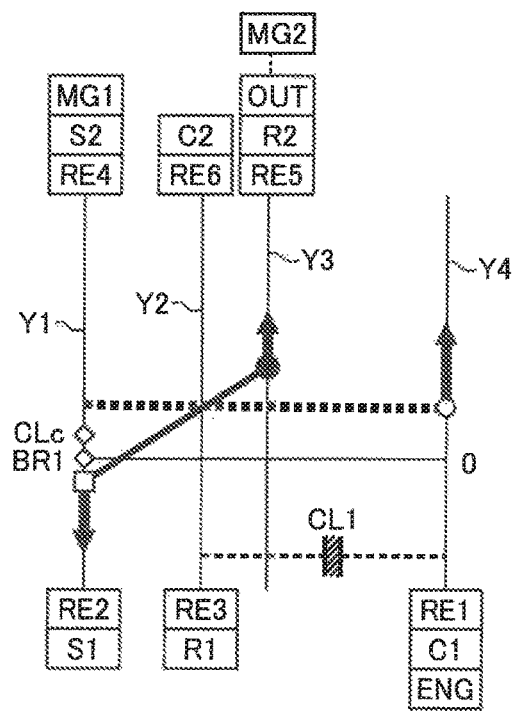
FIG. 60 is a collinear chart indicating the relative rotating speeds of the rotary elements when the vehicular power transmitting system according to the seventeenth embodiment of FIG. 58 is placed in its O/D input split HV drive sub-mode (high-drive mode)
Figure 61:
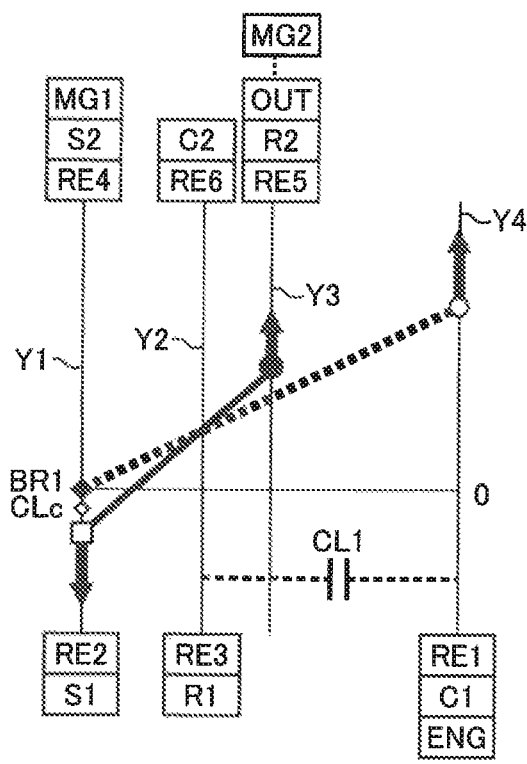
FIG. 61 is a collinear chart indicating the relative rotating speeds of the rotary elements when the vehicular power transmitting system according to the seventeenth embodiment of FIG. 58 is placed in its O/D input split HV drive sub-mode (low-drive mode)

In the present gear train B1FR, the first rotary element RE1 in the form of the first carrier C1 is connected to the engine 12, the second rotary element RE2 in the form of the first sun gear S1 is selectively connected through the clutch CLc to the fourth rotary element RE4 in the form of the second sun gear S2 and the first motor/generator MG1, the third rotary element RE3 in the form of the first ring gear R1 is connected to the sixth rotary element RE6 in the form of the second carrier C2, the fifth rotary element RE5 in the form of the second ring gear R2 is operatively connected to the output rotary member of the gear train B1FR in a power transmittable manner. FIGS. 59, 60 and 61 are the collinear charts corresponding to those of FIGS. 12 and 13 according to the first embodiment and indicate the relative rotating speeds of the rotary elements in the respective U/D input split HV drive sub-mode, O/D input split HV drive sub-mode (high-drive mode) and O/D input split HV drive sub-mode (low-drive mode). In the first embodiment, the first drive mode (U/D input split HV forward drive sub-mode) is established in the engaged state of the clutch CL1, while the second drive mode (O/D input split HV forward drive sub-mode) is established in the engaged state of the clutch CLc. In the present seventeenth embodiment, however, the first drive mode is established in the engaged state of the clutch CLc, while the second drive mode is established in the engaged state of the clutch CL1. FIG. 62 is the table indicating the operating states of the coupling elements in the different sub-modes of the EV and HV drive modes according to the present seventeenth embodiment.

In the power transmitting system 815 according to the present seventeenth embodiment, the vertical lines Y1, Y2, Y3 and Y4 in the collinear charts of FIGS. 4-19 referred to above with respect to the first embodiment respectively represent the rotating speed of the second and fourth rotary elements RE2 and RE4 in the form of the first and second sun gears S1 and S2, respectively, the rotating speed of the third and sixth rotary elements RE3 and RE6 in the form of the first ring gear R1 and the second carrier C2, respectively, the rotating speed of the fifth rotary element RE5 in the form of the second ring gear R2, and the rotating speed of the first rotary element RE1 in the form of the first carrier C1. The present vehicular power transmitting system 815 is controlled in substantially the same manner as illustrated in FIGS. 22-33, and has substantially the same operational functions and advantages as the vehicular power transmitting system 14 of the first embodiment of FIG. 1.

Eighteenth Embodiment

Figure 63:
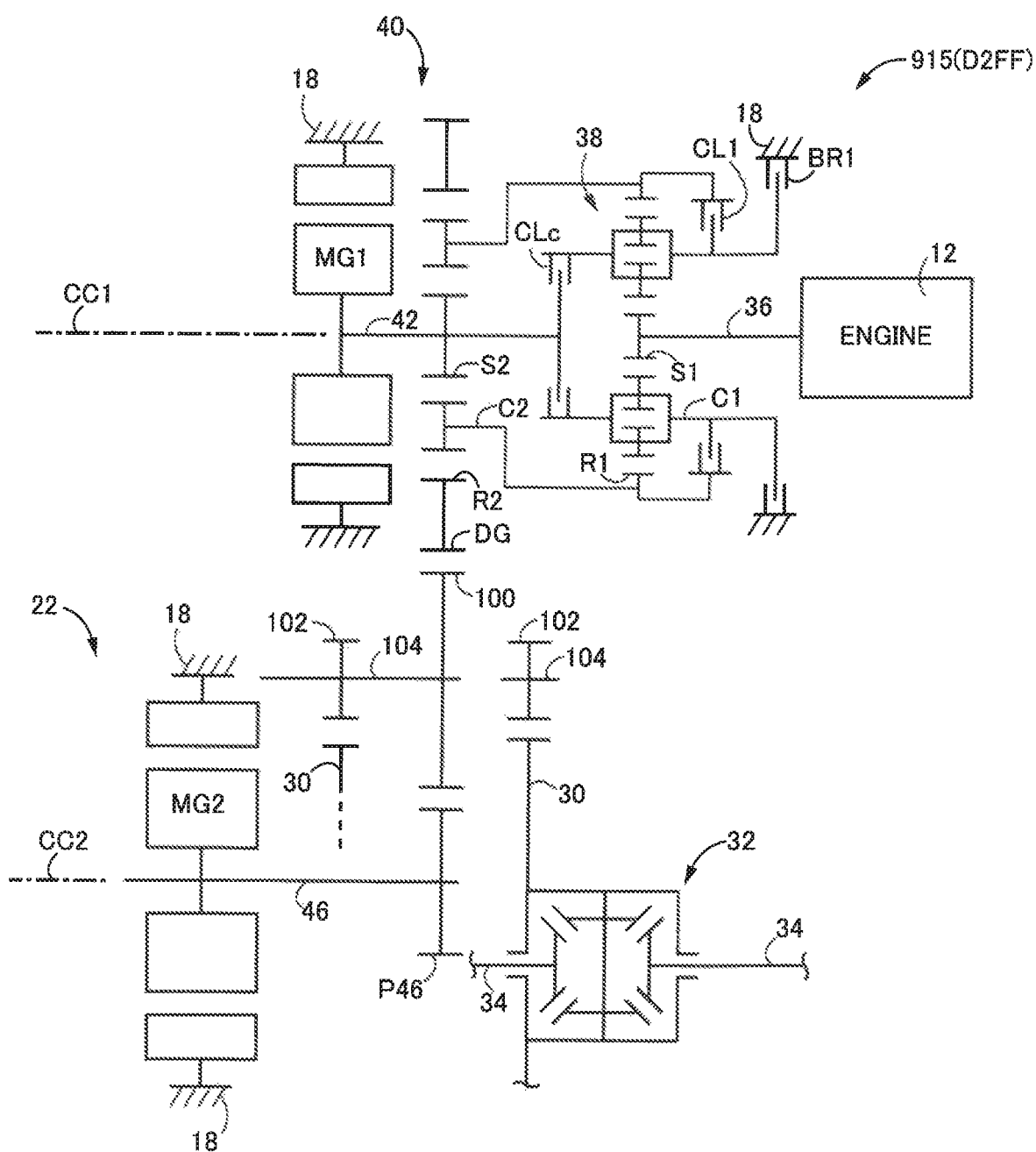
FIG. 63 is a schematic view showing an arrangement of a vehicular power transmitting system having a gear train D2FF according to a still further (eighteenth) embodiment of the invention.

FIG. 63 is the schematic view showing an arrangement of a vehicular power transmitting system 915 having a gear train D2FF according to an eighteenth embodiment of the invention. The gear train D2FF in the present vehicular power transmitting system 915 is different from the gear train D1FF in the vehicular power transmitting system 815 of FIG. 58 in that in the gear train D2FF, the first ring gear R1 and the second carrier C2 are connected to each other, the output of the engine 12 is transmitted to the first sun gear S1 in the first differential mechanism 38, the brake BR1 is disposed between the stationary member in the form of the casing 18 and the first carrier C1, and the clutch CLc is disposed between the first carrier C1 and the second sun gear S2. In the other aspects, the gear train D2FF is identical with the gear train D1FF. The present vehicular power transmitting system 915 has substantially the same operational functions and advantages as the vehicular power transmitting system 815 of FIG. 58.

While the preferred embodiments of the invention have been described by reference to the drawings, the present invention may be otherwise embodied.

The illustrated embodiments wherein the clutch CL1 is provided as a first coupling element for selectively connecting the first rotary element RE1 and the second rotary element RE2 to each other may be modified, for example, such that the first coupling element may be a clutch for selectively connecting the second and third rotary elements RE2 and RE3 to each other, or a clutch for selectively connecting the first and third rotary elements RE1 and RE3 to each other. Any other modification may be made as long as the first coupling element is a clutch for selectively connecting any two elements of the first, second and third rotary elements RE1, RE2 and RE3, to each other.

In the illustrated embodiments, the clutch CL1, brake BR1 and clutch CLc are hydraulically operated frictional coupling devices of wet-type. However, those hydraulically operated frictional coupling devices may be replaced by electrically operated coupling elements such as electromagnetic clutches or magnetic-powder clutches which are electrically controllable.

In the illustrated embodiments, the vehicle 10 is provided with the brake BR1. However, the vehicle 10 need not be provided with the brake BR1. The vehicle 10 not provided with the brake BR1 can also be switched between the U/D input split HV drive sub-modes and the O/D input split HV drive sub-modes.

In the gear trains of the power transmitting systems according to the illustrated embodiments, the second rotary element RE2 is selectively connected to the stationary member through the brake BR1. However, the gear trains may be modified such that the first rotary element RE1 connected to the engine 12 is selectively connected to the stationary member through the brake BR1.

The vehicle speed V may be obtained from the rotating speed No of the output shaft 24 detected by the output speed sensor 72, or may be calculated on the basis of a rotating speed of the input shaft 36 or any other rotary member operatively connected to the drive wheels 16, and a speed ratio of the input shaft 36 or other rotary member with respect to the drive wheels 16.

While the preferred embodiments and their modifications have been described for illustrative purpose only, it is to be understood that the present invention may be embodied with various changes and improvements, which may occur to those skilled in the art.

NOMENCLATURE OF ELEMENTS

10: Vehicle
12: Engine
16: Drive wheels
24: Output shaft (Output rotary member)

38: First differential mechanism
C1: First carrier (Rotary element)
R1: First ring gear (Rotary element)
S1: First sun gear (Rotary element)
40: Second differential mechanism
S2: Second sun gear (Rotary element)
C2: Second carrier (Rotary element)
R2: Second ring gear (Rotary element)
90: Electronic control device (Control apparatus)
92: Hybrid control portion
94: Power transmission switching portion
98: Acceleration requirement determining portion
BR1: Brake
CL1: Clutch (First coupling element)
CLc: Clutch (Second coupling element)
MG1: First motor/generator
MG2: Second motor/generator

What is claimed is:

1. A control apparatus for a vehicular power transmitting system including: a first differential mechanism having a first rotary element, a second rotary element and a third rotary element; a second differential mechanism having a fourth rotary element, a fifth rotary element and a sixth rotary element; a first coupling element for connecting selected two rotary elements of the first, second and third rotary elements to each other; and a second coupling element for connecting the second rotary element to a selected one of the fourth and fifth rotary elements, and wherein the third rotary element is connected to the sixth rotary element, the fifth rotary element is connected to an output shaft, the first rotary element is connected to an engine, the fourth rotary element is connected to a first motor/generator, and the output shaft is connected to a second motor/generator, the control apparatus comprising:
a microcomputer configured to selectively establish a first drive mode by placing one of the first and second coupling elements in an engaged state, a second drive mode by placing the other of the first and second coupling elements in an engaged state, or a third drive mode by placing both of the first and second coupling elements in the engaged states,
wherein the microcomputer switches the vehicular power transmitting system between the first and second drive modes through the third drive mode, where a predetermined condition is not satisfied, and switches the vehicular power transmitting system between the first and second drive modes with concurrent engaging and releasing actions of the first and second coupling elements where the predetermined condition is satisfied.

2. The control apparatus according to claim 1, wherein the predetermined condition is satisfied when a degree of change of a manual operation to accelerate a vehicle provided with the vehicular power transmitting system is higher than a predetermined threshold value.

3. The control apparatus according to claim 1, wherein the predetermined condition is satisfied when a sporty drive mode in which a vehicle provided with the vehicular power transmitting system is driven with a high degree of driving performance is selected.

4. The control apparatus according to claim 1, wherein the first drive mode is a drive mode in which a rotary motion of the engine is output from the output shaft such that a speed of the rotary motion of the engine is reduced with respect to a rotating speed of the output shaft,
the second drive mode is a drive mode in which the rotary motion of the engine is output from the output shaft such that the speed of the rotary motion of the engine is raised with respect to the rotating speed of the output shaft, and
the third drive mode is a drive mode in which the rotary motion of the engine is output from the output shaft such that the speed of the rotary motion of the engine is equal to the rotating speed of the output shaft.

5. The control apparatus according to claim 2, wherein the first drive mode is a drive mode in which a rotary motion of the engine is output from the output shaft such that a speed of the rotary motion of the engine is reduced with respect to a rotating speed of the output shaft,
the second drive mode is a drive mode in which the rotary motion of the engine is output from the output shaft such that the speed of the rotary motion of the engine is raised with respect to the rotating speed of the output shaft, and
the third drive mode is a drive mode in which the rotary motion of the engine is output from the output shaft such that the speed of the rotary motion of the engine is equal to the rotating speed of the output shaft.

6. The control apparatus according to claim 3, wherein the first drive mode is a drive mode in which a rotary motion of the engine is output from the output shaft such that a speed of the rotary motion of the engine is reduced with respect to a rotating speed of the output shaft,
the second drive mode is a drive mode in which the rotary motion of the engine is output from the output shaft such that the speed of the rotary motion of the engine is raised with respect to the rotating speed of the output shaft, and
the third drive mode is a drive mode in which the rotary motion of the engine is output from the output shaft such that the speed of the rotary motion of the engine is equal to the rotating speed of the output shaft.

7. The control apparatus according to claim 1, wherein the vehicular power transmitting system has a plurality of assignment patterns in each of which a plurality of overall speed positions are assigned to the first, second and third drive modes, and
the microcomputer switches the vehicular power transmitting system between the first and second drive modes through the third drive mode when an assignment pattern in which at least one of the overall speed positions is assigned to the third drive mode is selected, and switches the vehicular power transmitting system between the first and second drive modes with the concurrent engaging and releasing actions of the first and second coupling elements when an assignment pattern in which none of the overall speed positions is assigned to the third drive mode is selected.

8. The control apparatus according to claim 2, wherein the vehicular power transmitting system has a plurality of assignment patterns in each of which a plurality of overall speed positions are assigned to the first, second and third drive modes, and
the microcomputer switches the vehicular power transmitting system between the first and second drive modes through the third drive mode when an assignment pattern in which at least one of the overall speed positions is assigned to the third drive mode is selected, and switches the vehicular power transmitting system between the first and second drive modes with the concurrent engaging and releasing actions of the first and second coupling elements when an assignment pattern in which none of the overall speed positions is assigned to the third drive mode is selected.

9. The control apparatus according to claim 3, wherein the vehicular power transmitting system has a plurality of assignment patterns in each of which a plurality of overall speed positions are assigned to the first, second and third drive modes, and the microcomputer switches the vehicular power transmitting system between the first and second drive modes through the third drive mode when an assignment pattern in which at least one of the overall speed positions is assigned to the third drive mode is selected, and switches the vehicular power transmitting system between the first and second drive modes with the concurrent engaging and releasing actions of the first and second coupling elements when an assignment pattern in which none of the overall speed positions is assigned to the third drive mode is selected.

10. The control apparatus according to claim 4, wherein the vehicular power transmitting system has a plurality of assignment patterns in each of which a plurality of overall speed positions are assigned to the first, second and third drive modes, and the microcomputer switches the vehicular power transmitting system between the first and second drive modes through the third drive mode when an assignment pattern in which at least one of the overall speed positions is assigned to the third drive mode is selected, and switches the vehicular power transmitting system between the first and second drive modes with the concurrent engaging and releasing actions of the first and second coupling elements when an assignment pattern in which none of the overall speed positions is assigned to the third drive mode is selected.

11. The control apparatus according to claim 5, wherein the vehicular power transmitting system has a plurality of assignment patterns in each of which a plurality of overall speed positions are assigned to the first, second and third drive modes, and the microcomputer switches the vehicular power transmitting system between the first and second drive modes through the third drive mode when an assignment pattern in which at least one of the overall speed positions is assigned to the third drive mode is selected, and switches the vehicular power transmitting system between the first and second drive modes with the concurrent engaging and releasing actions of the first and second coupling elements when an assignment pattern in which none of the overall speed positions is assigned to the third drive mode is selected.

12. The control apparatus according to claim 6, wherein the vehicular power transmitting system has a plurality of assignment patterns in each of which a plurality of overall speed positions are assigned to the first, second and third drive modes, and the microcomputer switches the vehicular power transmitting system between the first and second drive modes through the third drive mode when an assignment pattern in which at least one of the overall speed positions is assigned to the third drive mode is selected, and switches the vehicular power transmitting system between the first and second drive modes with the concurrent engaging and releasing actions of the first and second coupling elements when an assignment pattern in which none of the overall speed positions is assigned to the third drive mode is selected.

13. The control apparatus according to claim 3, wherein the microcomputer switches the vehicular power transmitting system between the first and second drive modes, based on a required vehicle drive force represented by an amount of operation of an accelerator pedal of the vehicle, and a running speed of the vehicle, and according to a predetermined drive mode switching map having a switching boundary line defining two areas in which the first and second drive modes are respectively selected, and when the sporty drive mode is selected, the microcomputer moves the switching boundary line in at least one of a direction in which the running speed is raised, and a direction in which the required vehicle drive force is reduced.

* * * * *